(12) United States Patent
Talts et al.

(10) Patent No.: US 12,435,308 B2
(45) Date of Patent: Oct. 7, 2025

(54) IMMUNOMODULATION BY AMNIOTIC FLUID MESENCHYMAL STEM CELLS

(71) Applicant: Amniotics AB, Lund (SE)

(72) Inventors: Jan Talts, Staffanstorp (SE); Kåre Engkilde, Værløse (DK)

(73) Assignee: Amniotics AB, Lund (SE)

( * ) Notice: Subject to any disclaimer, the term of this patent is extended or adjusted under 35 U.S.C. 154(b) by 0 days.

(21) Appl. No.: 17/453,744

(22) Filed: Nov. 5, 2021

(65) Prior Publication Data

US 2022/0145250 A1 May 12, 2022

Related U.S. Application Data

(60) Provisional application No. 63/110,825, filed on Nov. 6, 2020.

(51) Int. Cl.
| | | |
|---|---|---|
| C12N 5/0783 | (2010.01) | |
| C12N 5/078 | (2010.01) | |
| C12N 5/0786 | (2010.01) | |

(52) U.S. Cl.
CPC ......... *C12N 5/0636* (2013.01); *C12N 5/0634* (2013.01); *C12N 5/0645* (2013.01); *C12N 2502/025* (2013.01); *C12N 2506/025* (2013.01)

(58) Field of Classification Search
CPC .. C12N 5/0636; C12N 5/0634; C12N 5/0645; C12N 2502/025; C12N 2506/025
See application file for complete search history.

(56) References Cited

U.S. PATENT DOCUMENTS

| | | | |
|---|---|---|---|
| 4,308,875 A | 1/1982 | Young | |
| 4,567,882 A | 2/1986 | Heller | |
| 4,787,894 A | 11/1988 | Turnbull | |
| 5,019,039 A | 5/1991 | Anderson | |
| 5,048,530 A | 9/1991 | Hurwitz | |
| 5,100,387 A | 3/1992 | Ng | |
| 5,137,031 A | 8/1992 | Guirguis | |
| 5,395,379 A | 3/1995 | Deutchman et al. | |
| 5,494,044 A | 2/1996 | Sundberg | |
| 5,951,497 A | 9/1999 | Wallace et al. | |
| 6,378,523 B1 | 4/2002 | Christopher | |
| 6,461,628 B1 | 10/2002 | Blanchard et al. | |
| 6,479,064 B1 | 11/2002 | Atala | |
| 6,506,574 B1 | 1/2003 | Rambhatla et al. | |
| 6,733,433 B1 | 5/2004 | Fell | |
| 7,255,879 B2 | 8/2007 | Hariri | |
| 7,311,905 B2 | 12/2007 | Hariri | |
| 7,596,385 B2 | 9/2009 | Aghvami et al. | |
| 7,638,141 B2 | 12/2009 | Hariri | |
| 7,682,803 B2 | 3/2010 | Paludan et al. | |
| 7,802,574 B2 | 9/2010 | Schultz | |
| 7,914,779 B2 | 3/2011 | Hariri | |
| 8,987,203 B2 | 3/2015 | Van Leeuwen et al. | |
| 9,868,939 B2 | 1/2018 | Slukvin et al. | |
| 10,073,096 B2 | 9/2018 | Lakshmipathy et al. | |
| 10,143,448 B2 | 12/2018 | Brunner | |
| 10,201,620 B2 | 2/2019 | Meis et al. | |
| 10,983,123 B2 | 4/2021 | Lakshmipathy et al. | |
| 2005/0042595 A1 | 2/2005 | Haas | |
| 2005/0054093 A1 | 3/2005 | Haas | |
| 2005/0059152 A1 | 3/2005 | Tanavde et al. | |
| 2005/0124003 A1 | 6/2005 | Atala et al. | |
| 2005/0148074 A1 | 7/2005 | Davies et al. | |
| 2007/0134210 A1 | 6/2007 | Heidaran | |
| 2007/0243172 A1 | 10/2007 | Ra et al. | |
| 2007/0298497 A1 | 12/2007 | Antwiler | |
| 2009/0191159 A1 | 7/2009 | Sakurada et al. | |
| 2010/0113327 A1 | 5/2010 | Van Leeuwen et al. | |

(Continued)

FOREIGN PATENT DOCUMENTS

| | | |
|---|---|---|
| AU | 2013204820 | 5/2013 |
| AU | 2013204968 | 1/2014 |

(Continued)

OTHER PUBLICATIONS

Mareschi et al., Immunoregulatory effects on T lymphocytes by human mesenchymal stromal cells isolated from bone marrow, amniotic fluid, and placenta, Experimental Hematology, 44: 138-150. (Year: 2016).*
Lee et al., Allogeneic human mesenchymal stem cells for treatment of E. coli endotoxin-induced acute lung injury in the ex vivo perfused human lung, PNAS, 106(38): 16357-16362. (Year: 2009).*
Wehrmann et al., gd T cells protect against LPS-induced lung injury, Journal of Leukocyte Biology, 99: 373-386. (Year: 2016).*
Naylor et al., The Mesenchymal Stem Cell Marker CD248 (Endosialin) Is a Negative Regulator of Bone Formation in Mice, Arthritis Rheum, 64(10): 3334-3343. (Year: 2012).*
Spong, Defining "term" Pregnancy Recommendations From the Defining "Term" Pregnancy Workgroup, JAMA, 309(23): 2445-2446. (Year: 2013).*

(Continued)

*Primary Examiner* — Arthur S Leonard
*Assistant Examiner* — Joseph Paul Miano
(74) *Attorney, Agent, or Firm* — Knobbe, Martens, Olson & Bear, LLP

(57) ABSTRACT

Methods of reducing T cell activation including co-culturing with T cells, term amniotic fluid mesenchymal stem cells (TAF-MSCs) isolated from term human amniotic fluid. Other aspects relate to methods of inhibiting macrophage polarization toward the M1 pro-inflammatory phenotype including co-culturing with macrophages TAF-MSCs isolated from term human amniotic fluid. Other aspects relate to methods of inhibiting cytokine secretion from activated Peripheral Blood Mononuclear Cell (PBMC) including co-culturing with the PBMC tissue-typed TAF-MSCs isolated from human amniotic fluid. Other aspects relate to methods of differentiating TAF-MSC including: obtaining TAF-MSC cells from term amniotic fluid, plating the TAF-MSC cells in limiting dilution to obtain expanded colonies from single cells, and transferring the cells to a differentiation media that contains one or more factor to differentiate the TAF-MSC cells.

12 Claims, 73 Drawing Sheets

(56) References Cited

U.S. PATENT DOCUMENTS

| | | |
|---|---|---|
| 2010/0124569 A1 | 5/2010 | Abbot et al. |
| 2010/0136679 A1 | 6/2010 | Min et al. |
| 2010/0260815 A1 | 10/2010 | Kyle et al. |
| 2010/0323446 A1 | 12/2010 | Barnett et al. |
| 2011/0256110 A1 | 10/2011 | Perin et al. |
| 2012/0107799 A1 | 5/2012 | Daum |
| 2012/0142102 A1 | 6/2012 | Chen et al. |
| 2012/0190731 A1 | 7/2012 | Messina |
| 2013/0157353 A1 | 6/2013 | Dijkhuizen Borgart et al. |
| 2013/0171110 A1 | 7/2013 | Woods et al. |
| 2014/0038291 A1 | 2/2014 | Ahlfors et al. |
| 2014/0369968 A1 | 12/2014 | Slukvin et al. |
| 2015/0025366 A1 | 1/2015 | Harrell |
| 2015/0247852 A1 | 9/2015 | Lakshmipathy et al. |
| 2015/0300939 A1 | 10/2015 | Ma |
| 2016/0030489 A1 | 2/2016 | Larsson et al. |
| 2016/0068815 A1 | 3/2016 | Larsson et al. |
| 2016/0199413 A1 | 7/2016 | Simonson et al. |
| 2018/0059109 A1 | 3/2018 | Hsuan et al. |
| 2018/0119104 A1 | 5/2018 | Slukvin et al. |
| 2018/0250343 A1 | 9/2018 | Reems et al. |
| 2019/0064164 A1 | 2/2019 | Lakshmipathy et al. |
| 2020/0048609 A1 | 2/2020 | Saxena et al. |
| 2020/0056156 A1 | 2/2020 | Ino et al. |
| 2020/0095551 A1 | 3/2020 | Woods et al. |
| 2020/0171097 A1 | 6/2020 | Larsson et al. |

FOREIGN PATENT DOCUMENTS

| | | |
|---|---|---|
| AU | 2014201181 | 3/2014 |
| CN | 1407088 | 4/2003 |
| CN | 202569006 | 12/2012 |
| CN | 202723948 | 2/2013 |
| CN | 109777773 A | 5/2019 |
| CN | 109971709 A | 7/2019 |
| DE | 202004012970 | 12/2005 |
| EP | 1029228 | 8/2000 |
| EP | 2302036 | 3/2011 |
| EP | 2479261 | 7/2012 |
| EP | 3029137 | 1/2019 |
| EP | 3117828 | 2/2020 |
| JP | 2005323534 | 11/2005 |
| JP | 2010529851 | 9/2010 |
| JP | 2010265220 | 11/2010 |
| JP | 2011084566 | 4/2011 |
| JP | 2012521780 | 9/2012 |
| JP | 2012255025 | 12/2012 |
| WO | WO 0235992 | 5/2002 |
| WO | WO 03042405 | 5/2003 |
| WO | WO 03068937 | 8/2003 |
| WO | WO 05078073 | 8/2005 |
| WO | WO 06012404 | 2/2006 |
| WO | WO 2008/060139 | 5/2008 |
| WO | WO 2009/031818 | 3/2009 |
| WO | WO 2009/052132 | 4/2009 |
| WO | WO 2009/135206 A1 | 11/2009 |
| WO | WO 10099539 | 9/2010 |
| WO | WO 2012/021845 | 2/2012 |
| WO | WO 2012/070032 | 5/2012 |
| WO | WO 2013/082487 | 6/2013 |
| WO | WO 2014/055121 | 4/2014 |
| WO | WO 2014/140913 | 9/2014 |
| WO | WO 2015/016761 | 2/2015 |
| WO | WO 2015/023720 | 2/2015 |
| WO | WO 2015/073786 | 5/2015 |
| WO | WO 2016/120310 | 8/2016 |
| WO | WO 2018/073615 | 4/2018 |
| WO | WO 2018/083700 | 5/2018 |
| WO | WO 2018/152364 | 8/2018 |
| WO | WO 2018/169554 | 9/2018 |
| WO | WO 2018/185584 | 10/2018 |
| WO | WO 2018/186421 | 10/2018 |
| WO | WO 2019/035880 | 2/2019 |
| WO | WO 2019/104381 A1 | 6/2019 |
| WO | WO 2021/087436 | 5/2021 |

OTHER PUBLICATIONS

Gu et al., Mesenchymal stem cells alleviate airway inflammation and emphysema in COPD through down-regulation of cyclooxygenase-2 via p38 and ERK, Scientific Reports, 5 (*733): 1-11 (Year: 2015).*

Bartis et al., Role of CD248 as a potential severity marker in idiopathic pulmonary fibrosis, BMC Pulmonary Medicine, 16: (51): 1-10. (Year: 2016).*

Duffy et al., Mesenchymal stem cells effects on T-cell effector pathways, Stem Cell Research and Therapy, 2(34): 1-9 (Year: 2011).*

International Search Report from PCT/SE2020/050994, dated Feb. 15, 2021 in 19 pages.

International Search Report from PCT/SE2020/050993 dated Apr. 15, 2021.

Bossolasco et al., "Molecular and phenotypic characterization of human amniotic fluid cells and their differentiation potential", Cell Research, 2006 16: pp. 329-336.

Hamid et al., "Highly potent stem cells from full-term amniotic fluid: A realistic perspective" Reprod Biol, 2017, 17(1):9-18; whole document.

Han et al., "Genetically modified mesenchymal stem cell therapy for acute respiratory distress syndrome", stem Cell Res Ther, 2019, 10(1 ):386; whole document.

Kim et al., "Time-course transcriptional profiling of human amniotic fluid-derived stem cells using microarray" Cancer Res Treat, 2010, 42(2):82-94; whole document.

Lee et al., "Xenogeneic human umbilical cord-derived mesenchymal stem cells reduce mortality in rats with acute respiratory distress syndrome compl icated by sepsis", Oncotarget, 2017, 8(28):45626-45642; whole document.

Lesage et al., "The amniotic fluid as a source of mesenchymal stem cells with lung-specific characteristics", Wiley Prenatal Diagnosis 2017, pp. 1093-1099.

Leng et al., "Transplantation of ACE2-Mesenchymal stem Cells Improves the Outcome of Patients with COVID-19 Pneumonia", Aging Dis, Mar. 9, 2020, 11(2):216-228; whole document.

Moraghebi et al., "Term amniotic fluid: an unexploited reserve of mesenchymalstromal cells for reprogramming and potential cell therapy applications" Stem Cell Res Ther, 2017,8(1):190; whole document.

Saguil et al., "Acute Respiratory Distress Syndrome: Diagnosis and Management", American Family Physician, 2012, vol. 85, No. 4, pp. 352-358, 2012.

Spitzhorn et al., "Isolation and Molecular Characterization of Amniotic Fluid-Derived Mesenchymal Stem Cells Obtained from Caesarean Sections", Hindawi Stem Cells International, Volum 2017, Article ID 5932706, in 15 pages.

Vadasz et al., "Second and third trimester amniotic fluid mesenchymal stem cells can repopulate a de-cellularized lung scaffold and express lung markers", J Pediatr Surg, 2014, 49(11): 1554-63; whole document.

Zhou et al., "Amniotic fluid-derived mesenchymal stem cells: characteristics and therapeutic applications" Arch Gynecol Obstet, 2014, 290(2):223-231; whole document.

De Coppi, P., et al. Isolation of Amniotic Stem Cell Lines with Potential for Therapy. Nature Biotechnology vol. 25, No. 1 (2007) 100-106.

Djouad, et al. "Mesenchymal Stem Cells: Innovative Therapeutic Tools for Rheumatic Diseases." Nature Reviews Rheumatology 5 (2009): 392-399.

Ge J, et al. "The Size of Mesenchymal Stem Cells is a Significant Cause of Vascular Obstructions and Stroke". Stem Cell Reviews and Reports, Apr. 2014.10(2): 295-303.

Hoogduijn, Martin J., et al. "Morphology and Size of Stem Cells From Mouse and Whale: Observational Study." BMJ 347 (2013).

Kuroda, R., et al. "Treatment of A Full-Thickness Articular Cartilage Defect in the Femoral Condyle of an Athlete with Autologous Bone-Marrow Stromal Cells." Osteoarthritis and Cartilage, vol. 15, No. 2 (2007): 226-231.

(56) References Cited

OTHER PUBLICATIONS

Pak, J. Regeneration of Human Bones in Hip Osteonecrosis and Human Cartilage in Knee Osteoarthritis With Autologous Adipose-Tissue-Derived Stem Cells: A Case Series. J Med Case Reports 5. 296 (2011).
Allard, Justine, et al. "Immunohistochemical Toolkit for Tracking and Quantifying Xenotransplanted Human Stem Cells." Regenerative Medicine 9.4 (2014): 437-452.
Vega, et al. 2017. "High-Content Image Informatics of The Structural Nuclear Protein Numa Parses Trajectories for Stem/Progenitor Cell Lineages and Oncogenic Transformation". Exp. Cell Res. 351:11-23.
Anker et al., "Isolation of Mesenchymal Stem Cells of Fetal or Maternal Origin from Human Placenta," Stem Cells, vol. 22, 2004, p. 1338-1345.
Bar-Nur et al., "Epigenetic Memory and Preferential Lineage-Specific Defferentation in Induced Pluripotent Stem Clles Derived from Human Pancreatic Isley Bets Cells", Cell Stem Cell vol. 9, No. 1, 2011, pp. 17-23.
Bieback et al., "Clinical Protocols foe the Isolation and Expansion of Mesenchymal Stromal Cells", Transfucion Medicine and Hemotherapy, 2008, vol. 35, pp. 286-294. (Year: 2008).
Bongso et al., "Taking Stem Cells to the Clinic: Major Challenges," Journal of Cellular Biochemisty, vol. 105, 2008, p. 1352-1360.
Bottai et al., "Third trimester amniotic fluid cells with the capacity to develop neural phenotypes and with heterogeneity among subpopulations," Restorative Neurology and Neuroscience, vol. 30, 2012, p. 55-68.
Cao et al., Stem Cell Repair of Central Nervous System Injury Neuroscience Res vol. 68, 2002, pp. 501-510.
Carette et al., "Generation of iPSCs from cultured human malignant cells", Blood, vol. 115, No. 20, 2010, pp. 4039-4042.
Chanda et al., "Retinoic Acid Signaling Is Essential for Embryonic Hematopoietic Stem Cell Development", Cell, vol. 155, No. 1, Sep. 26, 2013, pp. 215-227, XP028729738, ISSN: 0092-8674, DOI: 10.1016/J.CELL.2013.08.055.
Cipolleschi et al ("The Role of Hypoxia in the Maintenance of Hematopoietic Stem Cells," Blood, vol. 82, No. 7 (Oct. 1, 1993: pp. 2031-2037).
Dewar et al. "Imatinib inhibits the in vitro development of the monocyte/macrophage lineage from normal human bone marrow progenitors" Leukemia (2003) vol. 17 pp. 1713-1721.
De Wynter et al., "Comparison of Purity and Enrichment of CD34 + Cells from Bone marrow, Umbilical Cord and Peripheral Blood (primed for Apheresis) Using Five Separation Systems", Stem Cells, 1995, vol. 13, pp. 524-532.
Dobreva et al., "On the origin of amniotic stem cells: of mice and men," The International Journal of Developmental Biology, vol. 54, 2010, p. 761-777.
Eggerman J et al., "Endothelial progenitor cell culture and differentiation in vitro: a methodological comparison using human umbilical cord blood", Cardiovascular Research, Oxford University Press, GB, vol. 58, No. 2, May 1, 2003 (May 1, 2003), pp. 478-486, XP002351441, ISSN: 0008-6363, DOI: 10.1016/S0008-6363(03)00252-9 002351441 I.
Flow Rate Units Conversion, Traditional Oven, 5 pages, retrieved from the internet (5/0/2022): https://www.traditionaloven.com/ tutorials/ flow-rate/convert-gtt-drop-per-minute-to-ml-milliliter-per-hour. html (Year: 2022).
Forman et al., Reactive Oxygen Species and Cell Signaling, Respiratory Burst in Macrophage Signaling vol. 166 pp. 54-58, 2002.
Forraz et al., "The umbilical cord: a rich and ethical stem cell source to advance regenerative Medicine," Cell Proliferation, vol. 44, 2011, p. 60-69.
Friedman et al., "Umbilical Cord Mesenchymal Stem Cells: Adjuvants for Human Cell Transplantation," American Society for Blood and Marrow Transplantation, vol. 13, 2007, p. 1477-1486.
Goichberg et al., "cAMP-induced PKC activation increases functional CXCR4 expression on human CD34+ hematopoietic progenitors" Blood, vol. 107, No. 3, Feb. 1, 2006.
Ghosh et al., "Persistnat Donor Cell Gene Expression among Human Induced Pluripotent Stem Cells Contributes to Differences with Human Embryonic Stem Cells", Plos One, vol. 5, No. 2, 2010, p. E8975.
Halliwell, "Cell Culture, Oxidative Stress, and Antioxidants: Avoiding Pitfalls", Biomed J. vol. 37, No. 3, May-Jun. 2014.
Hanna et al., "Direct cell reprogramming is a stochastic process amenable to acceleration"., Nature vol. 462, No. 7273, 2009, pp. 595-601.
Hong, D.K., et al., "Combined treatment with Dichloroacetic acid and pyruvate reduces hippocampal neuronal death after transient cerebral ischemia," Frontiers in Neurology, Mar. 2018, vol. 9, Article 137 (in 11 pages).
Iizuka, H., et al., "Targeted gene correction of RUNX1 in induced pluripotent stem cells derived from familial platelet disorder with propensity to myeloid malignancy restores normal megakaryopoiesis," Experimental Hematology, 2015, vol. 43, pp. 849-857.
Ikehata et al."Environmenatal Molecular Mutagenesis", vol. 41, No. 4, 2003, pp. 280-292.
Ikehata et al., "Mutation spectrum in sunlight-exposed", vol. 556, No. 1-2, 2004, pp. 11-24.
Ingram D A et al., "Identification of a novel hierarchy of endothelial progenitor cells using human peripheral and umbilical cord blood", Blood, American Society of Hematology, US, vol. 104, No. 9, Nov. 1, 2004 (Nov. 1, 2004), pp. 2752-2760, XP002351443, ISSN: 0006-4971, DOI: 10.1182/Blood-2004-04-1396 002351443 X.
Kim et al., "Epigenetic memory in induced pluripotent stem cells", vol. 467, No. 7313, 2010, pp. 285-290.
Kettle et al ("Mechanism of inactivation of myeloperoxidase by 4-aminobenzoic acid hydrazide," Biochem. J. (1997) 321, 503-508).
Kinney, M.A., et al., "A systems biology pipeline identifies regulatory networks for stem cell engineering," Nature Biotechnology, 2019, vol. 37, pp. 810-818.
Kumano et al., "Generation of Induced pluripotent stem cells from primaty chronic myelogenous leukemia patient samples", Blood vol. 119, No. 26, 2012, pp. 6234-6242.
Lee et al., "Derivation of neural crest cells from human pluripotent stem cells". Nature protocols 5:88-701 (2010).
Li, Yaqing, et al., "Therapeutic effects of amniotic fluid-derived mesenchymal stromal cells on lung injury in rats with emphysema," Respiratory Research (2014) 15:120.
Lindencrona et al., "CD4+ T Cell-Mediated Her-2/Neu-Specific Tunor Rejection In The Absence of B Cells"., Int J Cancer vol. 109, 2004, pp. 259-264.
Lith et al ("Engineering biodegradable polyester elastomers with antioxidant properties to attenuate oxidative stress in tissue," Biomaterials. Sep. 2014 ; 35(28): 8113-8122).
L. M. Reid, "Stem cell biology, hoemone/matrix synergies and liver differentiation". Current Opinion in Cell Biology, vol. 2, 1990, p. 121-130.
Ma, Q-S., et al., "Ligand-based design, synthesis and biological evaluation of xanthine derivatives as LSD1/KDM1A inhibitors," European Journal of Medicinal Chemistry, 2018, vol. 162, pp. 555-567 (Accepted Manuscript).
Marchetto et al., "Transcriptional Signature and Memory Retention of Human-Induced Pluripotent Stem Cells". Plos One vol. 4, No. 9, 2009, p. E7076.
Masip at al., "Reprogramming with defined factors: from induced pluripotency to induced transdifferentiation"., Molecular Human Reproduction, vol. 16, No. 11 pp. 856-868, 2010.
Melissa Ann Brown et al., "Umbilical Cord Blood Derived Endothelial Progenitor Cells: Isolation, Characterization, and Adhesion Potential in Vitro and in Vivo",, Jan. 1, 2009 (Jan. 1, 2009), XP055140385, Retrieved from the Internet: URL:http://hdl.handle.net/10161/1355 055140385 X.
Mareschi et al., "Multipotent Mesenchymal Stromal Stem Cell Expansion by Plating Whole Bone Marrow at a Low Cellular Density: A More Advantageous Method for Clinical Use", Stem Cells International, 2012, vol. 2012, pp. 1-10. (Year: 2010).
Maurice et al., "Isolation of progenitor cells from cord blood using adhesion matrices", Cytotechnology, 2007, vol. 54, pp. 121-133.

(56) References Cited

OTHER PUBLICATIONS

McGuckin et al., "Culture of embryonic-like stem cells from human umbilical cord blood and onward differentiation to neural cells in vitro," Nature Protocols, vol. 3, 2008, p. 1046-1055.

Mizuno et al., "Generation of skeletal muscle stem/progenitor cells from murine induced pluripotent stem cells," The Journal of the Federation of American Societies for Experimental Biology, vol. 24, 2010, p. 2245-2253.

Murphy et al., "Amnion Epithelial Cell Isolation and Characterization for Clinical Use," Current Protocols in Stem Cell Biology, vol. 13, 2010, p. 1-25.

M. V. Wiles, Embryonic Stem Cell Differentiation in vitro Meth. EnzymoIL. vol. 225, 1993, p. 900.

Naik, P. O., et al., "Mitophagy-driven metabolic switch reprograms stem cell fate," Cellular and Molecular Life Sciences, 2018, Sep. 28, vol. 76, pp. 27-43.

Nijboer et al (Targeting the p53 Pathway to Protect the Neonatal Ischemic Brain, Ann Neural 2011; 70:255-264).

Oburoglu, L., et al., "Glucose and Glutamine Metabolism Regulate Human Hematopoietic Stem Cell Lineage Specification," Cell Stem Cell, 2014, vol. 15, pp. 169-184.

O'Donoghue et al., "Fetal stem cells," Best Practice & Research Clinical Obstetrics and Gynaecology, vol. 18, No. 6, pp. 853-875, 2004.

Osanai et al., "Enhanced expression of retinoic acid-metabolizing enzyme CYP26A1 in sunlight-damaged human skin"., vol. 44, No. 4, 2011, pp. 200-206.

Okabe et al., "Definitive proof for direct reprogramming of hematopoietic cells to pluripotency", Blood, 2009, vol. 114, No. 9, pp. 1764-1767.

Panopoulos et al., "Rapid and Highly Efficient Generation of Induced Pluripotent Stem Cells from Human Umbilical Vein Endothelial Cells", PLOS ONE, vol. 6, No. 5, May 16, 2011 (May 16, 2011), p. e19743, XP055035699, DOI: 10.1371/journal.pone.0019743 055035699 X.

Park et al., "Disease-Specific Induced Pluripotent Stem Cells"., Cell vol. 134, No. 5, 2008, pp. 877-886.

Pereira et al., "Reproducible methodology for the isolation of mesenchymal stem cells from human umbilical cord and its potential for cardiomyocyte generation," Journal of Tissue Engineering and Regenerative Medicine, vol. 2, 2008, p. 394-399.

Pelus, L.M., et al., "Peripheral Blood Stem Cell Mobilization: a Look Ahead," Current Stem Cell Reports, 2018, vol. 4, pp. 273-281.

Phuc et al., "Isolation of three important types of stem cells from the same samples of banked umbilical cord blood", Cell Tissue Bank, published online Jun. 8, 2011, vol. 13, pp. 341-351.

Polo et al.,"Cell type of origin influences the molecular and functional properties of mouse induced pluripotent stem cells"., Nature Biotechnology, vol. 28, No. 8, 2010, pp. 848-855.

P.D. Rathjen et al., "Properies and uses of Embryonic Stem Cells Prospects for Application to Human Biology and Gene Therapy" Reprod. Fertil. Dev. Vol. 10, 1998, p. 31.

Prigione et al ("The Senescence-Related Mitochondrial/Oxidative Stress Pathway is Repressed in Human Induced Pluripotent Stem Cells," Stem Cells 2010;28:721-733).

Ronn et al., Reactive Oxygen Species Impair the Function of CD90+ Hematopoietic Progenitors Generated from Human Pluripotent Stem Cells. Sep. 1, 2016, vol. 35, No. 1; pp. 197-206; p. 2, $1^{st}$ column, $2^{nd}$ paragraph to $2^{nd}$ column, $2^{nd}$ paragraph; p. 3, $1^{st}$ column, $1^{st}$ and $2^{nd}$ paragraphs; plage 4, $2^{nd}$ column, $2^{nd}$ paragraph; DOI: 10.1002/stem.2503.

Ronn et al., "Retinoic Acid Regulates Hematopoietic Development from Human Pluripotent Development from Human Pluripotent Stem Cells", Stem Cell Reports, vol. 4, No. 2, Feb. 1, 2015, pp. 269-281, XP055333217, United States ISSN: 2213-6711, DOI: 10.1016/j.stemcr.2015.01.009, p. 271, col. 1, paragraph 2.

Robertson, "Teratocarcinomas and embryonic stem cells: A practical approach", 1987, IRL Press Ltd.

Roubelakis, M.G., et al., "In vitro and in vivo properties of distinct populations of amniotic fluid mesenchymal progenitor cells," Journal of Cellular and Molecular Medicine, vol. 15, 2011, p. 1896-1913.

Salehinejad et al., "Comparison of different methods for the isolation of mesenchymal stem cells from human umbilical cord Wharton's jelly," In Vitro Cell.Dev.Biol.—Animal (2012) 48:75-83.

Saxena et al., "Cyclic AMP Signaling through Epac Axis Modulates Human Hemogenic Endothelium and Enhances Hematopoietic Cell Generation", Stem Cell Reports, vol. 6, No. 5, May 1, 2016, pp. 692-703, XP055333169, United States ISSN: 2213-6711, DOI: 10.1016/j.stemcr.2016.03.006 p. 695, col. 1, paragraph 2; figure 1.

Savickiene et al., "Human Amniotic Fluid Mesenchymal Stem Cells from Second- and Third-Trimester Amniocentesis: Differentiation Potential, Molecular Signature, and Proteome Analysis," Stem Cells International, 2015, in 15 pages.

Schiavo, A.A., et al., "Endothelial properties of third-trimester amniotic fluid stem cells cultured in hypoxia," *Stem Cell Research & Therapy*, (2015) 6:209, p. 1-15.

Seshareddy et al. "Method to Isolate Mesenchymal-Like Cells from Wharton's Jelly of Umbilical Cord," Methods in Cell Biology, vol. 86, 2008, p. 101-119.

Shigemura, T., et al., "Mosaicism of an ELANE mutation in an asymptomatic mother," Journal of Clinical Immunology, Jan. 2019, vol. 39, pp. 106-111.

Suzuki, H., et al., "Glycolytic pathway affects differentiation of human monocytes to regulatory macrophages," Immunology Letters 176: 18-27 (2016), Accepted Manuscript.

Takahashi et al., "Induction of Pluripotent Stem Cells from Mouse Embryonic and Adult Fibroblast Cultures by Defined Factors"., Cell vol. 126, No. 4, 2006, pp. 663-676.

Uchida, N., et al., "Efficient generation of b-globin-expressing erythroid cells using stromal cell-derived induced pluripotent stem cells from patients with sickle cell disease," Stem Cells, 2017, vol. 33, pp. 586-596.

Vodyanik, M.A., et al., "Leukosialin (CD53) defines hematopoietic progenitors in human embryonic stem cell differentiation cultures," Blood, 2006, vol. 108, pp. 2095-2105.

Vizcardo et al. "Regeneration of Human Tumor Anitigen-Specific T Cells from iPSCs Devrived from Mature CD8 T Cells", Cell Stem Cell, Jan. 3, 2013, vol. 12, No. 1, pp. 31-36.

Wang et al ("Calpain inhibitor attenuates ER stress-induced apoptosis in injured spinal cord after bone mesenchymal stem cells X transplantation," Neurochemistry International 97: 15-25 (Jul. 2016).

Wassarman et al., "Guide to Techniques in Mouse Development", Methods in Enzymology vol. 225, 1993.

Weiss et al., "Stem Cells in the Umbilical Cord," Stem Cell Review, vol. 2, 2006, p. 155-162.

Wilson, Jennifer G., et al., "Mesenchymal Stem (Stromal) Cells for Treatment of ARDS: A Phase 1 Clinical Trial", Lancet Respir Med. Jan. 2015; 3(1): 24-32.

Wisniewski et al. (Further phenotypic characterization of the primitive lineage-CD34+CD38-CD90+CD45Ra-hematopoietic stem cell/progenitor cell sub-population isolated from cord blood, mobilized peripheral blood and patients with chronic myelogenous leukemia. Blood Cancer Journal. 2011).

You, Q., et al., "Isolation of human mesenchymal stem cells from third-trimester amniotic fluid," International Journal of Gynecology and Obstetrics, vol. 103, 2008, p. 149-152.

Ye et al., "Human-induced pluripotent stem cells from blood cells of healthy donors and patients with acquired blood disorders"., Blood vol. 114, No. 27, 2009, pp. 5473-5480.

Yu et al., "Induced Pluripotent Stem Cell Lines Derived from Human Somatic Cells"., Science vol. 318, No. 5858, 2007, pp. 1917-1920.

Zhou et al., "Generation of human induced pluripotent stem cells from urine samples," Nature Protocols, vol. 7, 2012, p. 2080-2089.

International Search Report and Written Opinion for PCT/US2017/023090 dated Aug. 15, 2017 in 16 pages.

International Search Report and Written Opinion for PCT/IB2016/001628 dated Jan. 24, 2017 in 14 pages.

International Search Report in PCT/SE2020/050631, issued Oct. 9, 2020.

(56) References Cited

OTHER PUBLICATIONS

International Search Report in PCT/SE2020/051139 issued Jan. 28, 2021.
International Preliminary Report on Patentability and Written Opinion for PCT/IB2016/001628 dated May 2, 2019 in 8 pages.
International Preliminary Report on Patentability in PCT/SE2020/050631, mailed Sep. 17, 2021.
International Preliminary Report on Patentability and Written Opinion for PCT/US2017/023090 dated Sep. 26, 2019 in 7 pages.
Brett, E. et al., "Isolation of CD248-expressing stromal vascular fraction for targeted improvement of wound healing", Accepted Article, doi: 10.1111/wrr.12542.
Enes, S.R. et al., "MSC from fetal and adult lungs possess lung-specific properties compared to bone marrow-derived MSC", Scientific Reports, 2016, vol. 6, No. 1.
Macfadyen, J.R. et al., "Endosialin (TEM1, CD248) is a marker of stromal fibroblasts and is not selectively expressed on tumor endothelium", FEBS Letters 579 (2005) 2569-2575.

\* cited by examiner

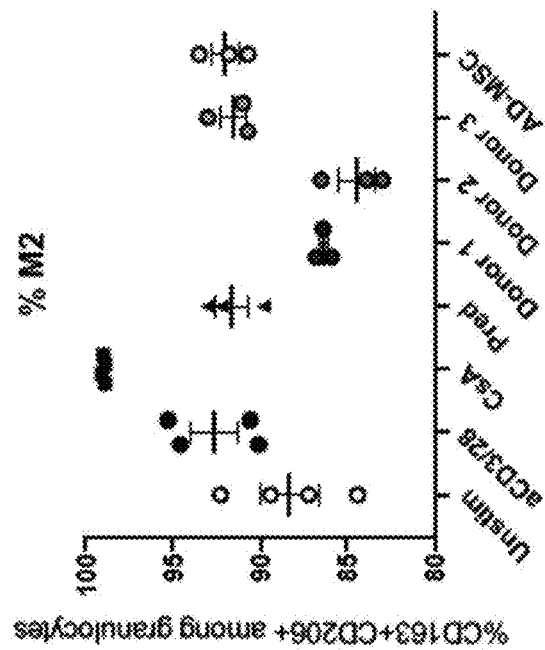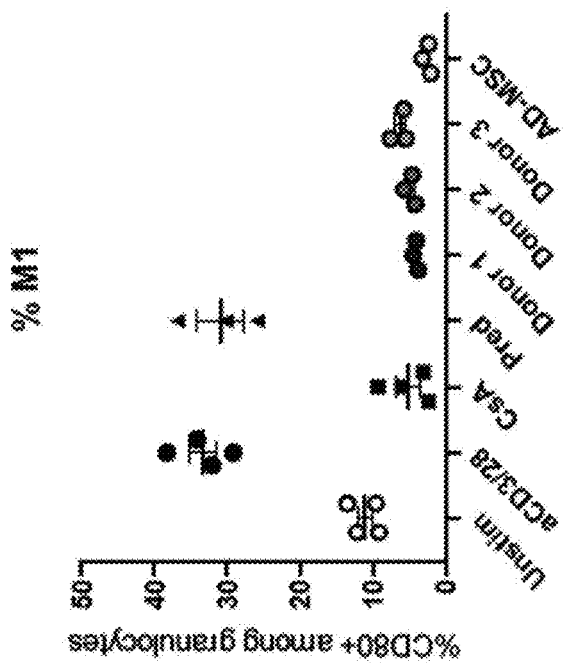
Fig. 11

| B | Filter | Channel | Miltenyi Biotec dyes | Other dyes |
|---|---|---|---|---|
| Violet 405 nm | 450/50 nm | V1 | VioBlue™<br>Viobility™ 405/452<br>Fixable Dye<br>DAPI<br>Hoechst 33342 | Alexa Fluor*405<br>BD™Horizon™ V150<br>BV421™<br>Calcein Violet 450 AM<br>Cascade Blue¹<br>CFP<br>eBFP<br>eFLUOR* 450<br>Hoechst Dyes<br>Pacific Blue™<br>Vybrant² DyeCycle™ Violet<br>Zombie Violet™ |
| | 525/50 nm | V2 | VioGreen™<br>Viobility™ 405/520<br>Fixable Dye | Alexa Fluor¹ 430<br>AmCyan<br>BD™ Horizon™ V500<br>BV510™<br>Cascade Yellow™<br>Krome Orange™<br>Pacific Orange™<br>Qdot² 525<br>Zombie Aqua™ |
| Blue 488 nm | 525/50 nm | B1 | FITC<br>VioBright™ FITC<br>Vio™ 515<br>VioBright™ 515<br>Viobility™ 488/520<br>Fixable Dye | Alexa Fluor¹ 488<br>Calcein AM<br>DyLight* 488<br>CFSE<br>GFP<br>SYTOX* Green<br>Vybrant² DyeCycle™ Green<br>YFP<br>Zombie Green™ |
| | 585/40 nm | B2 | PE | Cy™ 3<br>Vybrant² DyeCycle™ Orange |
| | 655-730 nm | B3 | PerCP<br>PerCP-Vio*700<br>PE-Vio™ 615<br>Propidium Iodide<br>7-AAD | PerCP-Cy™ 5.5<br>PE-Cy™ 5.5<br>PE-Cy™ 5<br>ECD<br>PE-Texas Red™<br>BD™ Horizon™ PE-CF594<br>PE-eFluor™ 610<br>PE-Alexa Fluor™ 610<br>PE/Dazzle™ 594<br>PerCP-eFluor™ 710<br>PE-Cy™ 7 |
| | 750 nm LP | B4 | PE-Vio™ 770 | PE-Alexa Fluor™ 750 |
| Red 638 nm | 655-730 nm | R1 | APC<br>Vio 667*<br>VioBright™ 667 | Alexa Fluor* 647<br>Alexa Fluor* 700<br>APC- Alexa Fluor™ 700<br>Cy™ 5<br>DRAQS™<br>eFluor™ 660 |
| | 750 nm LP | R2 | APC-Vio™ 770 | APC- Alexa Fluor™ 750<br>APC-Cy™ 7<br>APC-eFluor™ 780<br>APC-H7<br>Zombie NIR™ |

Fig. 15 (Continued)

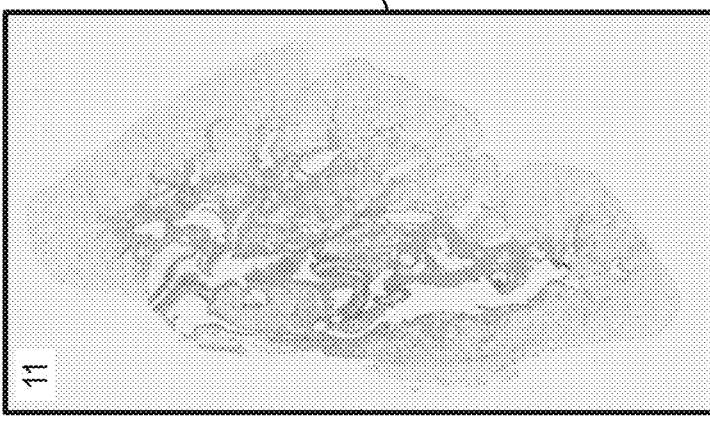

| Ashcroft scale | | Modified scale (Hübner et al. 2008) | |
|---|---|---|---|
| | | Alveolar septa: | Lung structure: |
| 5 | Increased fibrosis with definite damage to lung structure and formation of fibrous bands or small fibrous masses | Variable | Confluent fibrotic masses (>10% and ≤50% of microscopic field). Lung structure severely damaged but still perserved |
| 6 | | Variably, mostly not existent | Large contiguous fibrotic masses (>50% of microscopic field). Lung architecture mostly not perserved |
| 7 | Severe distortion of structure and large fibrous areas; incl. <<honeycomb lung>> | Non-existent | Alveoli nearly obliterated with fibrous masses but still up to five air bubbles |

Fig. 28

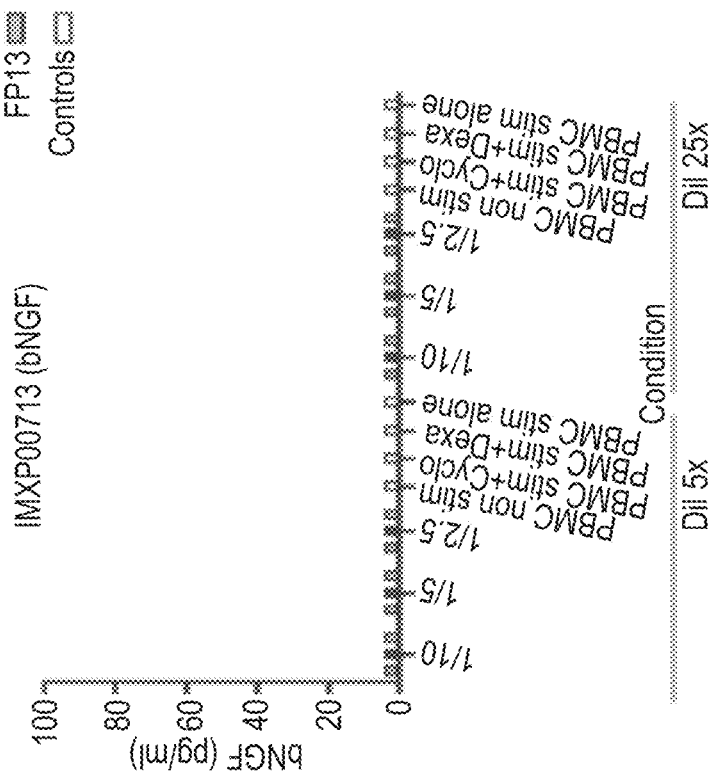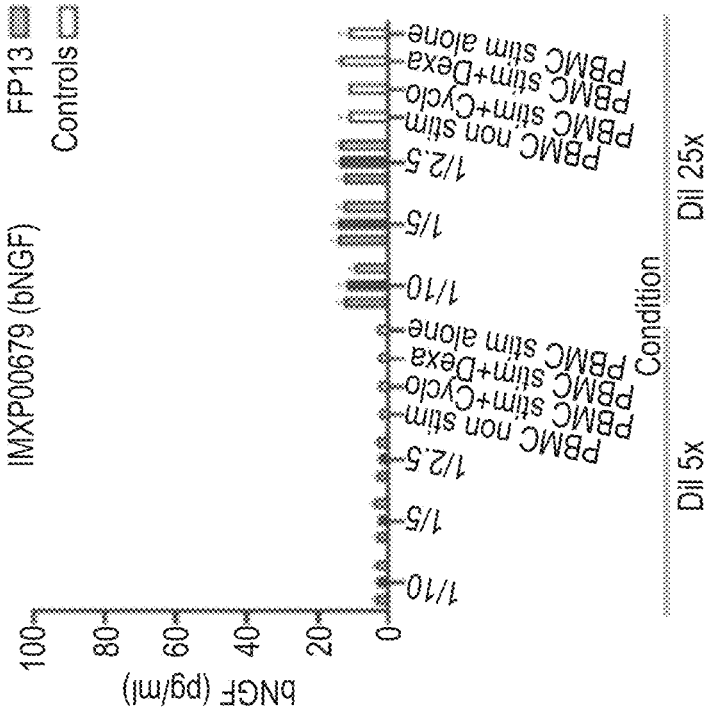
Fig. 59

IMMUNOMODULATION BY AMNIOTIC FLUID MESENCHYMAL STEM CELLS

BACKGROUND

Field of the Invention

Methods of reducing T cell activation, inhibiting macrophage polarization and inhibiting cytokine secretion from activated Peripheral Blood Mononuclear Cell (PBMC) comprising co-culturing term amniotic fluid mesenchymal stem cells (TAF-MSCs) isolated from human amniotic fluid with PB MC.

Description of the Related Art

Mesenchymal stem cells (MSCs) are a population of multipotent stem/progenitor cells that can differentiate to different lineages under defined conditions in vitro and in some situations after implantation in vivo. They are commonly referred to as mesenchymal stem cells, multipotent stromal cells, mesenchymal stromal cells, and mesenchymal progenitor cells. MSCs have anti-inflammatory and immune-modulatory properties and the properties of cultured MSCs in vitro suggest they can have broader applications. MSCs have the capacity to differentiate along mesodermal cell lines, including into adipocytes, osteoblasts, and chondrocytes (Djouad F. et al. 2009 Nat. Rev. Rheumatol. 5: 392-399; Pak J. 2011 J. Med. Case 5:296; and Kuroda R. et al. 2007 Osteoarthr. Cartil. 15: 226-31).

Human amniotic fluid cells are immune-privileged with low immunogenicity and anti-inflammatory properties. These cells are able to self-renew, are highly proliferative, and have a broad differentiation potential, making them amenable for cell-based therapies. Amniotic fluid is routinely obtained via amniocentesis and contains heterogeneous populations of fetal-derived progenitor cells, including mesenchymal stem cells (MSCs). The therapeutic potential and in vitro characterization of human amniotic fluid-derived stem cells (AFSCs) has been reported (De Coppi, P. et al. Nat Biotechnology 2007 25(1):100-6). A subpopulation of AFSCs with mesenchymal characteristics may be isolated from second and third-trimester amniotic fluid (AF) and are referred to as amniotic fluid mesenchymal stem cells (AF-MSCs).

SUMMARY

We disclose the isolation and characterization of human tissue-typed, Term Amniotic Fluid Mesenchymal Stem Cells (TAF-MSCs) from amniotic fluid, collected during or at the end of the third trimester. We disclose methods of reducing T Cell activation in human tissue using the TAF-MSCs. TAF-MSCs reduce T cell activation and/or change macrophage activation/polarization in human tissue, including lung, kidney, skin, intestinal and neural tissues. Immunomodulatory properties of TAF-MSC include inhibition of activated PBMC cytokine secretion, inhibition of T-lymphocyte activation and inhibition of macrophage polarization toward the M1 "pro-inflammatory" phenotype. These properties of TAF-MSCs provide a basis for the following aspects. Certain cell types disclosed herein, such as TAF-MSCs, Lung MSCs, Kidney MSCs, Skin MSCs, and/or Neural MSCs may be isolated and used via methods described herein to reduce T cell activation and/or change macrophage activation/polarization in human tissue.

Some aspects relate to a method of reducing T cell activation including co-culturing with T cells, term amniotic fluid mesenchymal stem cells (TAF-MSCs) isolated from term human amniotic fluid, wherein activation of T cells is reduced compared to T cells that are not co-cultured with the TAF-MSCs.

In some examples, the T cells are in a human tissue.

In some examples, the human tissue is treated ex vivo.

In some examples, the human tissue is treated in vivo.

In some examples, an expression level of activated T helper cells activation is reduced.

In some examples, an expression level of activated cytotoxic T cells activation is reduced.

In some examples, the TAF-MSCs are differentiated to a phenotype selected from the group consisting of lung, kidney, skin, neural, intestinal, adipose, bone and cartilage.

In some examples, the TAF-MSCs are isolated from amniotic fluid collected during the third trimester of pregnancy or after birth.

In some examples, the TAF-MSCs have a diameter of from 10-30 µm.

Some aspects relate to a method of inhibiting macrophage polarization toward the M1 pro-inflammatory phenotype including co-culturing with macrophages, tissue-typed, term amniotic fluid mesenchymal stem cells (TAF-MSCs) isolated from term human amniotic fluid, wherein stimulation of macrophage polarization toward the M1 pro-inflammatory phenotype is increased compared to control macrophages that are not co-cultured with the TAF-MSCs.

In some examples, the macrophages are in a human tissue.

In some examples, the human tissue is treated ex vivo.

In some examples, the human tissue is treated in vivo.

In some examples, the TAF-MSCs are differentiated to a phenotype selected from the group consisting of lung, kidney, skin, neural, intestinal, adipose, bone and cartilage.

In some examples, the TAF-MSCs are isolated from amniotic fluid collected during the third trimester of pregnancy or after birth.

Some aspects relate to a method of inhibiting cytokine secretion from activated Peripheral Blood Mononuclear Cell (PBMC) including co-culturing with the PBMC tissue-typed, term amniotic fluid mesenchymal stem cells (TAF-MSCs) isolated from human amniotic fluid, wherein cytokine secretion from the activated PBMC is reduced compared to a level of cytokine secretion by control PBMC that is not co-cultured with the TAF-MSCs.

In some examples, the PBMCs are in a human tissue.

In some examples, the human tissue is treated ex vivo.

In some examples, the human tissue is treated in vivo.

In some examples, the TAF-MSCs are differentiated to a phenotype selected from the group consisting of lung, kidney, skin, neural, intestinal, adipose, bone and cartilage.

In some examples, the TAF-MSCs are isolated from amniotic fluid collected during the third trimester of pregnancy or after birth.

Some aspects relate to a method of differentiating TAF-MSC including:
  obtaining TAF-MSC cells from term amniotic fluid,
  plating the TAF-MSC cells in limiting dilution to obtain expanded colonies from single cells, and
  transferring the cells to a differentiation media that contains one or more factor to differentiate the TAF-MSC cells.

In some examples, the TAF-MSC cells are differentiated to a phenotype selected from the group consisting of lung, kidney, skin, neural, intestinal, adipose, bone and cartilage.

In some examples, the TAF-MSCs inhibit lung fibrosis.

In some examples of the preceding aspects, the TAF MSCs are selected on the basis that they express at least one Group A surface marker selected from the group consisting of TBC1 domain family member 3K, allograft inflammatory factor 1 like, cadherin related family member 1, sodium/potassium transporting ATPase interacting 4, ATP binding cassette subfamily B member 1, plasmalemma vesicle associated protein, mesothelin, L1 cell adhesion molecule, hepatitis A virus cellular receptor 1, mal, T cell differentiation protein 2 (gene/pseudogene), SLAM family member 7, double C2 domain beta, endothelial cell adhesion molecule, gamma-aminobutyric acid type A receptor beta1 subunit, cadherin 16, immunoglobulin superfamily member 3, desmocollin 3, regulator of hemoglobinization and erythroid cell expansion, potassium voltage-gated channel interacting protein 1, CD70 molecule, GDNF family receptor alpha 1, crumbs cell polarity complex component 3, claudin 1, novel transcript sodium voltage-gated channel alpha subunit 5, fibroblast growth factor receptor 4, potassium two pore domain channel subfamily K member 3, dysferlin, ephrin A1, potassium inwardly rectifying channel subfamily J member 16, membrane associated ring-CH-type finger 1, synaptotagmin like 1, calsyntenin 2, integrin subunit beta 4, vesicle associated membrane protein 8, G protein-coupled receptor class C group 5 member C, CD24 molecule, cadherin EGF LAG seven-pass G-type receptor 2, cadherin 8, glutamate receptor interacting protein 1, dematin actin binding protein, F11 receptor, cell adhesion molecule 1, cadherin 6, coagulation factor II thrombin receptor like 2, LY6/PLAUR domain containing 1, solute carrier family 6 member 6, desmoglein 2, adhesion G protein-coupled receptor G1, cholecystokinin A receptor, oxytocin receptor, integrin subunit alpha 3, adhesion molecule with Ig like domain 2, cadherin EGF LAG seven-pass G-type receptor 1, and EPH receptor B2, thereby obtaining the TAF MSCs.

In some examples, the TAF MSCs are selected on the basis that they have a reduced expression of markers selected from the group consisting of IL13RA2, CLU, TMEM119, CEMIP, LSP1, GPNMB, FAP, CRLF1, MME, CLMP, BGN, DDR2.

In some examples, the TAF MSCs are selected on the basis that they express at least one Group B surface marker selected from the group consisting of PCDH19, DDR1, MME, IFITM10, BGN, NOTCH3, SULF1, TNFSF18, BDKRB1, FLT1, PDGFRA, TNFSF4, UNC5B, FAP, CASP1, CD248, DDR2, PCDH18, LRRC38, and CRLF1, thereby defining TAF lung mesenchymal stem cells.

In some examples, the lung TAF MSCs are selected on the basis of excluding MSCs that express a marker selected from the group consisting of CD24, ITGB4, TNFSF10, GFRA1, CD74, FGFR4, HAVCR1, and OSCAR.

In some examples, the TAF-MSCs are TAF kidney MSCs based on their expression of at least one Group C surface marker selected from the group consisting of HAVCR1, CD24, CLDN6, ABCB1, SHISA9, CRB3, AC118754.1, ITGB6, CDH1, LSR, EPCAM, AJAP1, ANO9, CLDN7, EFNA1, MAL2, F11R, L1CAM, GFRA1, IGSF3, TNF, MMP7, FOLR1, TGFA, C3, TNFSF10, PDGFB and WWC1.

In some examples, the TAF-MSCs are TAF skin MSCs based on their expression of at least one Group D surface marker selected from the group consisting of TNFSF18, PCDH19, NCAM2, TNFSF4, CD248, DDR2, HTR2B, PCDH18, SULF1, MME, ADGRA2, DCSTAMP, PDGFRA, UNC5B, SCUBE3, CEMIP, BDKRB1, FLT1, BDKRB2, FAP, CASP1, and SRPX2.

In some examples, the TAF-MSCs are TAF neuronal MSCs based on their expression of at least one Group E surface marker selected from the group consisting of HAVCR1, ACKR3, OSCAR, C3, SIRPB1, SLC6A6, CCKAR, TNFSF10, CLSTN2, TENM2, SFRP1, PIK3IP1, SCNN1D, CLDN11, ALDH3B1 and ITGB4.

In some examples, the TAF MSCs are TAF lung MSCs based on their expression of CD248.

In some examples, the TAF-MSCs are TAF skin MSCs based on their expression of MME.

In some examples, the TAF-MSCs are TAF neuronal MSCs based on their expression of OSCAR.

BRIEF DESCRIPTION OF THE DRAWINGS

FIG. 11 illustrates example immunomodulation properties of TAF-MSCs-Inhibition of macrophage polarization toward the M1 "pro-inflammatory" phenotype. Freshly isolated human Peripheral Blood Mononuclear Cells (PBMCs), pooled from three different donors, was activated with anti-CD3/anti-CD28 in presence of MSCs ex vivo for 24 hours. Following activation, cells (PBMCs) were analyzed for effects on cellular composition.

FIG. 28 Provides an explanation of an example of fibrosis scoring—Example: Animal #11 & Animal #26 (Masson trichrome).

FIG. 59 provides an example of NGF secretion in the suppressive assay. 3 stem cell-derived products, CS26Rp6, CS25Rp6 and FP13, were evaluated at three ratios (1/10, 1/5 and 1/2.5). Data represent Mean+SEM. N=3.

DETAILED DESCRIPTION

Tissue-Typed Term Amniotic Fluid (TAF) MSCs for Advanced Therapy Medicinal Products (ATMP) Production Term amniotic fluid is a previously unexploited reserve of mesenchymal stromal cells that may be reprogrammed and used in cell therapy applications. There is an increasing interest in exploring mesenchymal stem cells (MSCs) in disease modelling, pharmaceutical screening, and regenerative medicine. The quality of the MSCs is increasingly identified as a major factor for effective use in regenerative medicine applications. Neonatal MSCs are of increased quality compared to bone marrow or adipose tissue derived MSCs for cell therapy applications. Use of tissue relevant MSCs for increased compatibility provide better cells for the regenerative needs of diseased tissue. Term amniotic fluid (TAF)-MSCs are a promising and plentiful resource of MSCs with neonatal qualities and offer the possibility to sort out tissue specific cells.

The following steps may be taken to produce relevant TAF-MSCs for clinical trials: (a) collect starting material, (b) confirm identity of TAF cells as MSCs, (c) identify and select tissue-type relevant MSCs, (d) elucidate biological potency of relevant TAF-MSCs, and (e) produce relevant levels of TAF-MSCs for clinical trials. Examples of tissue-type relevant MSCs include but are not limited to lung, kidney, skin, neural, intestinal, adipose, bone and cartilage.

Figure 1:
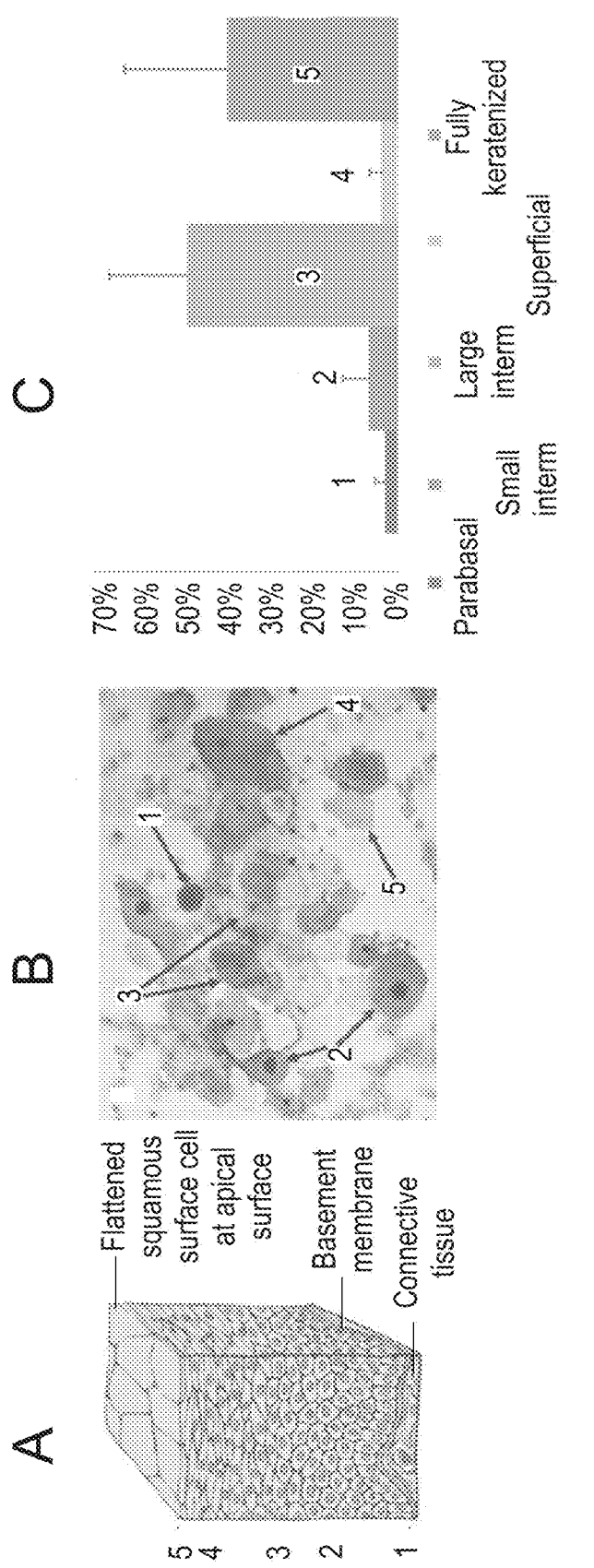
FIG. 1 provides example images and data showing: (A) Illustration of stratified squamous epithelia and the relative depth of tissue where different cell types can be found. (1) Parabasal cells, (2) small intermediate cells, (3) large intermediate cells, (4) superficial cells, and (5) fully keratinized cells. Basal cells and simple squamous epithelia can also originate in other epithelial tissue types (for example lung). (B) A May-Grünewald-Giemsa staining of a freshly filtered and centrifuged TAF sample undergoing further purification. (C) A diagram showing the composition of TAF purified cells and the frequency of various epithelial cell types that can be identified. Non-epithelial cells, such as MSCs, are identified as parabasal cells by this method.
Figure 2:
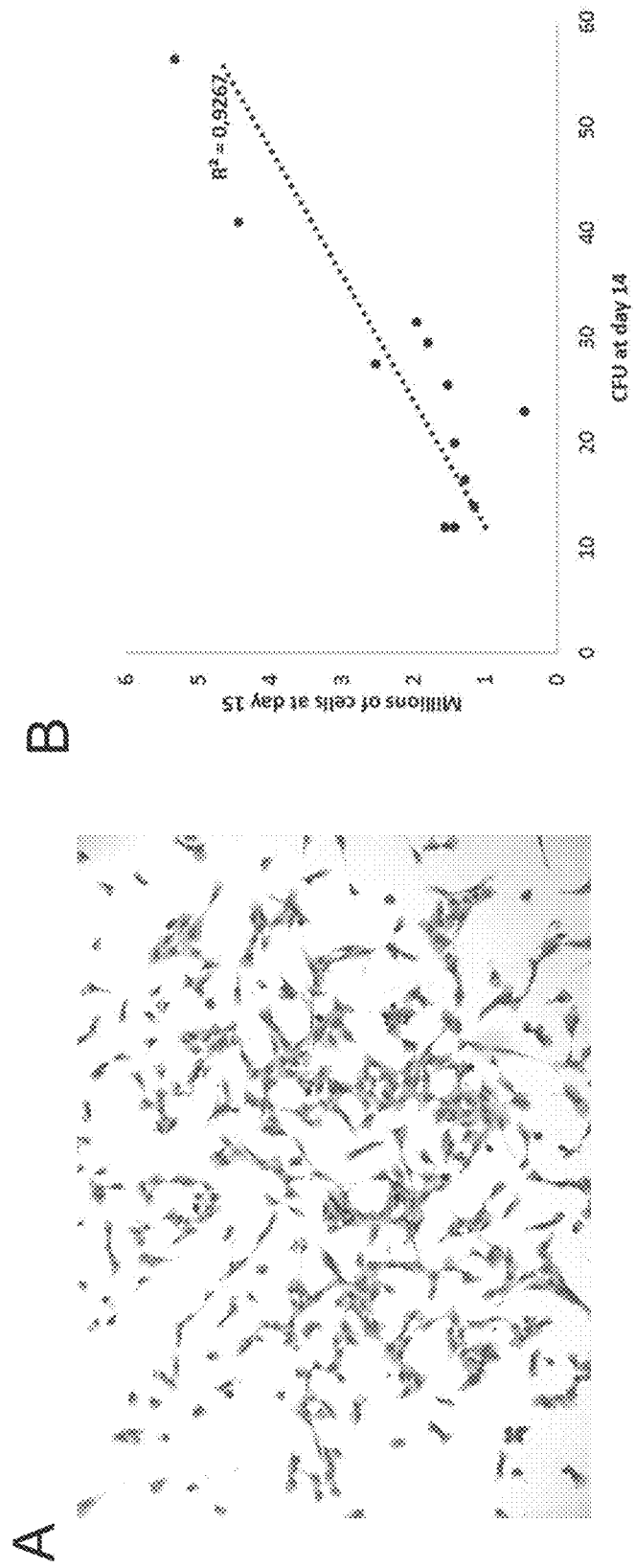
FIG. 2 provides example images and data showing characterization of starting material. (A) colony forming units (CFU) corresponds to cell number. (B) CFUs are a good measurement of the effectiveness of the TAF purification process and can be used as a surrogate for the number of cells obtained, since there is a good correlation between these two values.

Referring to FIG. 1, in some configurations, term amniotic fluid starting material may be characterized, illustrating stratified squamous epithelia and the relative depth of tissue where different cell types can be found. The number of cells obtained may be approximated by counting colony forming units (CFU), see FIG. 2.

Figure 3:
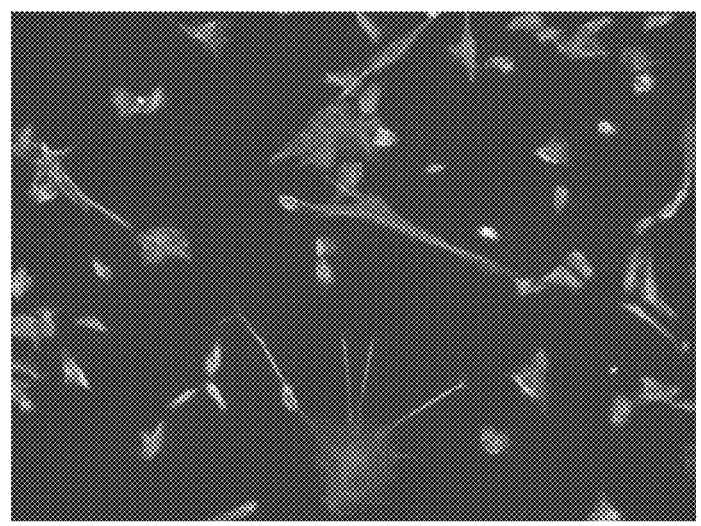
FIG. 3 provides an example image of TAF-MSCs by immunohistochemistry. Plastic adherent TAF-cells expressing the mesenchymal marker vimentin and the proliferation marker Ki-67. DAPI was used to stain all nuclei. Highly proliferative cells of mesenchymal origin with no contamination with epithelial or endothelial cells may be isolated from TAF.
Figure 4:
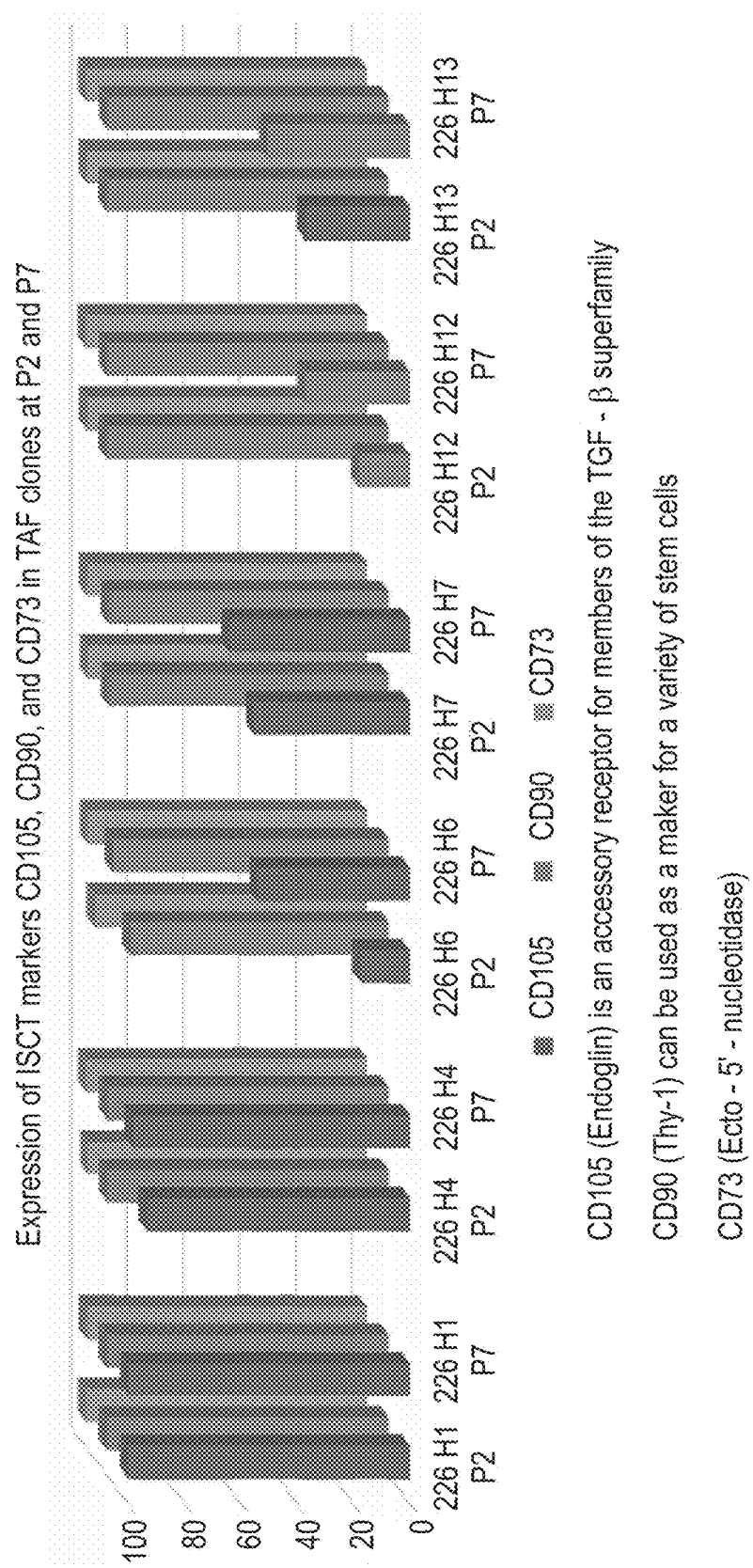
FIG. 4 provides example characterizations of TAF-MSC by flow cytometry. Minimal criteria for defining multipotent mesenchymal stromal cells—Expression of International Society for Cellular Therapy (ISCT) markers, CD105, CD90, and CD73 in TAF clones at P2 and P7.
Figure 5:
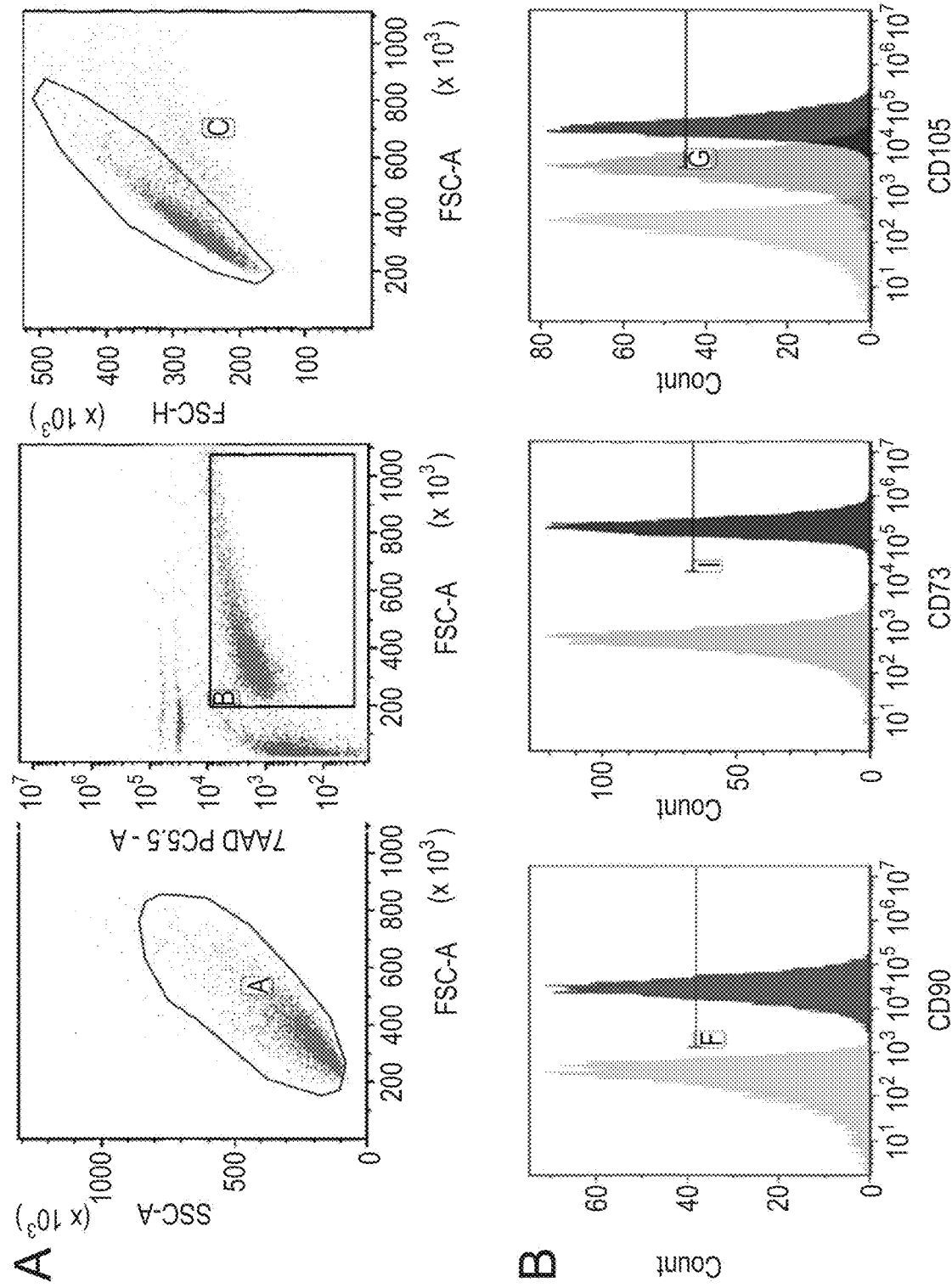
FIG. 5 provides example images and characterization of TAF-MSCs by flow cytometry showing representative plots of term amniotic fluid MSCs at passage 2. (A) Plots showing the gating procedure using side and forward scatter analysis, 7AAD non-viable cell exclusion, and doublet exclusion, respectively. (B) Plots showing the ISCT standard surface marker expression for MSCs using antibodies against CD73, CD90, CD105 (blue and purple histogram plots). The overlay of the FMO controls is shown in yellow. In the CD105 histogram plot, an additional representative term amniotic fluid sample is overlaid showing an intermediate level of CD105 expression.
Figure 6:
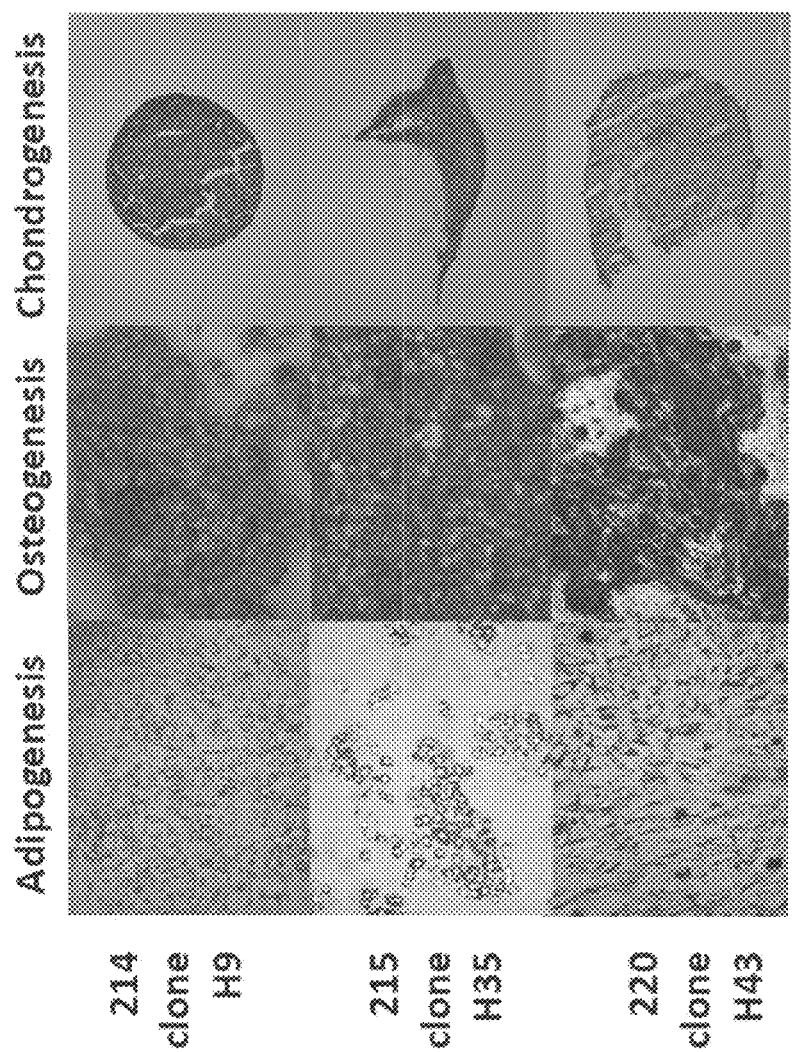
FIG. 6 provides example images and characterization of TAF-MSC by trilineage differentiation of individual clones. Freshly obtained TAF cells were plated in limiting dilution to obtain expanded colonies from single cells. At passage two, clones were transferred to differentiation media. Fourteen clones from three TAF samples were differentiated in conditions favoring adipogenic, osteogenic, and chondrogenic differentiation. All examined clones displayed trilineage differentiation as evidenced by Oil red 0, alizarin red, and alcian blue staining together with immunohistochemistry staining using an antibody directed against aggrecan (brown), indicating presence of true MSCs.
Figure 7:
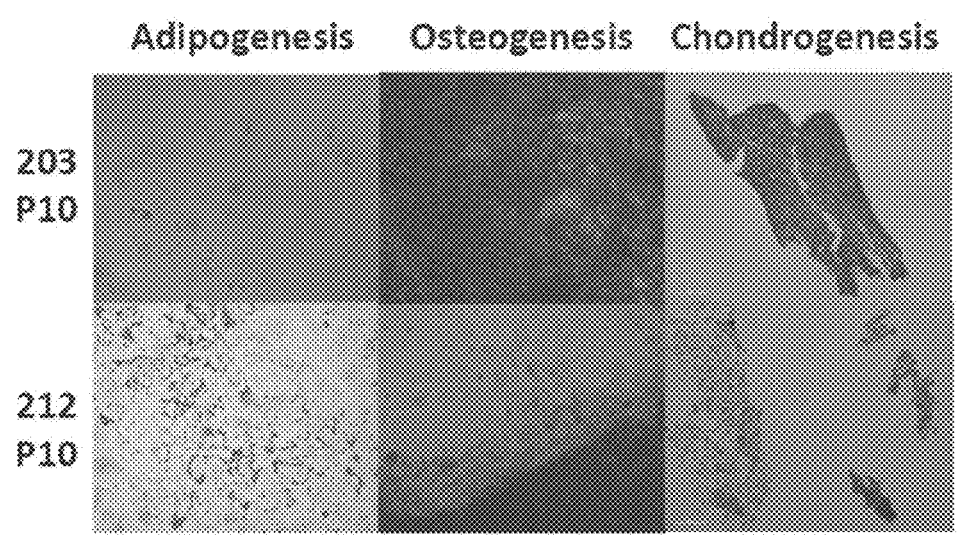
FIG. 7 provides example images and characterization of TAF-MSC by trilineage differentiation of high passage samples. Six high passage TAF-MSC samples were analyzed for their tri-lineage differentiation potential. All examined samples displayed tri-lineage differentiation at P9 or P10, as evidenced by Oil red 0, alizarin red, and alcian blue staining together with immunohistochemistry staining using an antibody directed against aggrecan (brown), indicating potency at high passage numbers.
Figure 8:
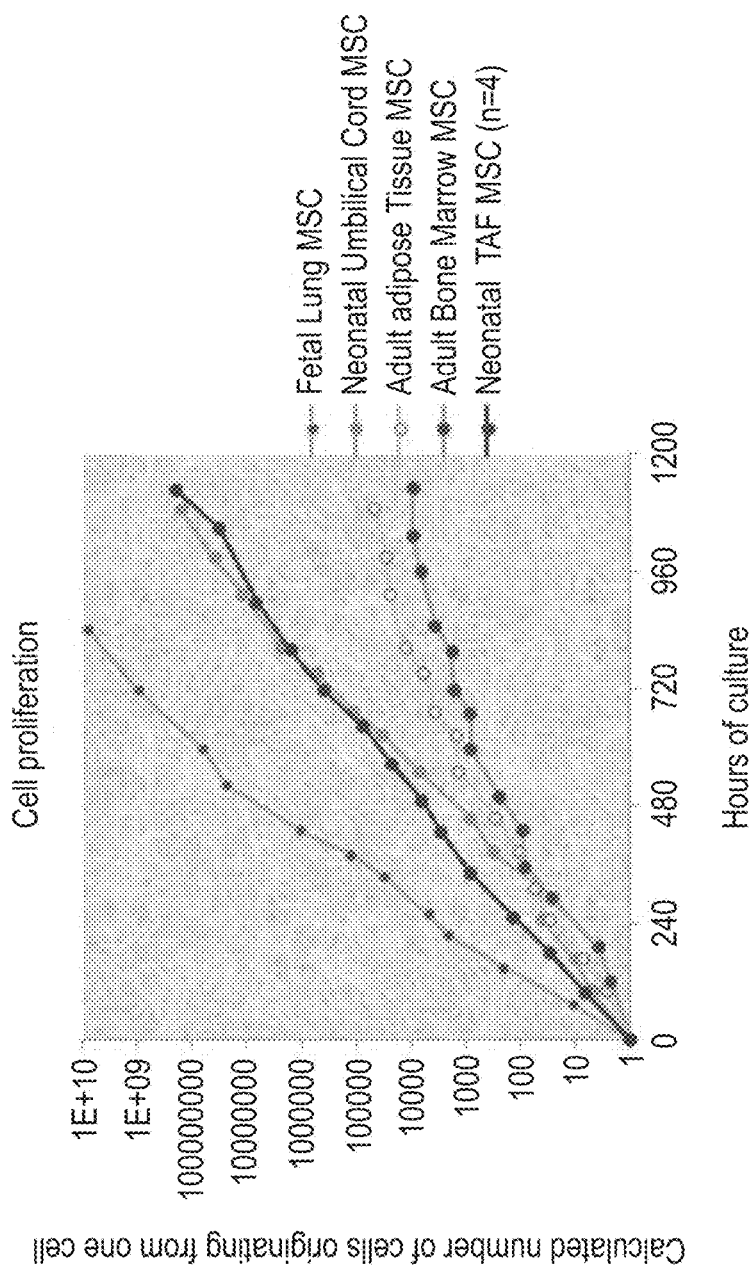
FIG. 8 provides example characterization of TAF-MSC by propagation potential. Commercially available MSCs and term amniotic fluid samples were thawed, propagated from P3 and onwards for at least 1 month. TAF-MSCs had growth rates intermediate to MSCs from fetal and adult sources and similar to MSCs from other neonatal sources. Total cell doublings possible was <17 for adult tissue derived MSCs and >30 for TAF-MSCs and neonatal MSCs, indicating the superior potential of the term amniotic fluid-derived cells compared to adult derived cells for industrial production of large quantities of cells for cell therapy purposes.
Figure 9:
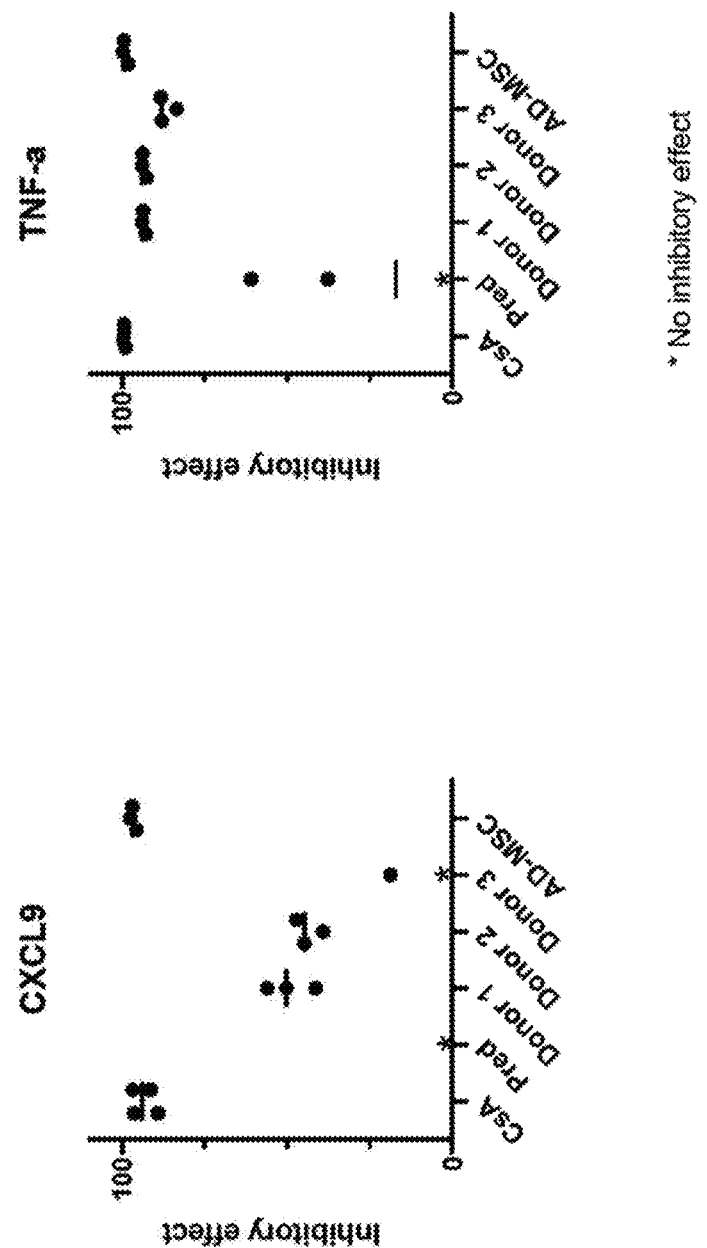
FIG. 9 illustrates example immunomodulation properties of TAF-MSCs-Inhibition of activated PBMC cytokine secretion. Freshly isolated human Peripheral Blood Mononuclear Cells (PBMCs) pooled from three different donors, was activated with anti-CD3/anti-CD28 in presence of MSCs ex vivo for 24 hours. Following activation, supernatants were analyzed for cytokine levels using Luminex.
Figure 10:
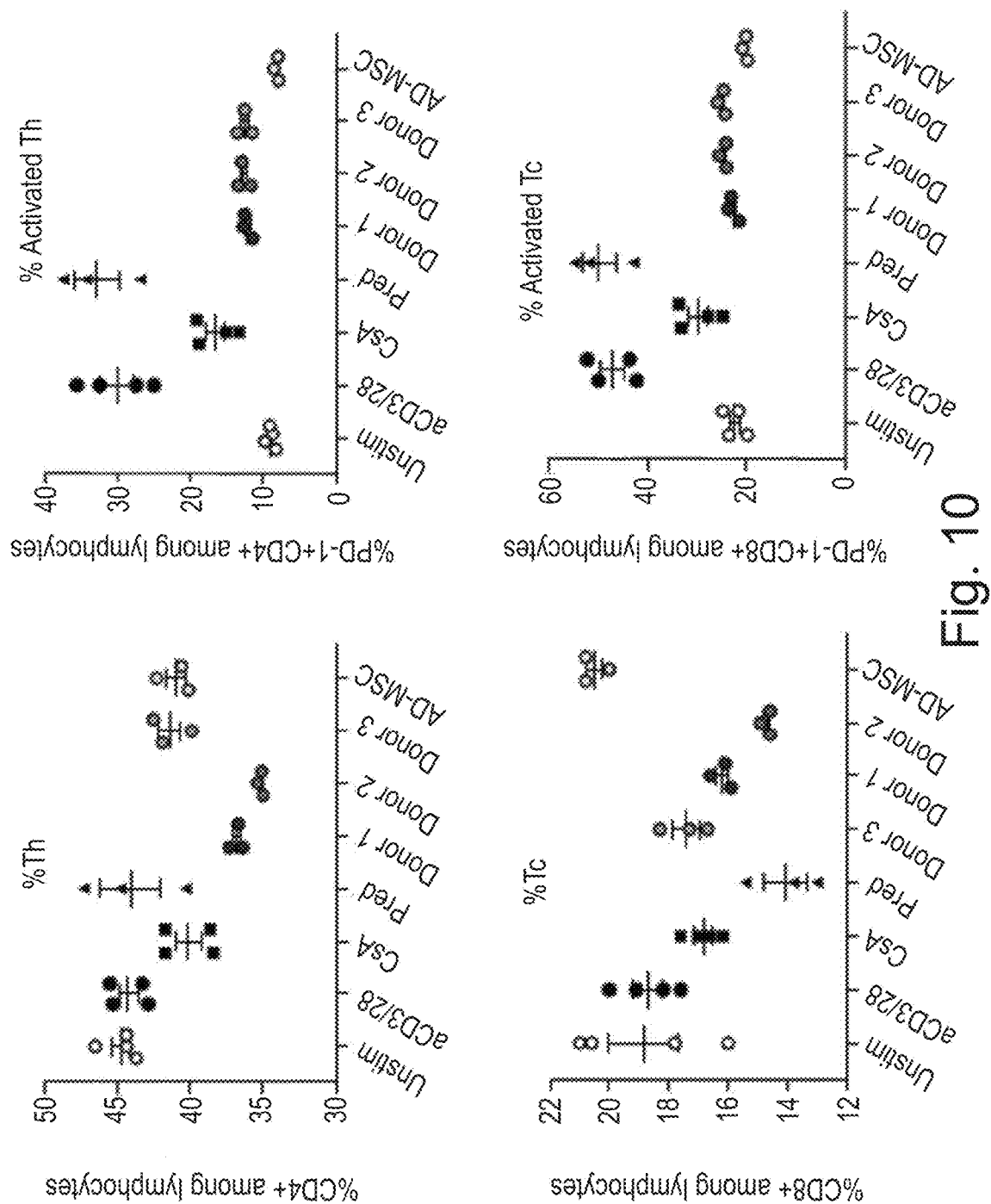
FIG. 10 illustrates example immunomodulation properties of TAF-MSCs-Inhibition of T-lymphocyte activation. Freshly isolated human Peripheral Blood Mononuclear Cells (PBMCs), pooled from three different donors, was activated with anti-CD3/anti-CD28 in presence of MSCs ex vivo for 24 hours. Following activation, cells (PBMCs) were analyzed for effects on cellular composition and activation state.
Figure 12:
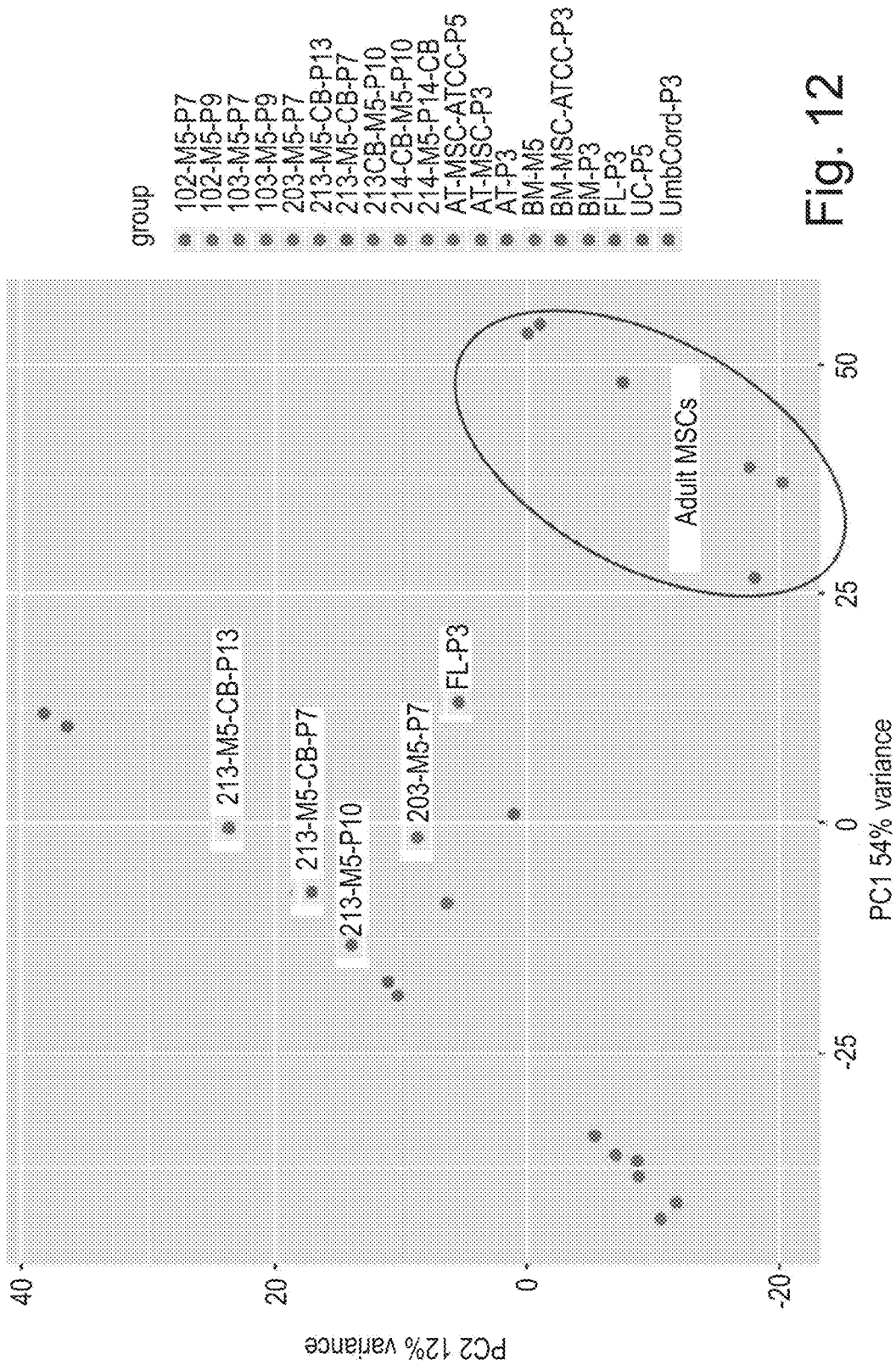
FIG. 12 provides example data showing characterization of TAF-MSCs by RNA sequencing, Principal component analysis. Principal component analysis of TAF-MSCs and commercially obtained MSCs from various tissue sources. Later passage TAF-MSC samples and MSCs obtained from adult bone marrow, adult adipose tissue, neonatal umbilical cord and fetal lung were plotted using mRNA expression of >8 000 genes (RNAseq). In this diagram, adult derived MSCs colocalized with each other, whereas TAFMSCs colocalized with fetal lung and umbilical cord derived MSCs.
Figure 13:
FIG. 13 shows a comparison of TAF-MSC clones of unknown identity with reference samples (e.g., skin, lung, kidney, etc.).
Figure 14:
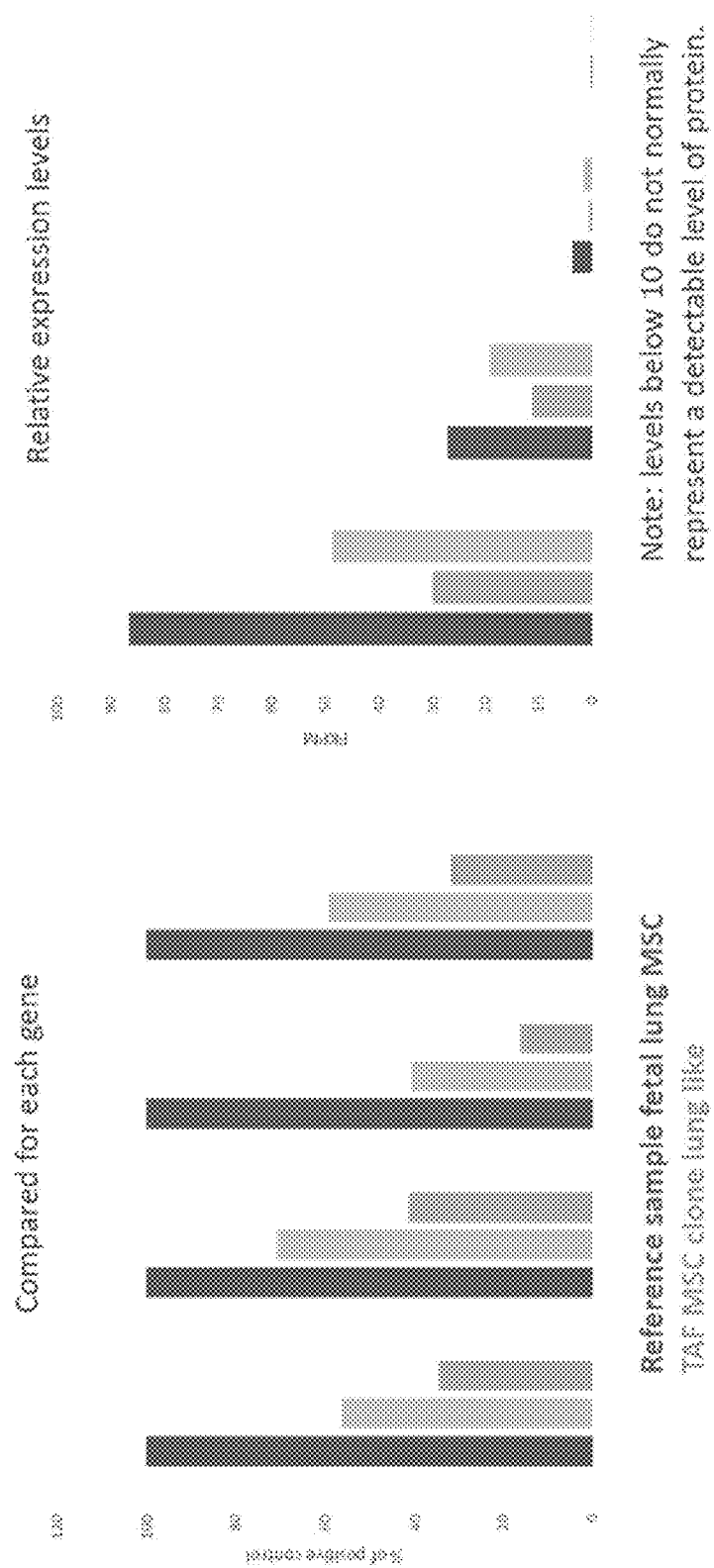
FIG. 14 provides example characterization of TAF-MSC using RNA sequencing. (A) Expression levels compared to reference samples from fetal lung MSCs for each gene. (B) Different gene relative expression levels compared to each other.
Figure 15:
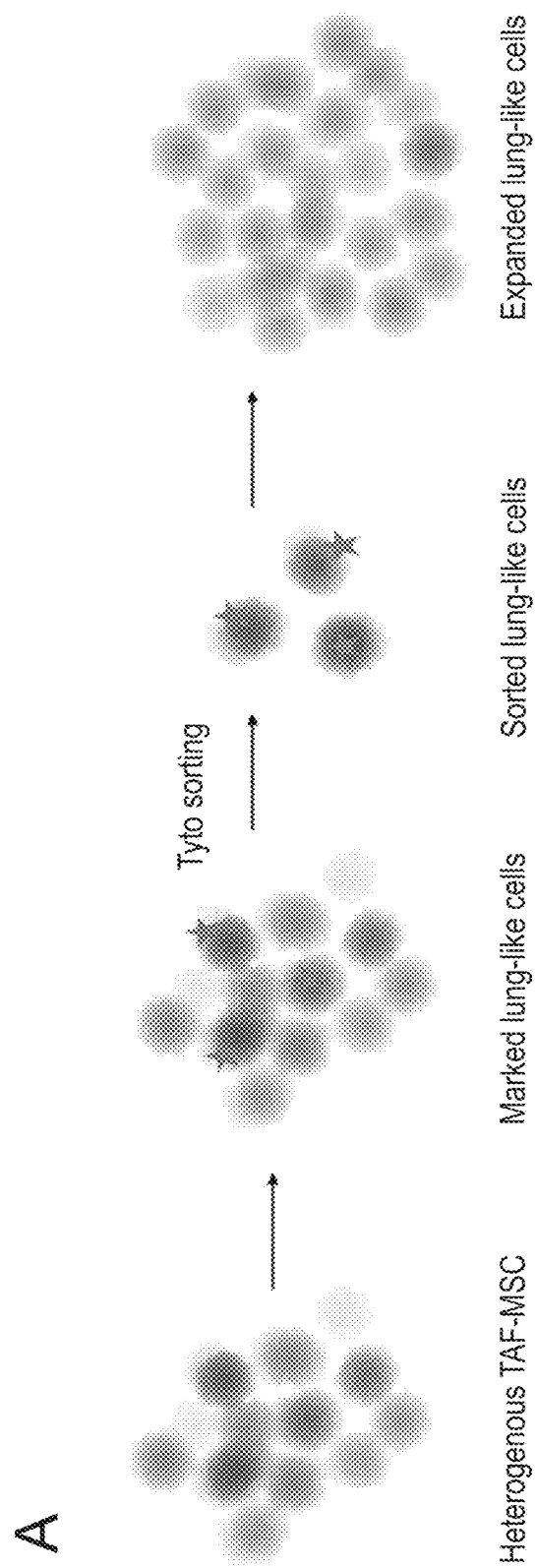
FIG. 15 provides an example diagram that exemplifies sorting of TAF-MSCs with lung characteristics. (A) Example sorting and expansion of lung-like cells. (B) Non-limiting examples of Cell Stains. (C) An example of data obtained by FACS analysis.
Figure 15:
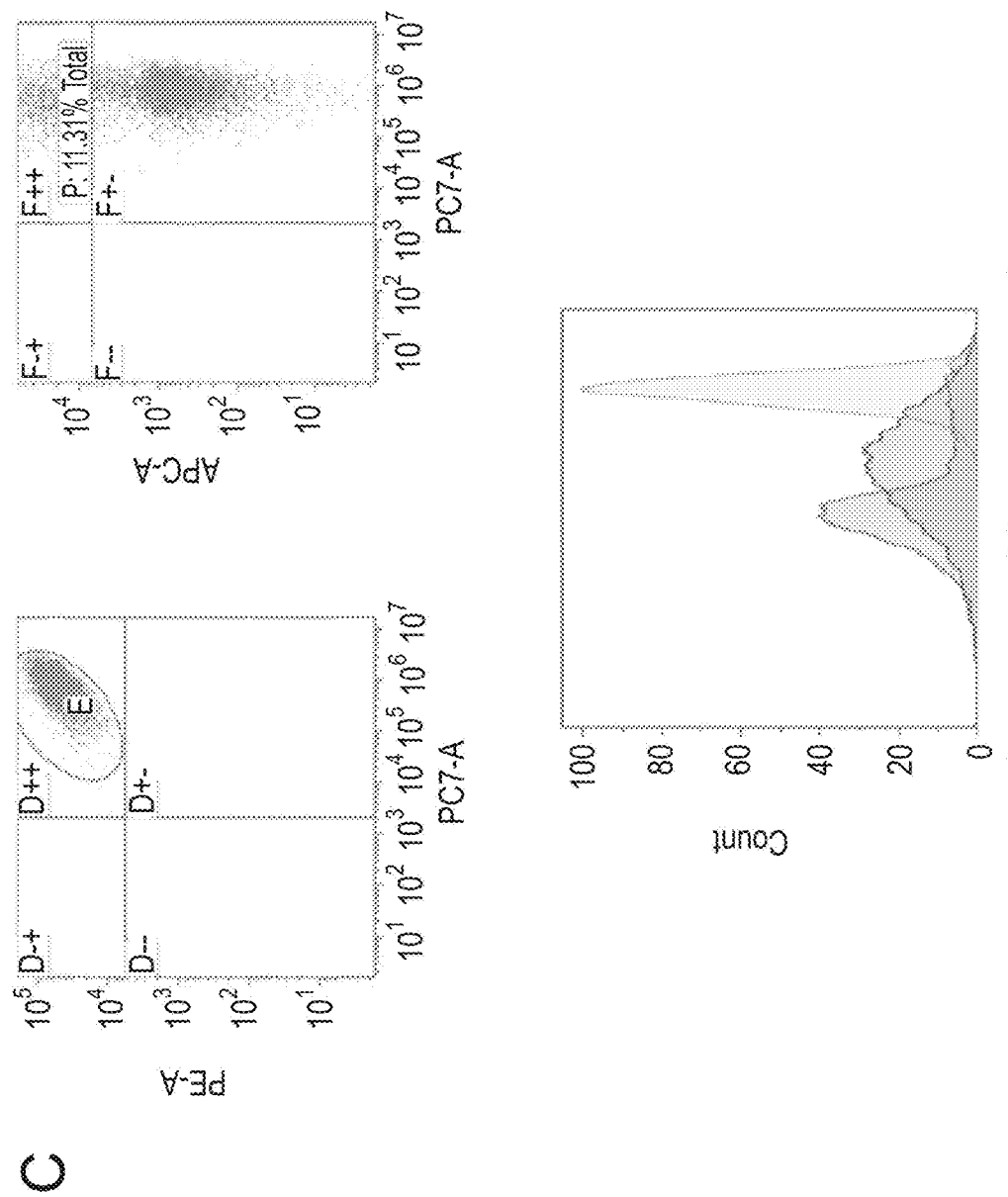

In some examples, TAF-MSCs may show absence of expression (<2% or <1%) according to ISCT Minimal Criteria in TAF clones at P2 and P7 for the following markers: CD34 (hematopoietic stem cell antigen), CD45 (leukocyte common antigen), CD11b (or CD 14) (macrophage-1 antigen, CD19 (or CD79a) (B-lymphocyte surface antigen), and/or HLA class II (human leukocyte antigen, found on antigen presenting cells). In certain examples, TAF-MSC clones may show absence of expression (<2% or <1%) for other cell types, such as E-cadherin (epithelial cadherin), CD309 (Flk-1, KDR, VEGFR-2, found on vascular endothelial cells). In some examples, the TAF-MSCs were characterized by immunohistochemistry (FIG. 3), flow cytometry (FIG. 4 and FIG. 5), differentiation potential (FIG. 6 and FIG. 7), propagation potential (FIG. 8), inhibition of activated PBMC cytokine secretion (FIG. 9), inhibition of T-lymphocyte activation (FIG. 10), inhibition of macrophage polarization toward the M1 "pro-inflammatory" phenotype (FIG. 11), RNA sequencing and principal component analysis (FIG. 12, FIG. 13 and FIG. 14) and sorting of TAF-MSCs based on differentiated phenotype, e.g., lung-like cells (FIG. 15). Differentiated TAF-MSCs may be sorted and proliferated, for example based on lung, kidney, skin, neural, intestinal, adipose, bone and cartilage markers and/or phenotypes as described below.

Figure 16:
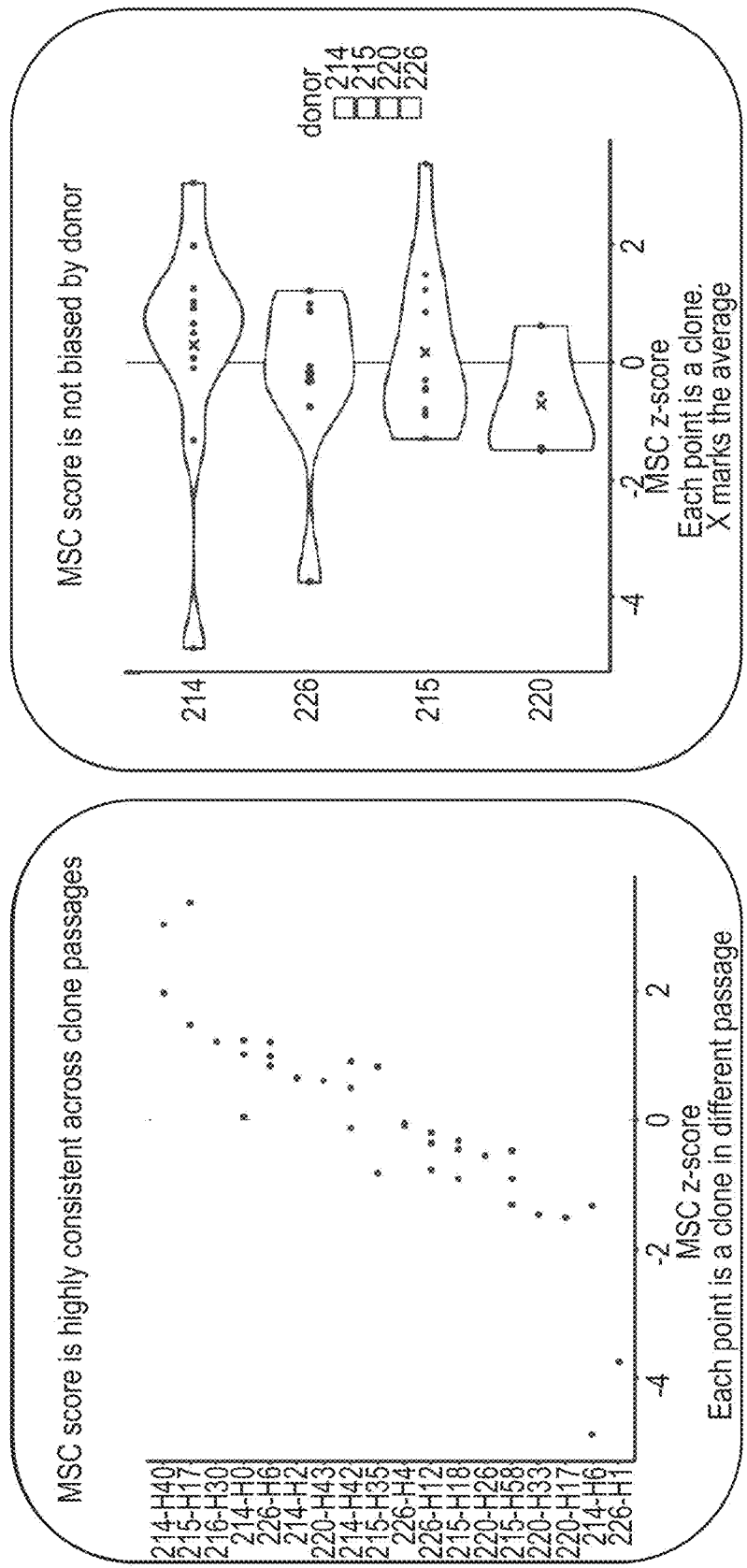
FIG. 16 provides example data showing how identity of a subpopulation of TAF-MSCs as tissue-relevant MSCs may be determined by bioinformatics analysis.
Figure 17:
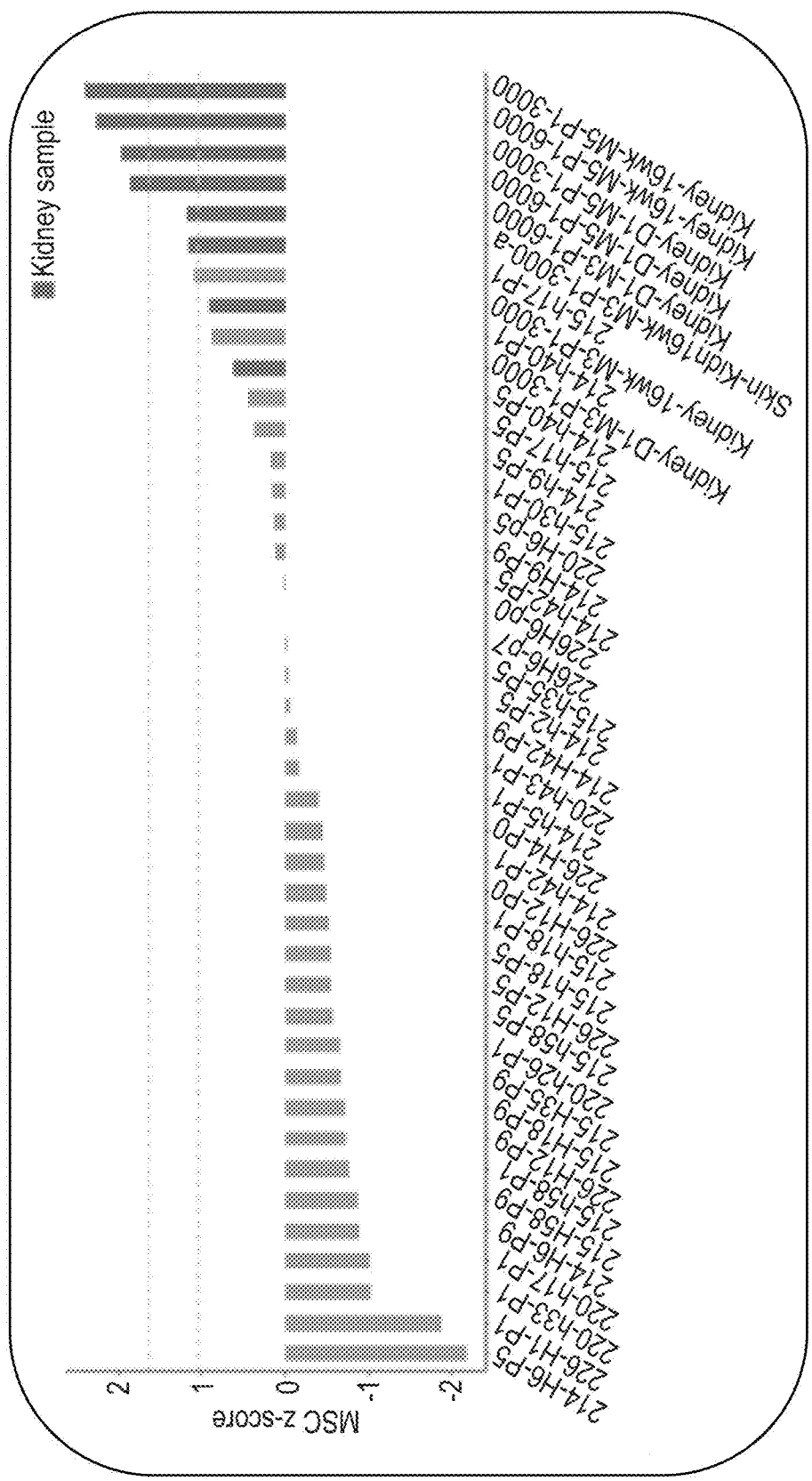
FIG. 17 provides example data showing identification of a subpopulation of TAF-MSCs as kidney relevant MSCs by bioinformatics analysis.
Figure 18:
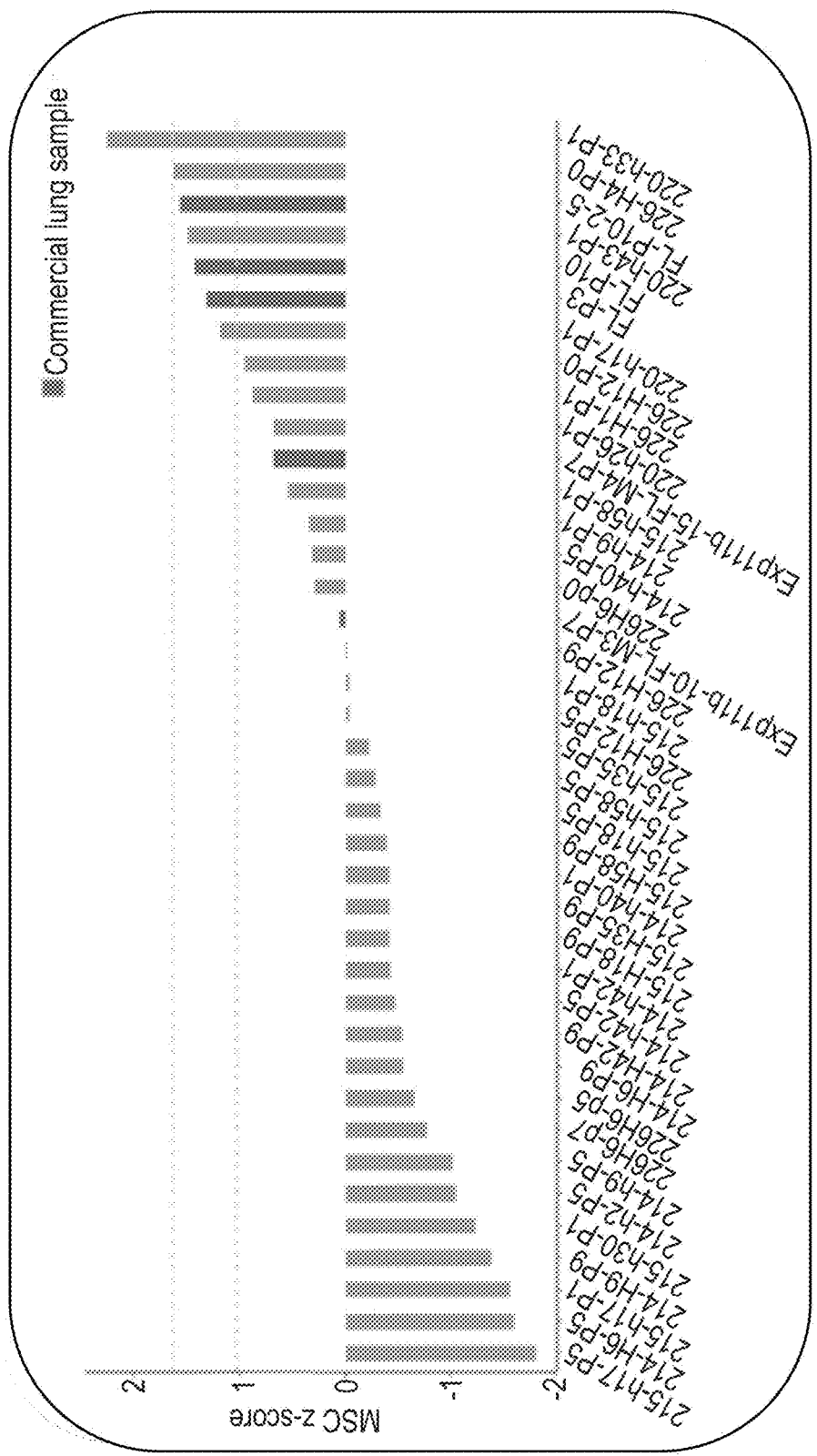
FIG. 18 provides example data showing identification of a subpopulation of TAF-MSCs as lung-relevant MSCs by bioinformatics analysis.
Figure 19:
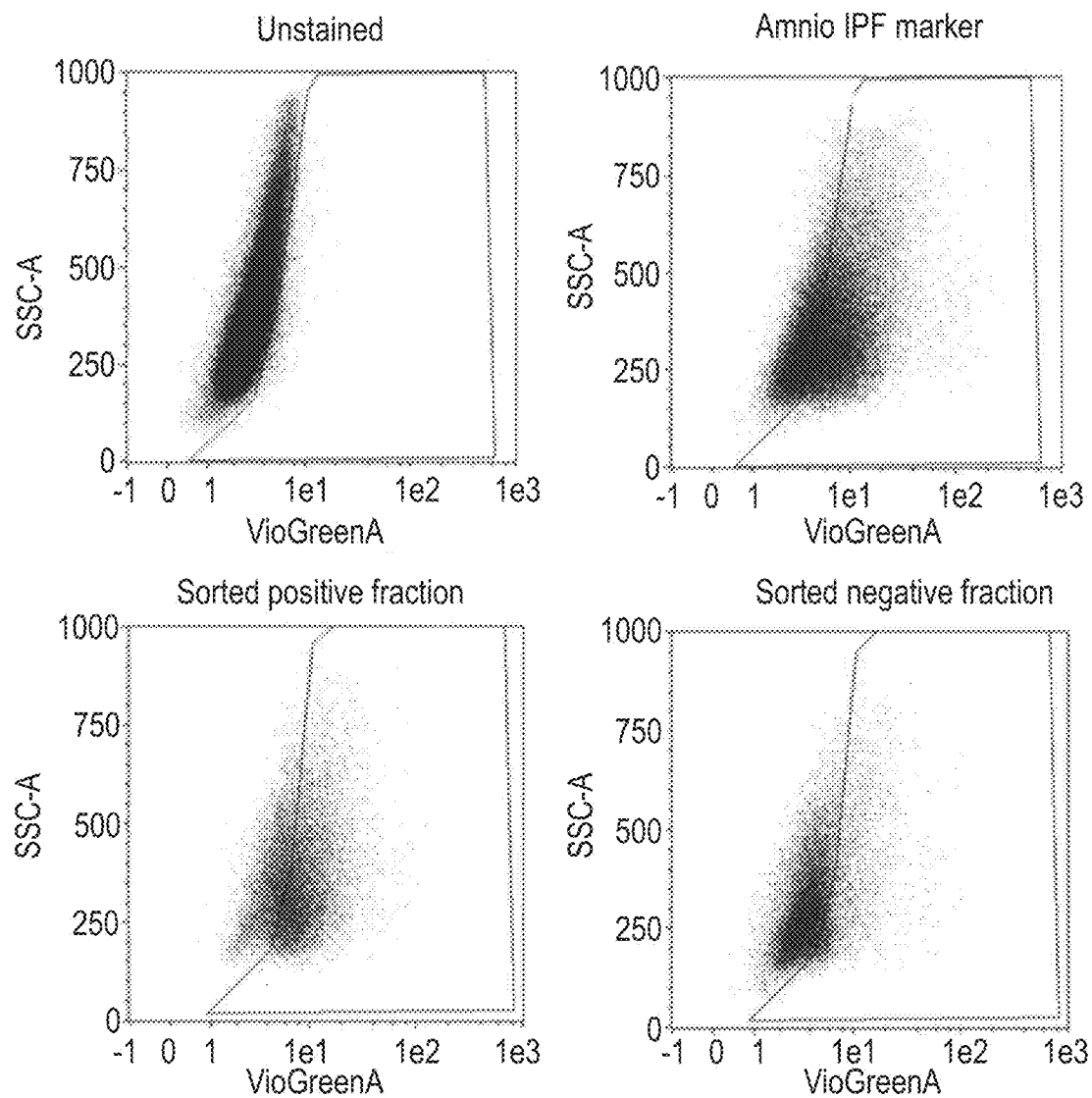
FIG. 19 provides example data showing FACS sorting of lung-relevant TAF-MSCs.
Figure 20:
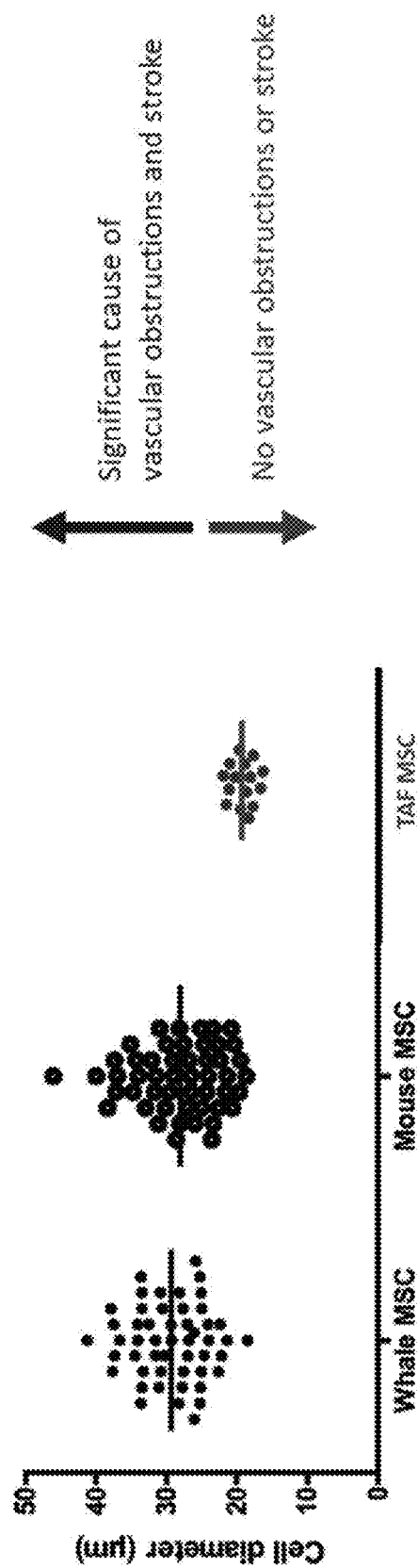
FIG. 20 illustrates example determination of suitability of TAF-MSCs for intravenous (i.v.) injection into patients by size (Hoogduijn M J et al. BMJ 2013; 347; and Ge J, et al. Stem Cell Rev Rep. 2014:295-303).

Referring to FIG. 16, in some examples, subpopulations of tissue-relevant TAF-MScs can be identified by bioinformatics analysis. FIG. 17 and FIG. 18 show samples that are kidney- and lung-relevant, respectively. Tissue-type-relevant MSCs can be sorted using fluorescence-activated cell sorting (FACS) analysis (FIG. 19). The suitability of TAF-MSCs for i.v. injection into patients can be evaluated on the basis of cell diameter and the likelihood for no vascular obstructions or stroke (FIG. 20). In some embodiments, the TAF-MSCs used for therapeutic treatment vary in size having diameters of from 10-30 μm, including diameters of about: 10 μm, 11 μm, 12 μm, 13 μm, 14 μm, 15 μm, 16 μm, 17 μm, 18 μm, 19 μm, 20 μm, 21 μm, 22 μm, 23 μm, μm, 24 μm, 25 μm, 26 μm, 27 μm, 28 μm, 29 μm and 30 μm.

Human pregnancy typically lasts for about 280 days or 40 weeks. The second trimester is from weeks 13 to 27, and the third trimester starts about 28 weeks and lasts until birth. A preterm or premature baby is delivered before 37 weeks of a pregnancy. Extremely preterm infants are born 23 through 28 weeks. Moderately preterm infants are born between 29 and 33 weeks.

In some examples, the TAF-MSCs are isolated from amniotic fluid collected during the third trimester of pregnancy or following birth. For example, the TAF-MSCs may be harvested and isolated from amniotic fluid at about 28, 29, 30, 31, 32, 33, 34, 35, 36, 37, 38, 39, 40, 41, 42, 43, 44, or 45 weeks of pregnancy, or after birth.

Use of Mesenchymal Stem Cells (MSCs) for Reducing T Cell Activation

Figure 21:
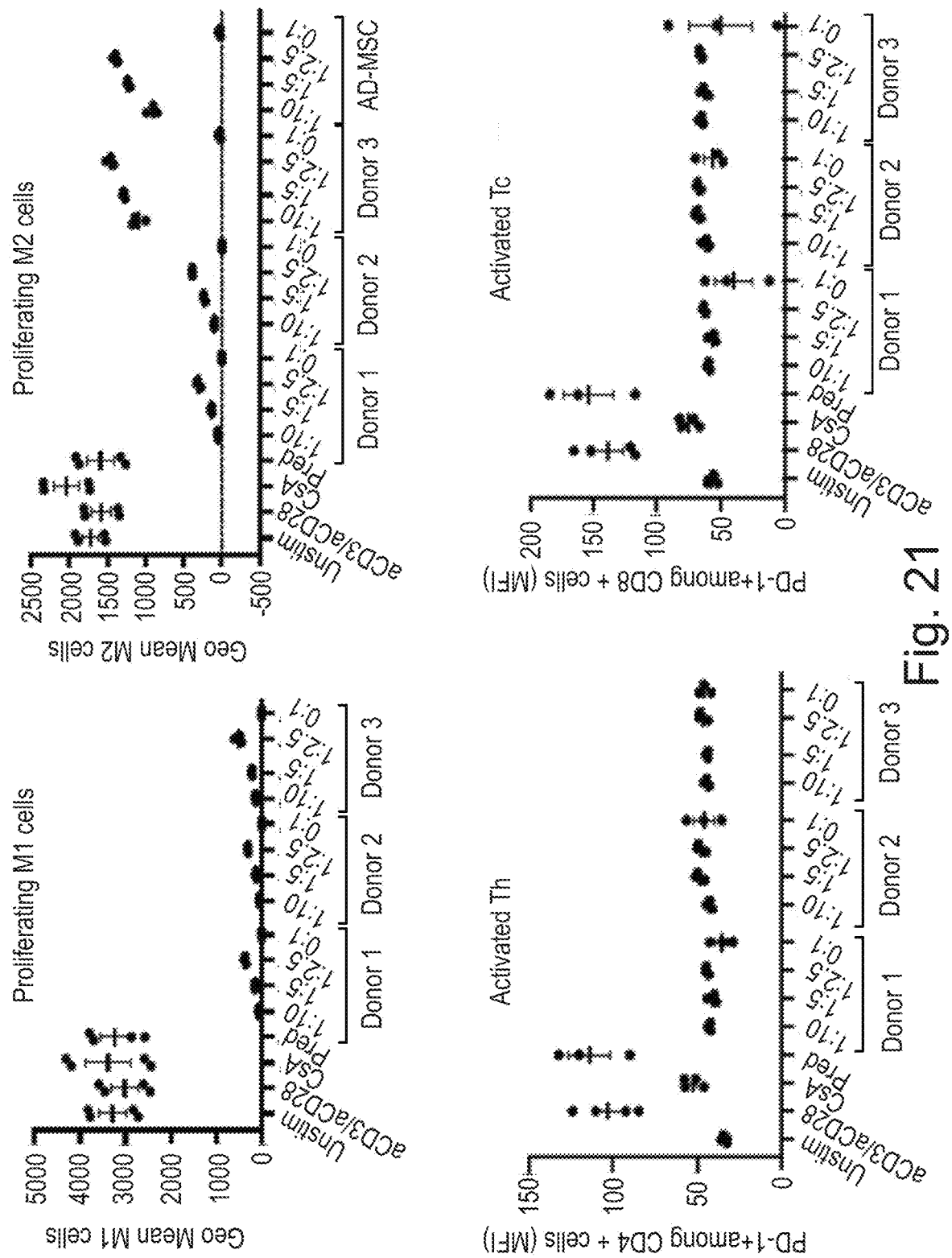
FIG. 21 provides example data showing potency of TAF-MSCs by inhibition of macrophage and T cell activation. Freshly isolated human PBMCs, pooled from three donors, were activated with anti-CD3/anti-CD28 at 10 µg/ml and 5 µg/ml respectively in presence of TAF-MSCs. Following activation, cells were analyzed for effects on cellular composition and cell proliferation using CFSE after 72 hours. Both M1 (CD80+) and M2 (CD163+, CD206+) macrophage proliferation (CFSE) was inhibited by TAF-MSCs. Both T helper (CD4+) and T cytotoxic (CD8+) cell activation (PD-1+) was inhibited by TAF-MSCs.

In some examples, TAF-MSCs may be used to inhibit T-lymphocyte activation in vitro (FIG. 10), ex vivo and in vivo. TAF-MSCs exhibiting tissue-type differentiation, including but not limited to lung, kidney, skin, neural, intestinal, adipose, bone and cartilage phenotypes, may be used for reducing T cell activation. In some examples, potency of TAF-MSC may be evaluated on the basis of inhibition of macrophage and T-cell activation, as shown in FIG. 21. Identification and isolation of such tissue-specific TAF-MSCs (Lung MSCs, Kidney MSCs, Skin MSCs, and/or Neural MSCs) are described in greater detail below.

Methods of Changing Macrophage Activation/Polarization in Human Tissue

Figure 22:
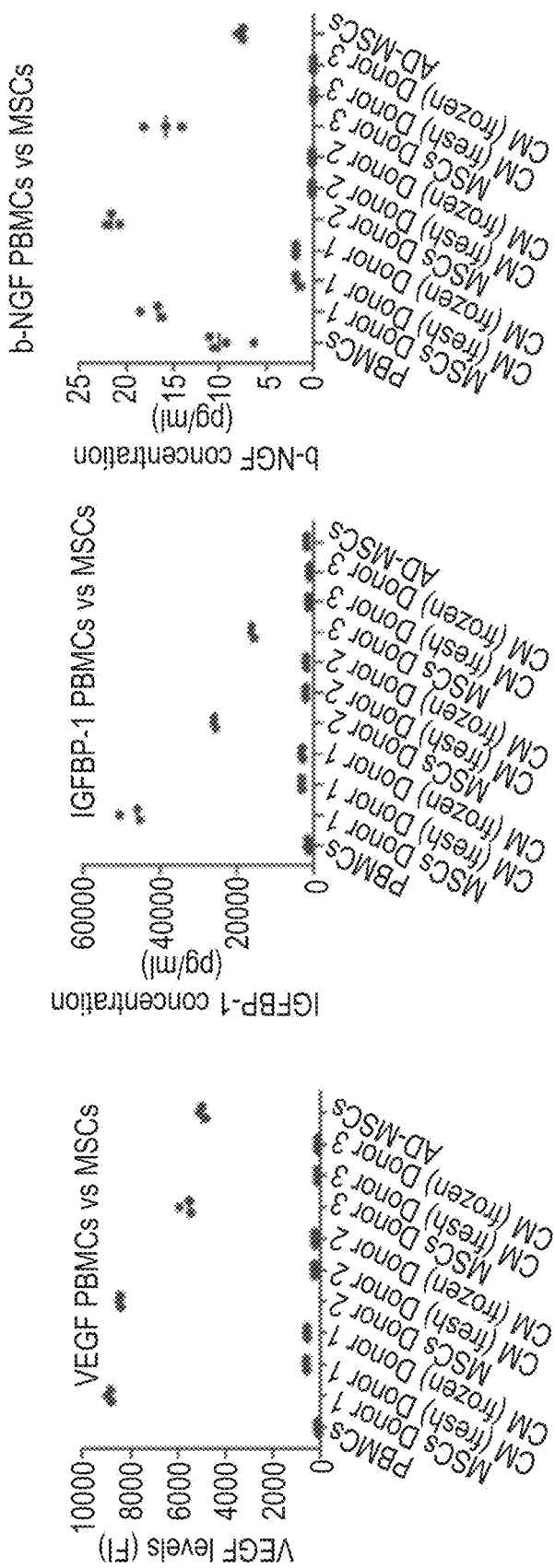
FIG. 22 provides example data and Characterization of TAF-MSCs by production of angiogenic growth factors.

In certain examples, TAF-MSCs may inhibit macrophage polarization towards the M1 pro-inflammatory phenotype (FIG. 11), and produce angiogenic growth factors (FIG. 22). Similarly, Lung MSCs, Kidney MSCs, Skin MSCs and Neuronal MSCs may be used for changing macrophage activation/polarization.

Inhibition of Cytokine Secretion from Activated Peripheral Blood Mononuclear Cell (PBMC)

Figure 23:
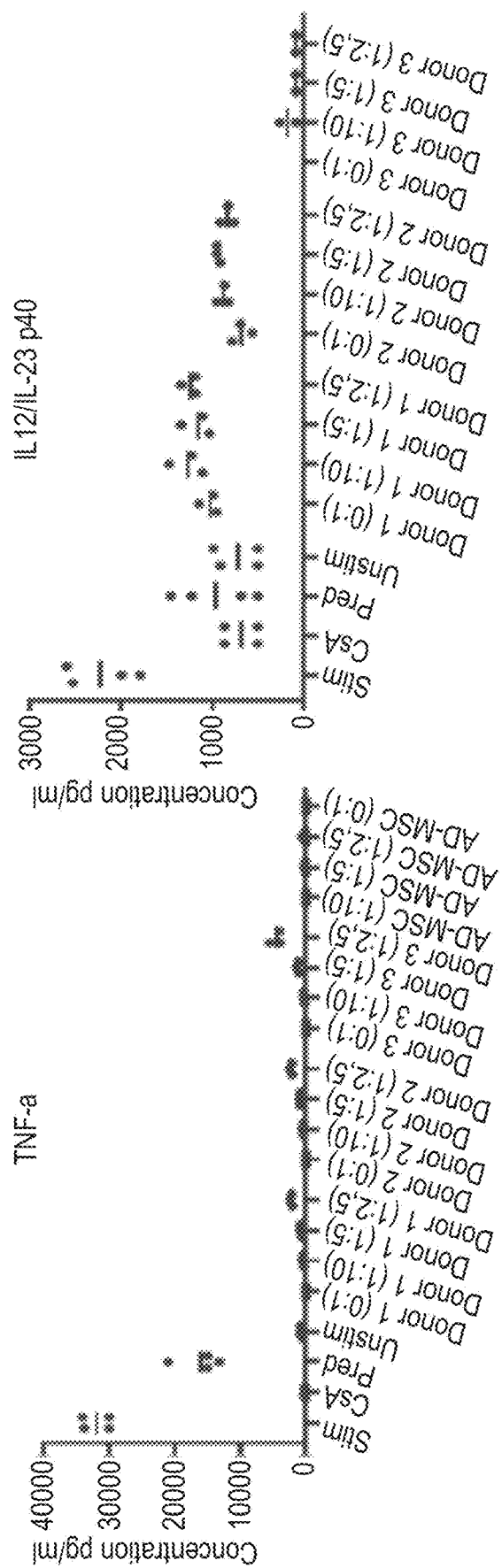
FIG. 23 provides example data showing potency of TAF-MSC by inhibition of PBMC cytokine secretion. Freshly isolated human PBMCs, pooled from three donors, were activated with anti-CD3/anti-CD28 at 10 µg/ml and 5 µg/ml respectively in presence of TAF-MSCs. Following activation, supernatants collected after 24 hours were analyzed for cytokine levels using Luminex. Both TNF-α and IL12/IL-23p40 secretion by PBMCs were inhibited by TAF-MSCs.

In particular examples, methods of inhibiting cytokine secretion from activated Peripheral Blood Mononuclear Cell (PBMC) may comprise co-culturing with the PBMC tissue-typed, term amniotic fluid mesenchymal stem cells (TAF-MSCs). Both TNF-α and IL12/23p40 secretion by PBMCs were shown to be inhibited by TAF-MSCs (FIG. 23).

Figure 24:
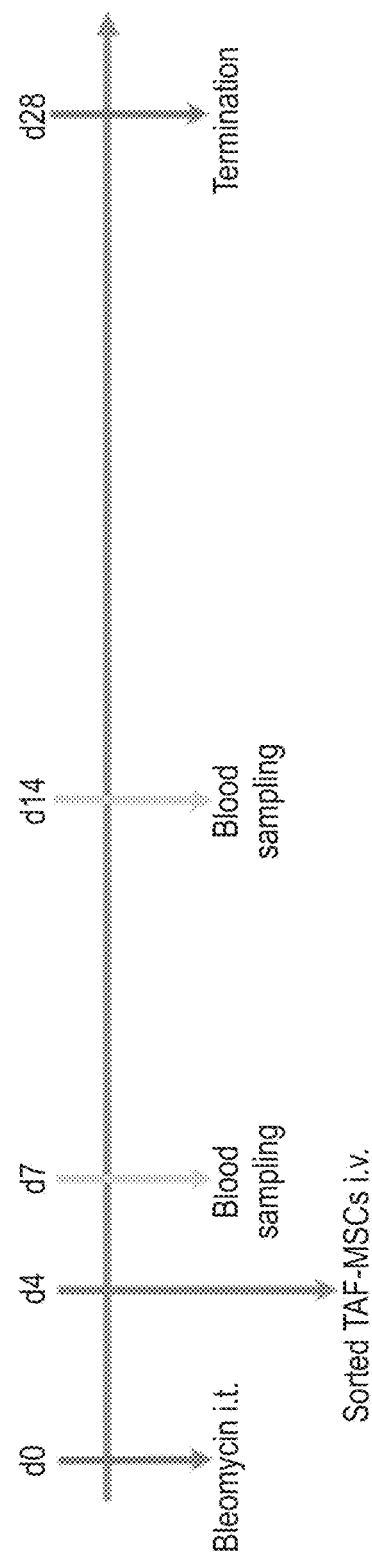
FIG. 24 shows the experimental set-up (time course) of an example experiment designed to elucidate potency of TAF-MSC by inhibition of fibrosis in a rat bleomycin lung fibrosis model. Readouts are presented in the following figures—all data presented are from the 5 animals per group selected for histology: 1. Weight change; 2. Histology: % of parenchyma affected (HE-stain); Fibrosis scoring according to Modified Ashcroft scale (on both Sirius Red and TriChrome-stain); Cytokines in plasma from day 28 (termination); Presence of human MSCs in rat lungs after 28 days.
Figure 25:
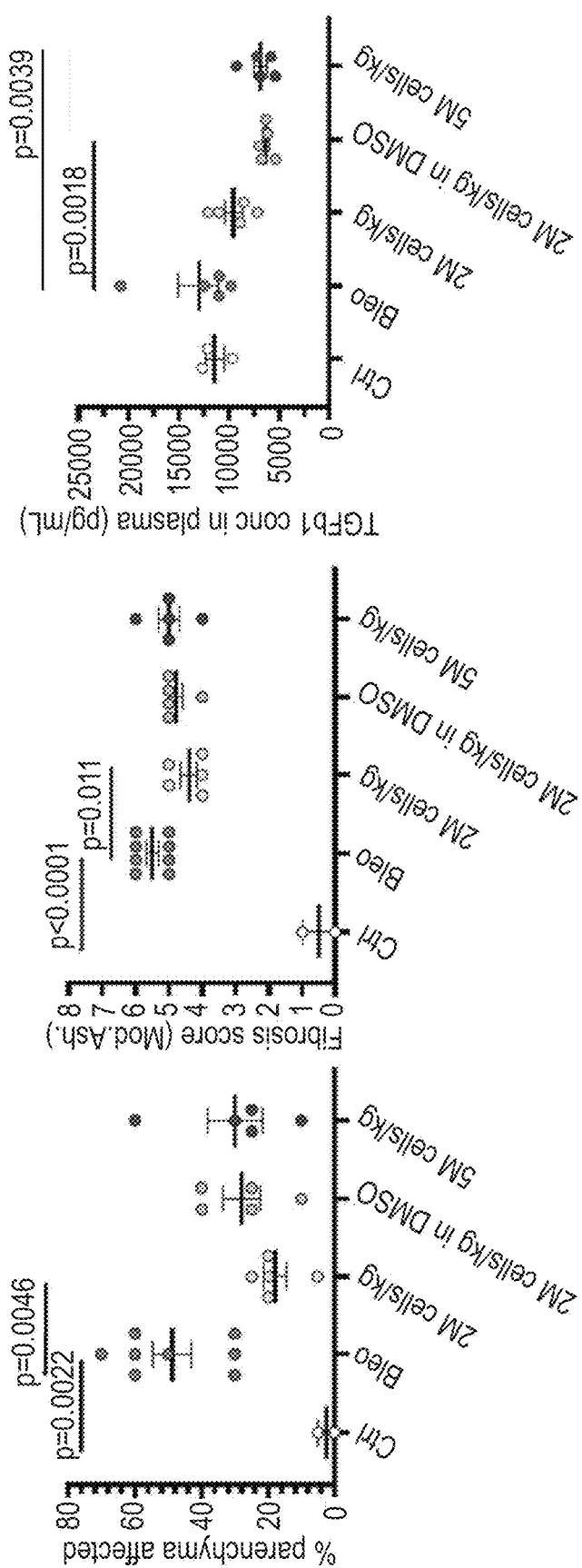
FIG. 25 provides example data showing potency of TAF-MSC by inhibition of fibrosis in a rat bleomycin lung fibrosis model.
Figure 26:
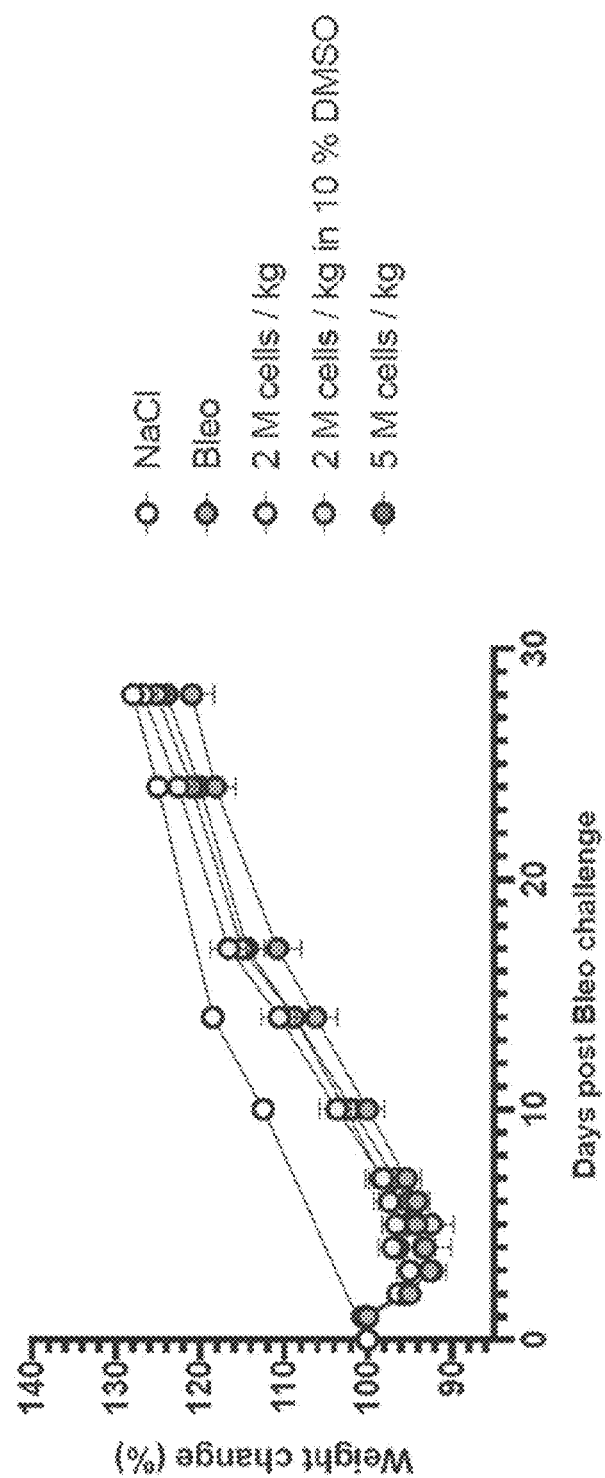
FIG. 26 provides example data showing weight change during experiment, post Bleo challenge.
Figure 27:
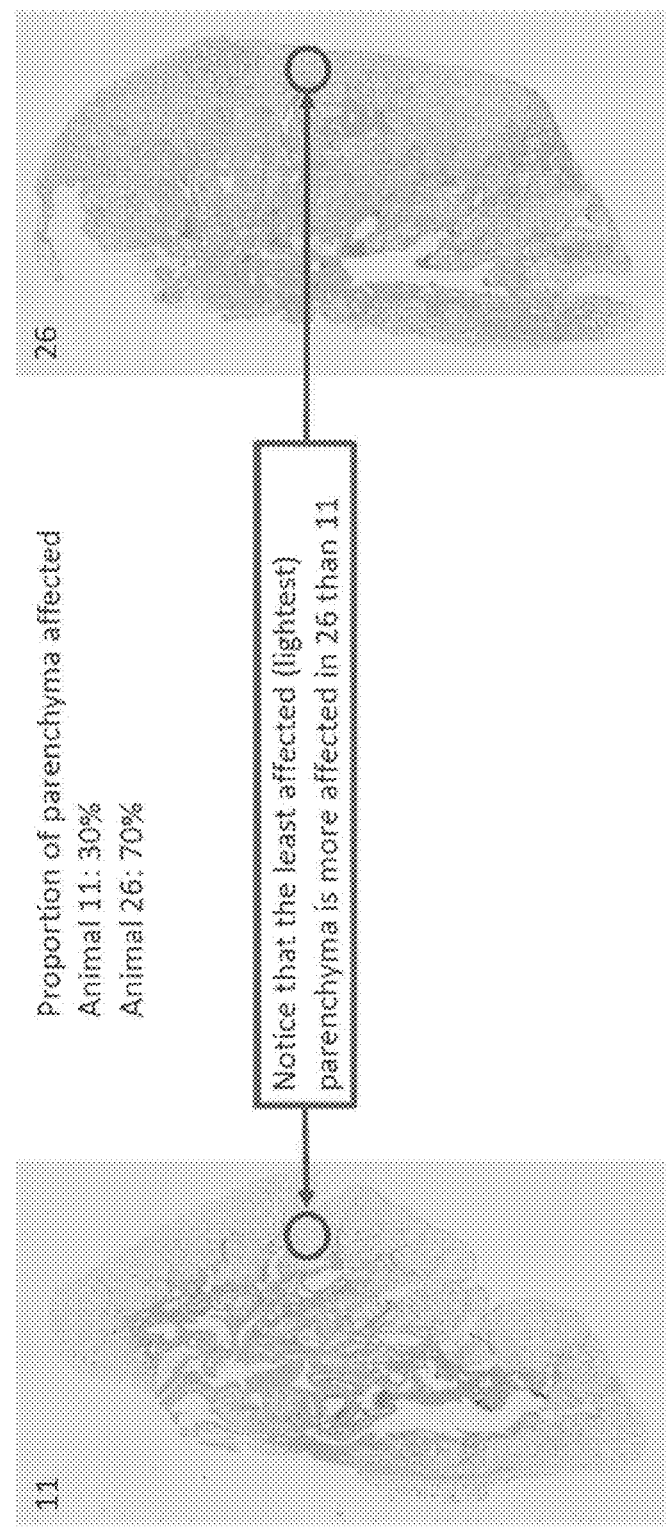
FIG. 27 provides an explanation of an example of fibrosis scoring—Example: Animal #11 & Animal #26, Overview (hematoxylin-eosin).
Figure 29:
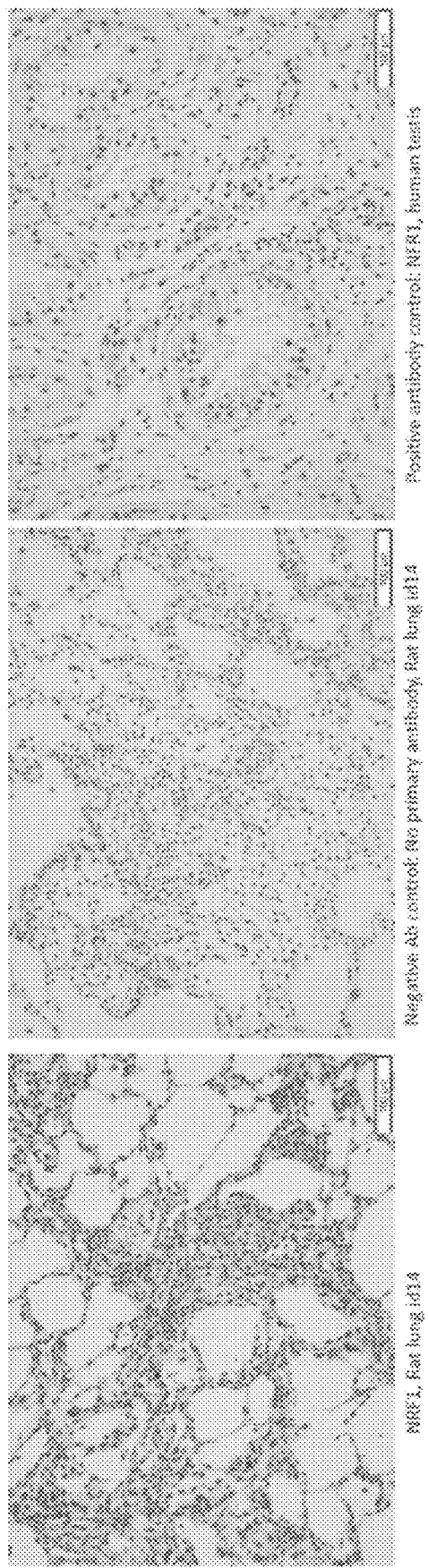
FIG. 29 provides an example of Immunohistochemistry data showing detection of MSC Control nuclear labelling protocol—NRF1. Nuclear labelling with the NRF1 antibody (brown) confirm that the protocol used in rat lung tissue is optimal for labelling of nuclear epitopes, such as human Ku80 and NUMA used in the two following figures to identify MSC.
Figure 30:
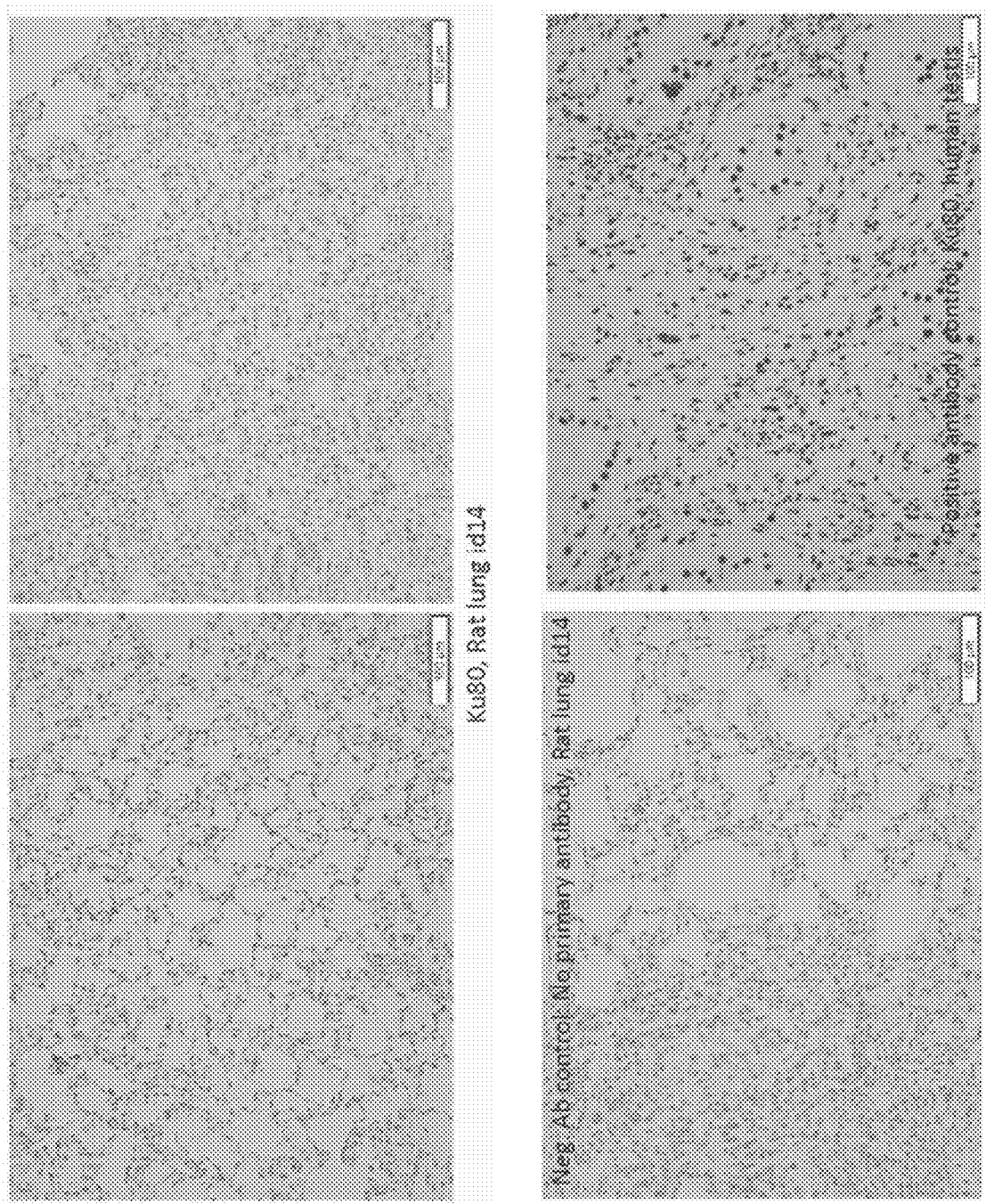
FIG. 30 Provides an example of Immunohistochemistry data showing detection of MSC with anti-human Ku80. There was no detectable labelling of human nuclear Ku80 in rat lungs from animals that had received MSC (top images), whereas strong nuclear labelling was present in the positive control tissue (see brown nuclei in human testis). Antibody: Anti-humanKu80. Ref. IHC in lung tissue: Allard et al. 2014.
Figure 31:
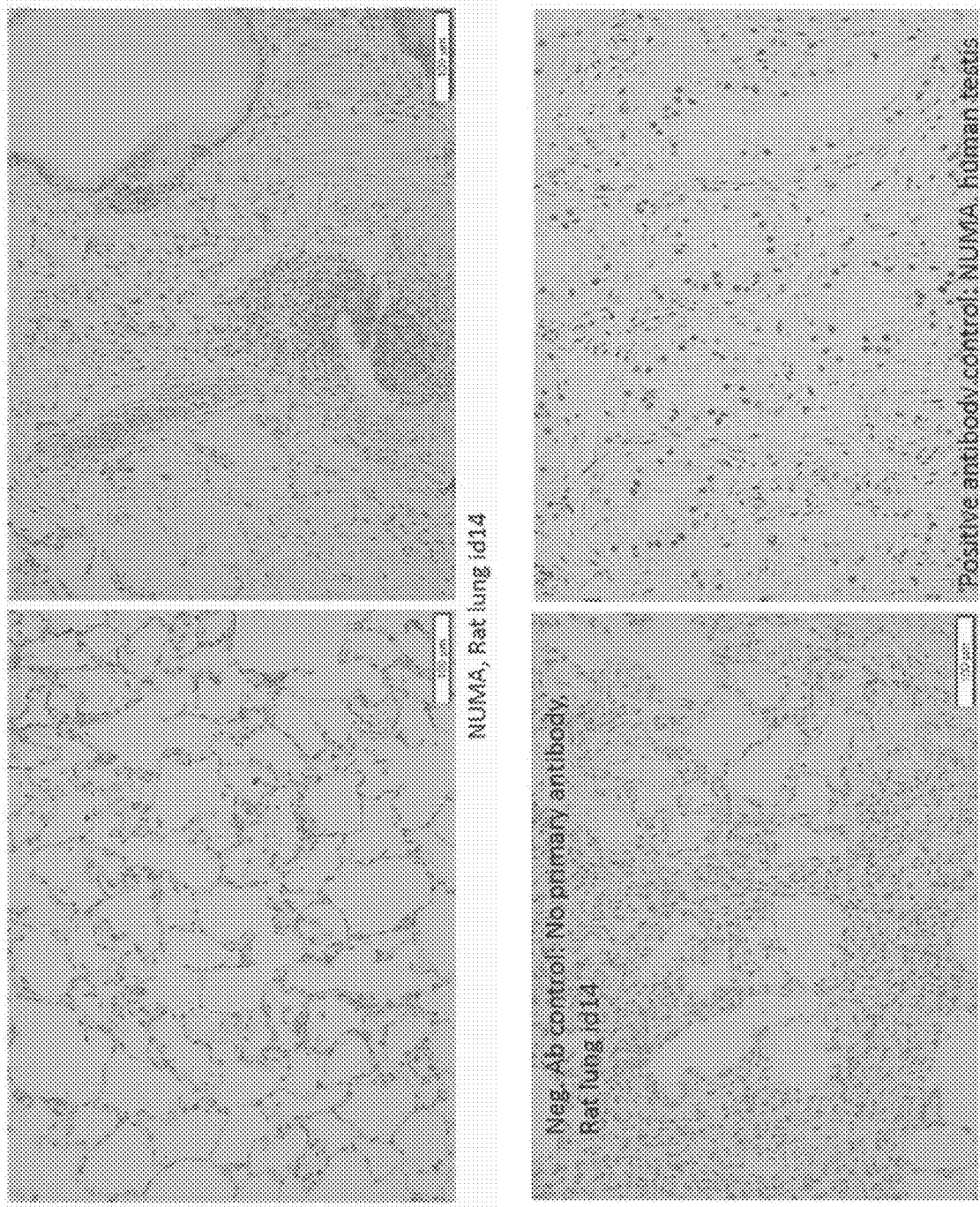
FIG. 31 Provides an example of Immunohistochemistry data showing detection of MSC anti-NUMA. There was no detectable labelling of human nuclear NUMA in rat lungs from animals that had received MSC (top images), whereas strong nuclear labelling was present in the positive control tissue (brown in human testis). Note: The NUMA antibody produced a weak labelling of different structures, concluded to comprise unspecific binding. Antibody: Anti-human NUMA. Ref: Vega et al 2017.

In some examples, the potency of TAF-MSCs may be evaluated on the basis of inhibition of fibrosis in a rat bleomycin lung fibrosis model (FIG. 24 and FIG. 25), resulting in increases in weight following treatment (FIG. 26). In some examples, hematoxylin-eosin staining enables fibrosis scoring (FIG. 27 and FIG. 28). In some cases, nuclear epitope staining may be used to identify MSCs (FIG. 29, FIG. 30 and FIG. 31).

Figure 32:
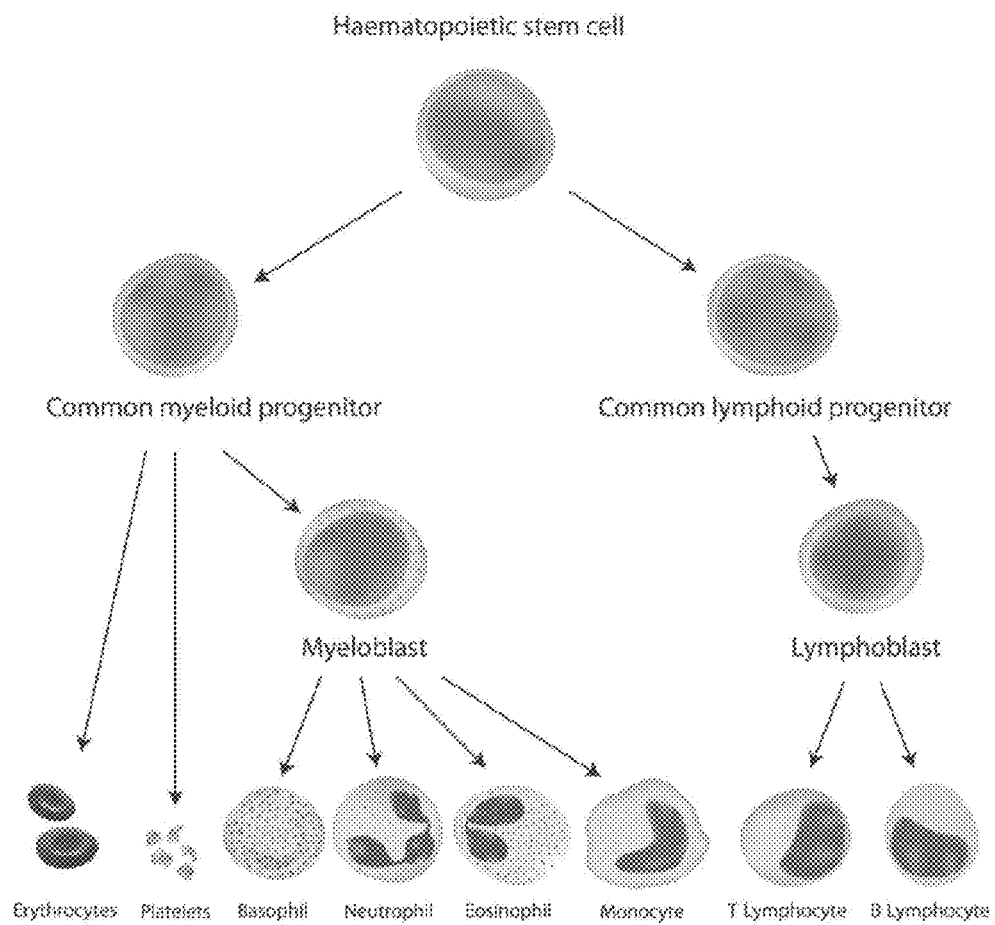
FIG. 32 provides an example schematic overview of different cells that arise from hematopoietic stem cells through the process of hematopoiesis.

As will be understood by one of skill in the art, peripheral blood mononuclear cells originate from hematopoietic stem cells (HSCs) that reside in the bone marrow. HSCs may give rise to all blood cells of the immune system through a process called hematopoiesis. As hematopoietic stem cells progress through hematopoiesis they generate the myeloid (monocytes, macrophages, granulocytes, megakaryocytes, dendritic cells, erythrocytes) and lymphoid (T cells, B cells, NK cells) lineages (FIG. 32).

Within both lineages are cells that make up the PBMCs. PBMCs are blood cells with round nuclei that encompass a heterogeneous cell population comprising various frequencies of lymphocytes (T cells, B cells, and NK cells), dendritic cells, and monocytes (Table 1). These cells are critical components of the innate and adaptive immune system which defends the body against viral, bacterial, and parasitic infection and destroys tumor cells and foreign substances.

TABLE 1

| Human PBMCs | Frequency (%) |
| --- | --- |
| Monocytes | 10-30% |
| Lymphocytes | 70-90% |
| Total T cells (CD$_3$+) | 45-70% |
| CD$_4$+ T cells | 25-60% of total CD$_3$ |
| CD8+ T cells | 5-30% of total CD$_3$ |
| Total B cells | 5-15% |
| NK cells | 5-10% |
| Dendritic cells | 1-2% |
| Stem cells | 0.1-0.2% |

Human cell frequencies vary across individuals, but on average, most PBMCs are lymphocytes (70-90%). Lymphocytes play an essential role in cell-mediated and humoral immune responses, primarily associated with the activation of T and B cells.

Within the lymphocyte population, CD3+ T cells contribute to the most significant portion of cells (45-70%). Most T cells exist as resting, naïve T cells, which are T cells that have not been activated by an antigen, or as memory T cells. Activation of naïve T cells occurs through antigen recognition and accounts for a small population of T cells within healthy individuals. Once active, T cells launch a cell-mediated immune response that targets antigens within an infected or diseased cell.

Similarly, CD19+ B cells exist as naïve or memory cells that are awaiting activation by an antigen, and comprise only 5-15% of the total lymphocyte population. Once activated, B cells differentiate into plasma cells capable of secreting antibodies that specifically target free antigens circulating in the bloodstream. The ability to target free antigens by secreted antibodies within the extracellular space is defined as the humoral immune response.

NK cells account for a smaller portion of the lymphocyte population (5-10%) and, from a historical perspective, are part of the innate immune system, our bodies' front-line defense system. These cells perform their effector function without requiring an antigen and defend the body against tumor activity.

A small portion of white blood cells include dendritic cells (1-2%) that form a critical interface between the innate and adaptive immune system. Dendritic cells, a highly specialized antigen-presenting cell, engulf antigens and present fragments of the antigen to cells of the adaptive immune system eliciting activation of T and B cells.

Varying in complexity and size as compared to lymphocytes, monocytes (10-30%) circulate within the bloodstream to the peripheral tissue where, when stimulated, mature and differentiate into either dendritic cells or macrophages that mediate both the innate and adaptive immune responses by acting as phagocytic and antigen-presenting cells.

The hematopoietic stem cells (HSCs) within the blood and bone marrow give rise to all the cells within the blood, including red blood cells, platelets, lymphocytes, monocytes, and granulocytes. Although desirable for stem cell transplants, this rare cell population accounts for only 0.1-0.2% of the PBMC fraction, making them difficult to isolate from whole blood samples. Injection of mobilizations agents, such as granulocyte-colony stimulating factor (G-CSF) or Plerixafor, can increase the frequency of circulating CD34+ stem cells to 0.5-1.5%, allowing for greater quantities of these rare cells from a donor.

Identification of Markers

In certain examples, when comparing the genetic expression profiles of TAF-MSCs and adult-type MSCs derived from adipose tissue or bone marrow by RNAseq, TAF-MSCs tend to express more of some genes present in adult-type MSCs and less of others. Identification of both positive and negative TAF-MSC specific neonatal cell-surface markers can allow for sorting of the MSCs with neonatal quality from those that have differentiated further and are of less importance as progenitor cells using e.g., ligands such as antibodies and aptamers or other selection techniques.

Figure 33:
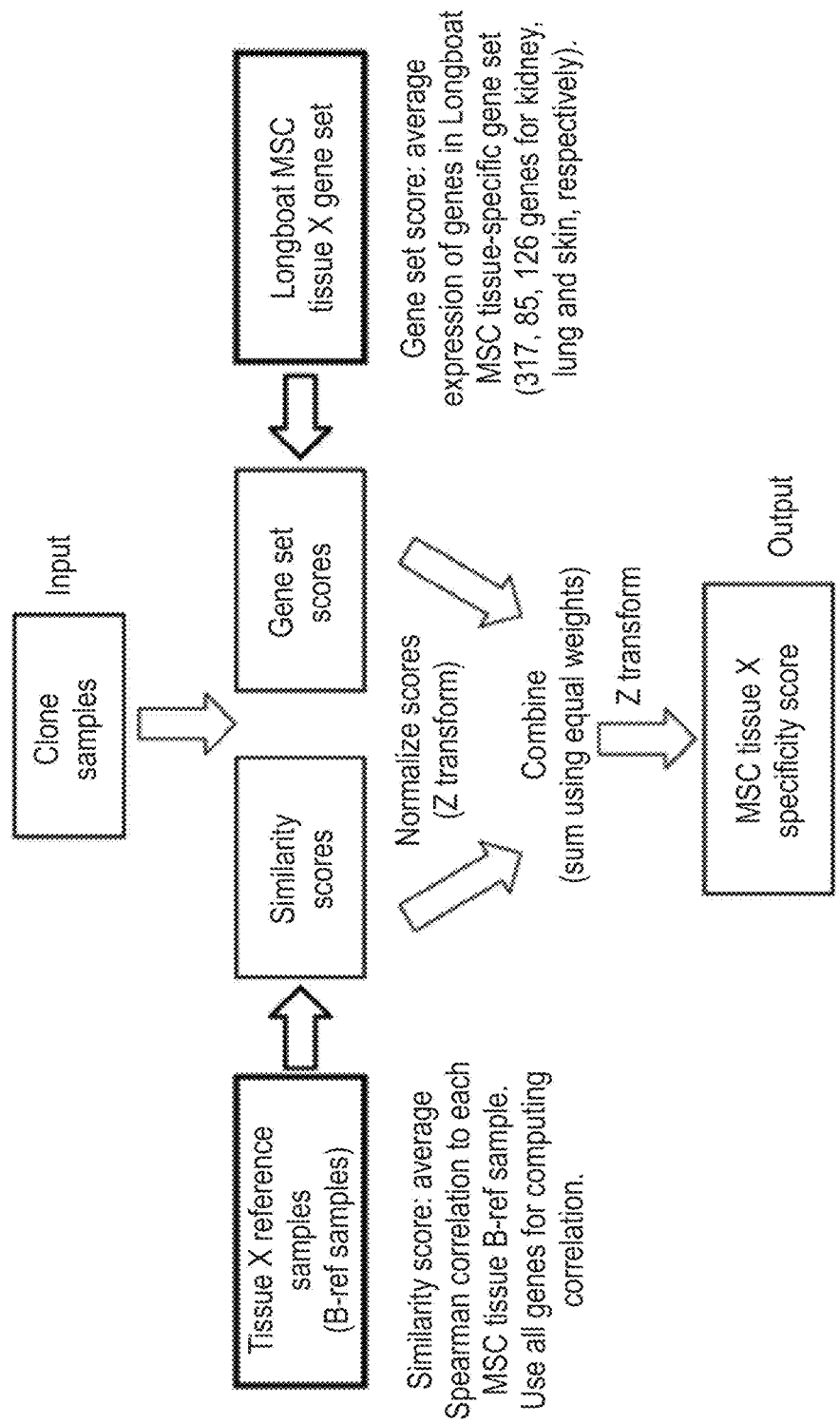
FIG. 33. An example flow chart showing the steps for calculation of an MSC tissue specificity score according to an example.

The cell surface markers distinguishing tissue relevant cells from other MSCs may be elucidated via a bioinformatics process utilizing a tissue-specificity score algorithm. An example of an MSC tissue-specificity score algorithm is shown in FIG. 33. Tissue-specificity may be measured as a combination of two components: a 'tissue transcriptional similarity' also known as a similarity score and a "tissue-specific gene expression program" also known as a gene set score. In certain examples, the similarity score may be an Average Spearman correlation to each MSC tissue reference sample (for example a fetal lung MSC sample). In examples, the gene set score may be the average expression of genes in a tissue-specific gene set. As shown in FIG. 33, in certain examples, after normalizing the similarity and gene set scores using a Z-transform to convert the input values, which is a sequence of real or complex numbers, into a complex frequency-domain representation, then combining them assigning equal weight to each score and transforming combined values using a Z-transform, the resulting output is an MSC tissue specificity score. The MSC tissue-specificity score measures the relative tissue-specificity among the input samples by measuring how many standard deviations a sample is more or less specific to a given tissue compared to the average input sample. For example, an MSC tissue-specificity score may indicate how much more a clone sample appears to have a tissue specific phenotype, such as a lung phenotype, as compared to an average clone. Such an approach allows for identification of the top X % percentile scores using a normal distribution function, effectively the top X % of clones that are most tissue-specific to the relevant tissue.

Figure 34:
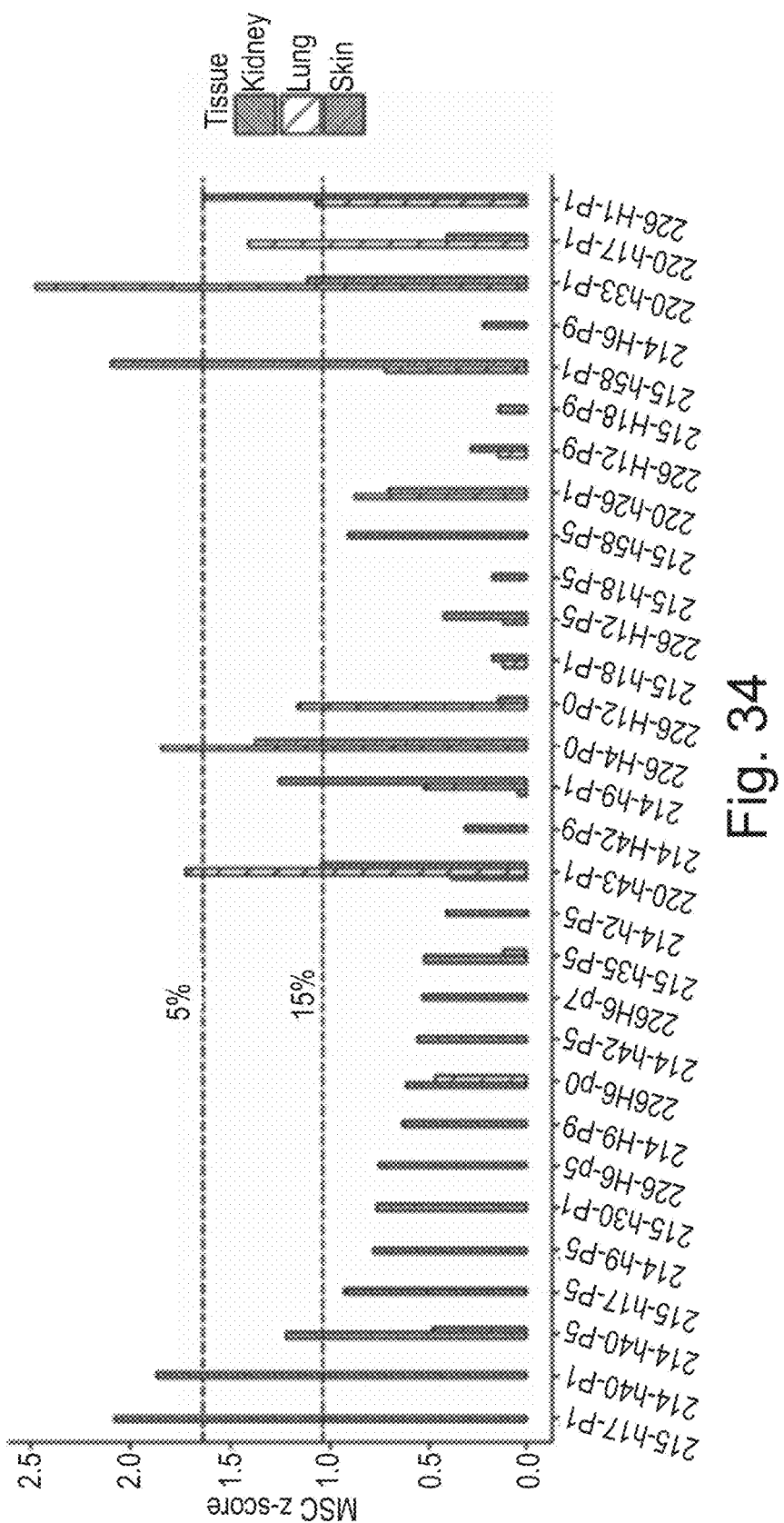
FIG. 34. An example graph showing MSC tissue specificity scores representing the 5% and 15% thresholds.
Figure 35:
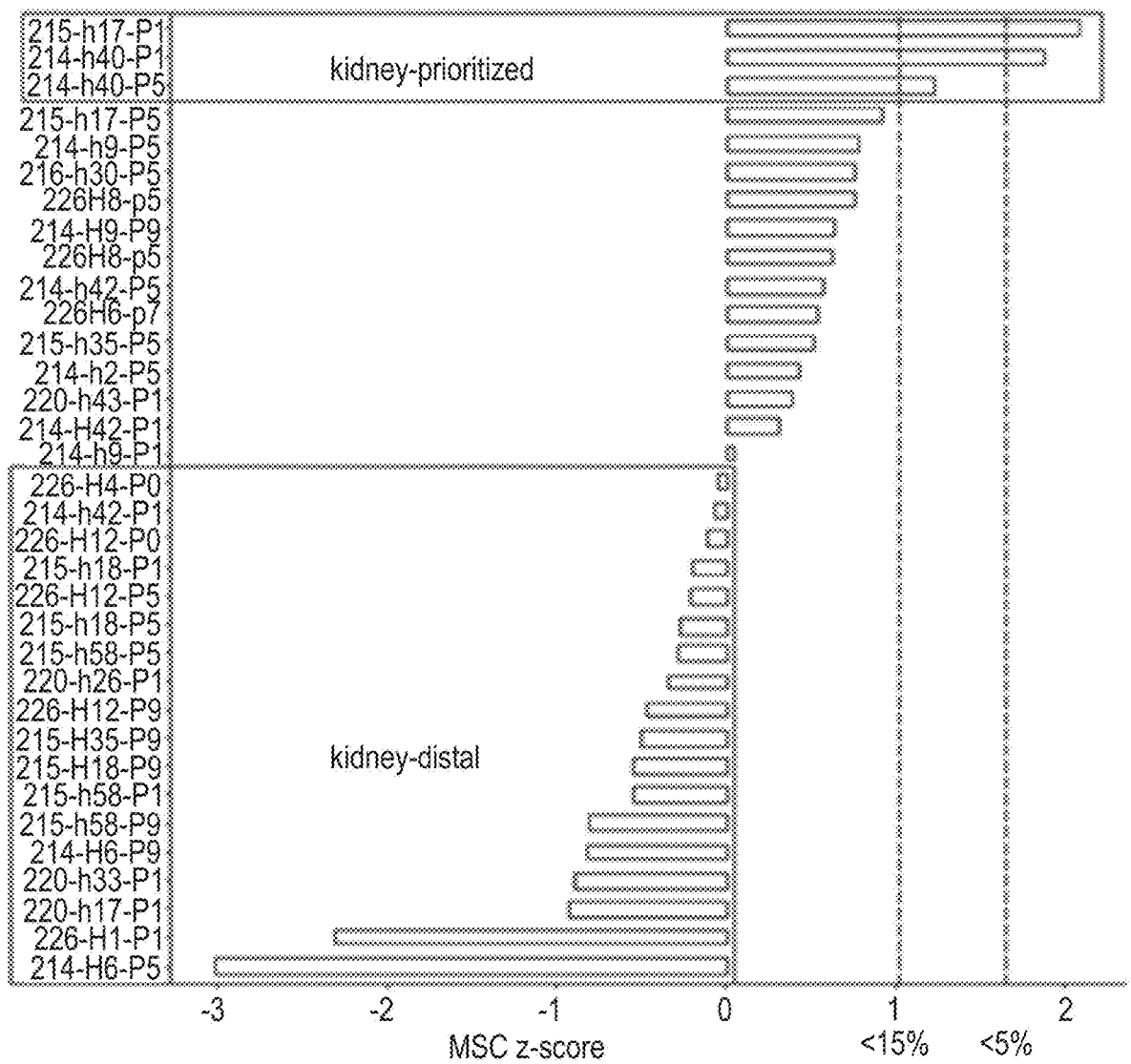
FIG. 35. An example graph showing tissue-prioritized and tissue-distal data, including tissue-prioritized data greater than 15% percentile.

In one example, for a given tissue, tissue-prioritized clones can be defined as any clone belonging to the top X % percentile score, where X is any percentage within a range having a lower end from about 0.1 to 25, such as about 1, 5, 10, 15 and 20, and an upper end from about 30 to 99, such as about: 35, 40, 45, 50, 55, 60, 65, 70, 75, 80, 85, 90, 95 or 99. An example of TAF-MSC tissue-specificity prioritization results is shown in FIG. 34, in which thresholds at 15% and 5% are visible. Having prioritized tissue-specific clones, candidate surface marker genes may then be identified. For each tissue, two groups may be defined: tissue-prioritized and tissue-distal. A suitable analysis program may be used to make this determination, for example DEseq2 from Bioconductor.org. The tissue-prioritized group may include clones with a score in the top 15% percentile. The tissue-distal group may include clones in the bottom Y % percentile in which Y is any percentage within the range having a lower end from about 25 to 70, such as about: 30, 35, 40, 45, 50, 55, 60 or 65 and an upper end from 75 to 99.9, such as about: 80, 85, 90, 95 or 99. FIG. 35 shows an example of such analysis on kidney tissue. Next, differentially expressed genes between the tissue-prioritized and tissue-distal groups may be identified. Finally, the differential expression results may be annotated with surface marker gene information.

In certain examples, to identify tissue-specific cell surface markers, surface marker genes with a more than a Z-fold increase, where Z is at least about: 1.5-fold, 2-fold, 2.5-fold, 3-fold, 3.5-fold, 4-fold, 5-fold, 8-fold, 10-fold, 12-fold, 15-fold or even more-fold increase in expression (log 2Fold-Change) in prioritized clones compared to an average clone and a Transcripts Per Kilobase Million (TPM) of more than about 500, such as more than about: 1000, 1500, 2000, 2500, 3000, 5000 or even higher may be selected to give the top tissue-specific marker candidates, such as approximately the top: 5, 10, 20, 30, 40, 50, 60, 70, 100 or more, for example such as those shown below in Tables 4-7 and further described in more detail below. Suitable log 2FoldChange and TPM values may vary even further depending on tissue type specificities depending on the abundance/absence of good markers.

Applying the tissue specificity algorithms described above to identify surface markers, after adhesion selection and passaging, the TAF-MSCs cells may express various identified surface markers as shown below in Table 2, indicative of non-tissue specific TAF MSCs. One of skill in the art will understand that such surface markers may be present at various surface densities and may be upregulated or downregulated in comparison to other cell types. Therefore, such surface markers may be used to identify and isolate particular cell types. In some instances, the surface markers listed in Table 2 below may be at least 8-fold more highly expressed for TAF MSCs on average compared to other MSC cell types, particularly as compared to adult MSCs derived from bone marrow or adipose tissue. The thresholds used to generate Table 2 are as follows: X was selected as 15%, Y was selected as 50%, Z was selected as 8-fold and a TPM of more 3000 was selected. One of skill in the art will understand that the numbering used in Table 2 and all tables herein is merely used to indicate a total number of identified markers and not to indicate that one particular marker is more strongly expressed and/or preferred compared to another marker.

TABLE 2

| 1. | TBC1D3K | TBC1 domain family member 3K |
| 2. | AIF1L | allograft inflammatory factor 1 like |
| 3. | CDHR1 | cadherin related family member 1 |
| 4. | NKAIN4 | sodium/potassium transporting ATPase interacting 4 |
| 5. | ABCB1 | ATP binding cassette subfamily B member 1 |
| 6. | PLVAP | plasmalemma vesicle associated protein |
| 7. | MSLN | mesothelin |
| 8. | L1CAM | L1 cell adhesion molecule |
| 9. | HAVCR1 | hepatitis A virus cellular receptor 1 |
| 10. | MAL2 | mal, T cell differentiation protein 2 (gene/pseudogene) |
| 11. | SLAMF7 | SLAM family member 7 |
| 12. | DOC2B | double C2 domain beta |
| 13. | ESAM | endothelial cell adhesion molecule |
| 14. | GABRB1 | gamma-aminobutyric acid type A receptor beta1 subunit |
| 15. | CDH16 | cadherin 16 |
| 16. | IGSF3 | immunoglobulin superfamily member 3 |
| 17. | DSC3 | desmocollin 3 |

TABLE 2-continued

| | | |
|---|---|---|
| 18. | RHEX | regulator of hemoglobinization and erythroid cell expansion |
| 19. | KCNIP1 | potassium voltage-gated channel interacting protein 1 |
| 20. | CD70 | CD70 molecule |
| 21. | GFRA1 | GDNF family receptor alpha 1 |
| 22. | CRB3 | crumbs cell polarity complex component 3 |
| 23. | CLDN1 | claudin 1 |
| 24. | AC118754.1 | novel transcript |
| 25. | SCN5A | sodium voltage-gated channel alpha subunit 5 |
| 26. | FGFR4 | fibroblast growth factor receptor 4 |
| 27. | KCNK3 | potassium two pore domain channel subfamily K member 3 |
| 28. | DYSF | dysferlin |
| 29. | EFNA1 | ephrin A1 |
| 30. | KCNJ16 | potassium inwardly rectifying channel subfamily J member 16 |
| 31. | MARCHF1 | membrane associated ring-CH-type finger 1 |
| 32. | SYTL1 | synaptotagmin like 1 |
| 33. | CLSTN2 | calsyntenin 2 |
| 34. | ITGB4 | integrin subunit beta 4 |
| 35. | VAMP8 | vesicle associated membrane protein 8 |
| 36. | GPRC5C | G protein-coupled receptor class C group 5 member C |
| 37. | CD24 | CD24 molecule |
| 38. | CELSR2 | cadherin EGF LAG seven-pass G-type receptor 2 |
| 39. | CDH8 | cadherin 8 |
| 40. | GRIP1 | glutamate receptor interacting protein 1 |
| 41. | DMTN | dematin actin binding protein |
| 42. | F11R | F11 receptor |
| 43. | CADM1 | cell adhesion molecule 1 |
| 44. | CDH6 | cadherin 6 |
| 45. | F2RL2 | coagulation factor II thrombin receptor like 2 |
| 46. | LYPD1 | LY6/PLAUR domain containing 1 |
| 47. | SLC6A6 | solute carrier family 6 member 6 |
| 48. | DSG2 | desmoglein 2 |
| 49. | ADGRG1 | adhesion G protein-coupled receptor G1 |
| 50. | CCKAR | cholecystokinin A receptor |
| 51. | OXTR | oxytocin receptor |
| 52. | ITGA3 | integrin subunit alpha 3 |
| 53. | AMIGO2 | adhesion molecule with Ig like domain 2 |
| 54. | CELSR1 | cadherin EGF LAG seven-pass G-type receptor 1 |
| 55. | EPHB2 | EPH receptor B2 |

As will be understood by one of skill in the art, suitable combinations of the markers listed in Table 2 may be used to separate TAF-MSCs from adult MSCs by selecting for specific markers from Table 2 or combinations of two, three, four, five, six or more markers from Table 2. In certain examples, TAF MSCs can be more specifically identified by identifying a combination of stronger expression, such as 8-fold or more stronger expression of any combination of the foregoing markers, e.g., TBC1D3K and/or AIF1L and/or CDHR1 and/or NKAIN4 and/or ABCB1 and/or PLVAP as compared to adult MSCs. When using combinations of markers, identification may be achieved with a lower threshold of stronger expression, such as 2-fold or more, 4-fold or more, or 6-fold or more expression of each of the markers.

In contrast to the above surface markers that may be more strongly expressed on the surface of TAF-MSCs (positive markers) compared to adult MSCs, in certain examples, the below surface markers in Table 3 may be more weakly expressed on TAF-MSCs as compared to other cell types (negative markers), such as ⅛-fold or less expression (optionally with TPM threshold >500) of any combination of the foregoing markers versus adult MSCs: IL13RA2, CLU, TMEM119, CEMIP, and LSP1. When using combinations of negative markers, identification may be achieved with a lower threshold of weaker expression, such as ½-fold or less, ¼-fold or less, or ⅙-fold or less expression of each of the markers.

Combinations of two or more these negative markers can also be used to more specifically isolate TAF MSCs. In addition, those skilled in the art will also recognize that combinations including both negative and positive markers, such as at any of the thresholds described above, can also be effective to more specifically isolate TAF MSCs.

TABLE 3

| | | |
|---|---|---|
| 1. | IL13RA2 | Interleukin-13 receptor subunit alpha-2 |
| 2. | CLU | Clusterin |
| 3. | TMEM119 | Transmembrane Protein 119 |
| 4. | CEMIP | Cell Migration Inducing Hyaluronidase 1 |
| 5. | LSP1 | Lymphocyte Specific Protein 1 |
| 6. | GPNMB | Glycoprotein Nmb |
| 7. | FAP | Fibroblast Activation Protein Alpha |
| 8. | CRLF1 | Cytokine Receptor Like Factor 1 |
| 9. | MME | Membrane Metalloendopeptidase |
| 10. | CLMP | CXADR Like Membrane Protein |
| 11. | BGN | Biglycan |
| 12. | DDR2 | Discoidin Domain Receptor Tyrosine Kinase 2 |

Marker-Based Selection

Amniotic fluid contains heterogenous cells in a homogenous fluid. Hence, a marker-based selection may be needed. One example of marker-based selection is via the use of Fluorescence activated cell sorting (FACS). Fluorescence activated cell sorting (FACS) may be used to purify the cell population of TAF-MSCs, FACS allows for a very high purity of the desired cell population, even when the target cell type expresses very low levels of identifying markers and/or separation is needed based on differences in marker density. FACS allows the purification of individual cells based on size, granularity and fluorescence. As will be understood by one of skill in the art, FACS may be used to select for certain cell populations that express one cell surface marker more than another cell population and vice-versa. In some examples of methods of purification, bulk methods of purification such as panning, complement depletion and magnetic bead separation, may be used in combination with FACS or as an alternative to FACS. In brief, to purify cells of interest via FACS, they are first stained with fluorescently-tagged monoclonal antibodies (mAbs), which recognize specific surface markers on the desired cell population. Negative selection of unstained cells may also allow for separation. For GMP production of cells according to some examples, FACS may be run using a closed system sorting technology such as MACS Quant® Tyto®. Samples may be kept contamination-free within the disposable, fully closed MACSQuant Tyto Cartridge. Further, filtered air may drive cells through a microchannel into the microchip at very low pressure (<3 PSI). However, before entering the microchannel, potential cell aggregates may be held back by a filter system guaranteeing a smooth sorting process. The fluorescence detection system may detect cells of interest based on predetermined fluorescent parameters of the cells. Based on their fluorescent and scatter light signatures, target cells may be redirected by a sort valve located within the microchannel. For certain examples of methods of purification, the success of staining and thereby sorting may depend largely on the selection of the identifying markers and the choice of mAb. Sorting parameters may be adjusted depending on the requirement of purity and yield. Unlike on conventional droplet sorters, cells sorted by the MACSQuant Tyto may not experience high pressure or charge and may not get decompressed. Therefore, such a gentle sorting approach may result in high viability and functionality of cells. Alternatively, other marker-based selection techniques may be known to the skilled person and employed here. These include, but are not limited to, Magnetic-activated cell sorting, Microfluidic based sorting, Buoyancy activated cell sorting, mass cytometry etc.

Tissue Specific Cells and Usage
Lung TAF Cell Markers

As explained above, analysis of RNAseq data from TAF-MSC clones, adult and neonatal MSC reference material as well as fetal fibroblasts and publicly available expression datasets may be used to identify and characterize TAF-MSC cells. For example, sub-populations of TAF-MSCs may be established by clustering their expression data (RNAseq) with neonatal reference samples. Such sub-populations include, but are not limited to, lung MSC, urinary tract MSC (described also as kidney MSCs in the present disclosure), and skin MSC. Gene lists of highly and lowly expressed genes for each cluster of expression data may allow for identification of surface maker genes for each cluster. Using such data comparison, sub-populations of TAF cells were compared to adult MSC cells based on their gene expressions (RNAseq) resulting in a list of neonatal-specific surface marker genes for each cluster. A number of surface markers of interest associated with lung TAF cells were identified. For example, a non-exclusive list of preferred surface markers used to identify and separate lung TAF cells are provided below. Moreover, as the number of different MSC-subtypes in TAF is limited, the selection of the tissue specific MSC may be done by firstly characterization, thereafter a stepwise negative selection/sorting of the material by taking into account the combined (multivariate) surface marker profile of the different tissue specific MSC's. One of skill in the art will understand that any such combination of these surface markers may be used for identifying and isolation of lung TAF cells from the general population of TAF-derived cells and/or TAF-MSC cells. In some examples, the below non-exclusive list of surface markers may be more highly expressed on the surface of Lung-TAF cells as compared to other cell types, such as other TAF-derived cells and/or TAF-MSC cells.

As explained above, bioinformatics techniques may be used to identify tissue-specific surface markers, therefore, the surface markers identified in Table 4 may have at least a 10-fold increase in expression on prioritized clones compared to the average TAF-MSC clone (optionally with TPM threshold >2000).

TABLE 4

| | |
|---|---|
| 1. | PCDH19 - protocadherin 19; |
| 2. | DDR1 - discoidin domain receptor tyrosine kinase 1; |
| 3. | MME - membrane metalloendopeptidase; |
| 4. | IFITM10 - interferon induced transmembrane protein 10; |
| 5. | BGN - biglycan; |
| 6. | NOTCH3 - notch receptor 3; |
| 7. | SULF1 - sulfatase 1; |
| 8. | TNFSF18 - TNF superfamily member 18; |
| 9. | BDKRB1 - bradykinin receptor B1; |
| 10. | FLT1 - fms related tyrosine kinase 1; |
| 11. | PDGFRA - platelet derived growth factor receptor alpha; |
| 12. | TNFSF4 - TNF superfamily member 4; |
| 13. | UNC5B - unc-5 netrin receptor B; |
| 14. | FAP - fibroblast activation protein alpha; |
| 15. | CASP1 - caspase 1; |
| 16. | CD248 - Endosialin; |
| 17. | DDR2 - discoidin domain receptor tyrosine kinase 2; |
| 18. | PCDH18 - protocadherin18; and/or |
| 19. | CRLF1 - cytokine receptor like factor 1. |

In contrast to the above surface markers that may be more strongly expressed on the surface of lung TAF MSCs, in certain examples, the below surface markers may be more weakly expressed on lung TAF MSCs as compared to other cell types, such as other TAF-derived cells and/or TAF-MSCs: CD24, ITGB4, TNFSF10, GFRA1, CD74, FGFR4, HAVCR1, and OSCAR. As will be understood by one of skill in the art, one, two, three, four, or more of the aforementioned more weakly expressed surface markers may be used to separate lung TAF cells from other cell types such as other TAF-derived cells and/or TAF-MSCs.

In certain examples, the cell surface marker CD248 (Endosialin) may be used to sort lung TAF MSCs from a population of TAF MSCs. Further surface markers that may be used to sort lung TAF MSCs include DDR-1 (discoidin domain receptor tyrosine kinase 1) as well as LRRC38 (Leucine Rich Repeat Containing Protein 38), all three of which have been identified via antibodies as useful markers for separation. In some examples, Endosialin, DDR-1, and/or LRRC38 alone or in combination with other markers may be used to sort. Endosialin may be combined with DDR-1 or LRRC38 to sort, or DDR-1 and LRRC38 may be combined without Endosialin.

As will be understood by one of skill in the art, suitable combinations of the markers listed in Table 4 and CD248, DDR-1, and LRRC38 may be used to separate lung TAF MSCs from TAF MSCs by selecting for specific markers from Table 4 or combinations of two, three, four, five, six or more markers from Table 4 and/or CD248 and/or DDR-1 and/or LRRC38. In certain examples, lung TAF MSCs can be more specifically identified by identifying a combination of stronger expression, such as 10-fold or more stronger expression (optionally with TPM threshold >2000) of any combination of the foregoing markers, e.g., PCDH19 and/or DDR1 and/or MME and/or IFITM10 and/or BGN and/or NOTCH3 and/or CD248 and/or DDR-1 and/or LRRC38 as compared to TAF MSCs. When using combinations of markers, identification may be achieved with a lower threshold of stronger expression, such as 4-fold or more, 6-fold or more, or 8-fold or more expression of each of the markers.

In contrast to the above surface markers that may be more strongly expressed on the surface of lung TAF MSCs (positive markers) compared to TAF MSCs, in certain examples, the below surface markers may be more weakly expressed on TAF-MSCs as compared to other cell types (negative markers), such as ⅛-fold or less expression (optionally with TPM>500) of any combination of the foregoing markers versus TAF MSCs: CD24, ITGB4, TNFSF10, GFRA1, CD74, FGFR4, HAVCR1, and OSCAR. When using combinations of negative markers, identification may be achieved with a lower threshold of weaker expression, such as ½-fold or less, ¼-fold or less, or ⅙-fold or less expression of each of the markers.

Combinations of two or more these negative markers can also be used to more specifically isolate lung TAF MSCs. In addition, those skilled in the art will also recognize that combinations including both negative and positive markers, such as at any of the thresholds described above, can also be effective to more specifically isolate lung TAF MSCs.

FIGS. 25, 27 and 28 show examples of the results from a proof-of-principle study on the potential use of Lung TAF MSCs for treatment, performed using neonatally sorted TAF MSCs expressing MSC lung cell surface markers including CD248, DDR1, and LRRC38 (called "LBX-THX-001 cells"). The purpose of the study was to investigate the effects of LBX-THX-001 cells in a bleomycin induced lung fibrosis model in male rats. Two cell concentrations (2 M cell/kg and 5 M cells/kg) and two types of vehicles for the cells were tested (PBS and CryoStor CS-10).

The development of fibrosis in rat lung after exposure to bleomycin is well documented in the literature and a frequently used model for studying the pathology of lung fibrosis and also the effect of different treatments. The number of LBX-THX-001 cells injected were chosen to be relevant for a possible human therapy. The number of cells were therefore chosen to reflect cell numbers used in previous studies on rats (8-20 M cells/kg) and humans (0.5-2 M cells/kg).

An intra-tracheal instillation of bleomycin (1000 U/rat) to 34 male SD-rats was used to induce lung fibrosis in the rats. During the first week, the rats were monitored and weighed daily and thereafter twice/week until termination of the study. At day 4 post bleomycin challenge, the LBX-THX-001 cells were administered by an intra-venous (i.v.) injection. The injection volume was 194-535 μL (maximal tolerated injection volume 1 mL/kg). The response to the intra-tracheal instillation of bleomycin was as expected based on previous experience for the model with weight loss during the first days after instillation and thereafter recovery. There were no significant differences in weight loss between the bleomycin group and the treatment groups.

As shown in FIGS. 25, 27 and 28, bleomycin instillation induced fibrotic change in the lung. The histopathological evaluation concluded pathological changes in the bleomycin group both with regard to percent of parenchyma affected and after scoring using the modified Ashcroft scale. As shown in FIGS. 25, 27 and 28, the group treated with LBX-THX-001 cells (2 million cells/kg) 4 days post Bleomycin showed significantly less fibrosis in their lungs compared to the bleomycin group. This was seen both in the histopathological evaluation using the read-out "percent parenchyma affected" (FIGS. 25, 27 and 28) and the fibrosis scoring Ashcroft modified scale (FIGS. 25, 27 and 28). No human MSCs could be detected in rat lungs at termination (after 28 days).

Kidney TAF Cell Markers

Similar to the lung TAF MSC cell markers identified above, a number of surface markers of interest associated with kidney TAF cells were identified. For example, a non-exclusive list of surface markers used to identify and separate kidney TAF MSCs are provided below in Table 5. Similar to the lung TAF MSC markers, the surface markers identified in Table 5 may have at least a 12-fold increase in expression on prioritized kidney TAF clones compared to the average TAF-MSC clone (optionally with TPM threshold >2000). Moreover, as the number of different MSC-subtypes in TAF is limited, the selection of the tissue specific MSCs may be done first by characterization, and thereafter by a stepwise negative selection/sorting of the material by taking into account the combined (multivariate) surface marker profile of the different tissue specific MSC's. One of skill in the art will understand that any such combination of these surface markers may be used for identifying and isolation of kidney TAF cells from the general population of TAF-derived cells and/or TAF-MSC cells. In some examples, the below non-exclusive list of surface markers may be more highly expressed on the surface of kidney-TAF cells as compared to other cell types, such as other TAF-derived cells and/or TAF-MSC cells:

TABLE 5

1. HAVCR1 - hepatitis A virus cellular receptor 1;
2. CD24 - CD24 molecule;
3. CLDN6 - claudin 6;
4. ABCB1 - ATP binding cassette subfamily B member 1;
5. SHISA9 - shisa family member 9;
6. CRB3 - crumbs cell polarity complex component 3;
7. AC118754.1 - Arachidonate 15-lipoxygenase, ALOX15, Smoothelin-like protein 2, SMTNL2, Glutathione hydrolase 6, GGT6, Myb-binding protein 1A, MYBBP1A, Protein spinster homolog 2, SPNS2

TABLE 5-continued

8. ITGB6 - integrin subunit beta 6;
9. CDH1 - cadherin 1;
10. LSR - lipolysis stimulated lipoprotein receptor;
11. EPCAM - epithelial cell adhesion molecule;
12. AJAP1 - adherens junctions associated protein 1;
13. ANO9 - anoctamin 9;
14. CLDN7 - claudin 7;
15. EFNA1 - ephrin A1;
16. MAL2 - mal, T cell differentiation protein 2 (gene/pseudogene);
17. FUR - F11 receptor;
18. L1CAM - L1 cell adhesion molecule;
19. GFRA1 - GDNF family receptor alpha 1;
20. IGSF3 - immunoglobulin superfamily member 3;
21. TNF - tumor necrosis factor;
22. MMP7 - matrix metallopeptidase 7;
23. FOLR1 - folate receptor alpha;
24. TGFA - transforming growth factor alpha;
25. C3 - complement C3;
26. TNFSF10 - TNF superfamily member 10;
27. PDGFB - platelet derived growth factor subunit B; and/or
28. WWC1 - WW and C2 domain containing 1.

As will be understood by one of skill in the art, suitable combinations of the markers listed in Table 5 may be used to separate kidney TAF cells from TAF-MSCs by selecting for specific markers from Table 5 or combinations of two, three, four, five, six or more markers from Table 5. In certain examples, kidney TAF MSCs can be more specifically identified by identifying a combination of stronger expression, such as 12-fold or stronger expression (optionally with TPM threshold >2000) of any combination of the foregoing markers, e.g., HAVCR1 and/or CD24 and/or CLDN6 and/or ABCB1 and/or SHISA9 and/or CRB3 as compared to TAF-MSCs. When using combinations of markers, identification may be achieved with a lower threshold of stronger expression, such as 4-fold or more, 6-fold or more, or 8-fold or more expression of each of the markers.

In contrast to the above surface markers that may be more strongly expressed on the surface of kidney TAF MSCs (positive markers), in certain examples, the below surface markers may be more weakly expressed on kidney TAF cells as compared to other cell types (negative markers), such as such as ⅛-fold or less expression (optionally with TPM threshold >500) of any combination of the foregoing markers other TAF-derived cells and/or TAF-MSC cells: GREM1, PDGFRB, BGN, FAP, CXCL12, CCKAR, CD248. When using combinations of negative markers, identification may be achieved with a lower threshold of weaker expression, such as 1/2-fold or less, ¼-fold or less, or ⅙-fold or less expression of each of the markers.

Combinations of two or more these negative markers can also be used to more specifically isolate kidney TAF MSCs. In addition, those skilled in the art will also recognize that combinations including both negative and positive markers, such as at any of the thresholds described above, can also be effective to more specifically isolate kidney TAF MSCs.

Skin TAF Cell Markers

Similar to the lung and kidney TAF MSC markers identified above, a number of surface markers of interest associated with skin TAF cells were identified. For example, a non-exclusive list of surface markers used to identify and separate skin TAF cells are provided below in Table 6. The skin TAF MSC markers identified in Table 6 may have at least a 12-fold increase in expression on prioritized clones compared to the average TAF-MSC clone (optionally with TPM threshold >2000). Moreover, as the number of different MSC-subtypes in TAF is limited, the selection of the tissue specific MSC may be done by firstly characterization, thereafter a stepwise negative selection/sorting of the material by taking into account the combined (multivariate) surface marker profile of the different tissue specific MSC's. One of skill in the art will understand that any such combination of these surface markers may be used for identifying and isolation of skin TAF cells from the general population of TAF-derived cells and/or TAF-MSC cells. In some examples, the below non-exclusive list of surface markers may be more highly expressed on the surface of skin-TAF cells as compared to other cell types, such as other TAF-derived cells and/or TAF-MSC cells:

TABLE 6

| | |
|---|---|
| 1. | TNFSF18 - TNF superfamily member 18; |
| 2. | PCDH19 - protocadherin 19; |
| 3. | NCAM2 - neural cell adhesion molecule 2; |
| 4. | TNFSF4 - TNF superfamily member 4; |
| 5. | CD248 - Endosialin; |
| 6. | DDR2 - discoidin domain receptor tyrosine kinase 2; |
| 7. | HTR2B - 5-hydroxytryptamine receptor 2B; |
| 8. | PCDH18 - protocadherin 18; |
| 9. | SULF1 - sulfatase 1; |
| 10. | MME - membrane metalloendopeptidase; |
| 11. | ADGRA2 - adhesion G protein-coupled receptor A2; |
| 12. | DCSTAMP - dendrocyte expressed seven transmembrane protein; |
| 13. | PDGFRA - platelet derived growth factor receptor alpha; |
| 14. | UNC5B - unc-5 netrin receptor B; |
| 15. | SCUBE3 - signal peptide, CUB domain and EGF like domain containing 3; |
| 16. | CEMIP - cell migration inducing hyaluronidase 1; |
| 17. | BDKRB1 - bradykinin receptor B1; |
| 18. | FLT1 - fms related tyrosine kinase 1; |
| 19. | BDKRB2 - bradykinin receptor B2; |
| 20. | FAP - fibroblast activation protein alpha; |
| 21. | CASP1- caspase 1; and/or |
| 22. | SRPX2 - sushi repeat containing protein X-linked 2. |

As will be understood by one of skill in the art, suitable combinations of the markers listed in Table 6 may be used to separate skin TAF MSCs from TAF-MSCs by selecting for specific markers from Table 6 or combinations of two, three, four, five, six or more markers from Table 6. In certain examples, skin TAF MSCs can be more specifically identified by identifying a combination of stronger expression, such as 12-fold or more stronger expression (optionally with TPM>2000) of any combination of the foregoing markers, e.g., TNFSF18 and/or PCDH19 and/or NCAM2 and/or TNFSF4 and/or CD248 and/or DDR2 as compared to TAF-MSCs. When using combinations of markers, identification may be achieved with a lower threshold of stronger expression, such as 4-fold or more, 6-fold or more, or 8-fold or more expression of each of the markers.

In contrast to the above surface markers that may be more strongly expressed on the surface of skin TAF cells (positive markers), in certain examples, the below surface markers may be more weakly expressed on skin TAF cells as compared to other cell types (negative markers), such as such as ⅛-fold or less expression (optionally with TPM threshold >500) of any combination of the foregoing markers other TAF-derived cells and/or TAF-MSC cells: CD24, TNFSF10, ITGB4, ABCB1. When using combinations of negative markers, identification may be achieved with a lower threshold of weaker expression, such as $\overrightarrow{1/2}$-fold or less, ¼-fold or less, or ⅙-fold or less expression of each of the markers.

Combinations of two or more these negative markers can also be used to more specifically isolate skin TAF MSCs. In addition, those skilled in the art will also recognize that combinations including both negative and positive markers, such as at any of the thresholds described above, can also be effective to more specifically isolate skin TAF MSCs.

Neural TAF Cell Markers

Similar to the lung, kidney, and skin TAF MSC markers identified above, a number of surface markers of interest associated with neural TAF cells were identified. For example, a non-exclusive list of surface markers used to identify and separate neural TAF cells are provided below. The neural TAF MSC surface markers identified in Table 7 may have at least a 3-fold increase in expression on prioritized clones compared to the average TAF-MSC clone (optionally with TPM threshold >500). Moreover, as the number of different MSC-subtypes in TAF is limited, the selection of the tissue specific MSC may be done by firstly characterization, thereafter a stepwise negative selection/sorting of the material by taking into account the combined (multivariate) surface marker profile of the different tissue specific MSC's. One of skill in the art will understand that any such combination of these surface markers may be used for identifying and isolation of neural TAF cells from the general population of TAF-derived cells and/or TAF-MSC cells. In some examples, the below non-exclusive list of surface markers may be more highly expressed on the surface of neural-TAF cells as compared to other cell types, such as other TAF-derived cells and/or TAF-MSC cells:

TABLE 7

| | |
|---|---|
| 1. | HAVCR1 - hepatitis A virus cellular receptor 1; |
| 2. | ACKR3 - atypical chemokine receptor 3; |
| 3. | OSCAR - osteoclast associated Ig-like receptor; |
| 4. | C3 - complement C3; |
| 5. | SIRPB1 - signal regulatory protein beta 1; |
| 6. | SLC6A6 - solute carrier family 6 member 6; |
| 7. | CCKAR - cholecystokinin A receptor; |
| 8. | TNFSF10 - TNF superfamily member 10; |
| 9. | CLSTN2 - calsyntenin 2; |
| 10. | TENM2 - teneurin transmembrane protein 2; |
| 11. | SFRP1 - secreted frizzled related protein 1; |
| 12. | PIK3IP1 - phosphoinositide-3-kinase interacting protein 1; |
| 13. | SCNN1D - sodium channel epithelial 1 delta subunit; |
| 14. | CLDN11 - claudin 11; |
| 15. | ALDH3B1 - aldehyde dehydrogenase 3 family member B1; and/or |
| 16. | ITGB4 - integrin subunit beta 4. |

As will be understood by one of skill in the art, suitable combinations of the markers listed in Table 7 may be used to separate neural TAF MSCs from TAF-MSCs by selecting for specific markers from Table 7 or combinations of two, three, four, five, six or more markers from Table 7. In certain examples, neural TAF MSCs can be more specifically identified by identifying a combination of stronger expression, such as 3-fold or stronger expression (optionally with TPM threshold >500) of any combination of the foregoing markers, e.g., HAVCR1 and/or ACKR3 and/or OSCAR and/or C3 and/or SIRPB1 and/or SLC6A6 as compared to TAF-MSCs. When using combinations of markers, identification may be achieved with a lower threshold of stronger expression, such as 2-fold or more or a higher threshold such as 6-fold or more, 8-fold or more, or 12-fold or more expression of each of the markers. In addition, those skilled in the art will also recognize that combinations including both negative and positive markers, such as at any of the thresholds described above, can also be effective to more specifically isolate neural TAF MSCs.

Example 1

Reducing T Cell Activation in Human Tissue

The effect of human Mesenchymal Stem Cells (MSCs) on T cell activation and macrophage activation/polarization using human Peripheral Blood Mononuclear Cells (PBMCs) was evaluated in the non-limiting example described below.

For ex vivo analysis, freshly isolated human PBMCs, pooled from three donors, were activated with anti-CD3/anti-CD28 at 10 µg/ml and 5 µg/ml respectively in presence of MSCs ex vivo for 24-72 hours. Following activation, cells were analyzed for effects on cellular composition and cell proliferation using CFSE. In addition, supernatants were analyzed for cytokine levels using Luminex.

Reagents
- AbC Total Compensation capture beads (Life Technologies, A10497)
- AD-MSCs (provided by Sponsor)
- Anti-CD3 (Nordic Biosite, 300438)
- Anti-CD28 (Nordic Biosite, 302934)
- Anti-human CD4—PerCp (Nordic Biosite, 344624)
- Anti-human CD8—QDot800 (Thermo Fisher, Q22157)
- Anti-human CD80—BV421 (Nordic Biosite, 305222)
- Anti-human CD73—FITC (Nordic Biosite, AM26144FC-N)
- Anti-human PD-1—PE (Nordic Biosite, 329906)
- Anti-human CD163—BV605 (Nordic Biosite, 333616)
- Anti-human CD206—BV711 (Nordic Biosite, 321136)
- Cell culture medium (provided by Sponsor)
- Carboxyfluorescein succinimidyl ester (CFSE), (Sigma, 21888)
- HBSS (Gibco, Life Technologies, 14175)
- Human MSCs (provided by Sponsor)
- Human PBMCs (Blodcdentralen, Lunds Universitetssjukhus, Lund)
- Luminex 12-plex (RnD Systems, LXSAHM-12)
- mqH$_2$O (QPAK1, Millipore)
- Negative beads (Life Technologies, A10497)
- PBS (Gibco, Life Technologies, 14190)

Equipment
- Attune Nxt (ThermoFisher Scientific, Sunnyvale, California, USA)
- Scepter cell counter (Millipore Merck, MA, USA) SpectraMax
- Luminex (Bio-Rad, Solna, Seden)
- Thermo scientific cell culture plate 96-well U bottom (Thermo Fisher, 168136)
- V-bottom plates (Nunc, 732-0191)
- Falcon Tubes (VWR, 734-0443)

Ex Vivo Assay

In this example, Peripheral Blood Mononuclear Cells (PBMCs) were isolated from leucocyte concentrate from three different donors (acquired from Blodcentralen, Lunds Universitetssjukhus, Lund, Sweden) through gradient centrifugation using Ficoll. Red blood cells (RBCs) were lysed using lysis buffer (3 min, RT), cells were washed and the isolated PBMCs were pooled. Cell concentration was determined using a Scepter cell counter (Millipore Merck, MA, USA). Cells were diluted to 1×10$^7$ cells/ml in PBS. Pooled PBMCs were split into 2 different tubes. Pool one was stained with CFSE at 5 µM for 5 minutes (dark, RT). CFSE stained cells were washed with an equal volume of FBS to stop the reaction and washed again with PBS. Pool 2 was left in PBS.

All cells (PBMCs and MSCs) were diluted in two different cell culture media (M3 and M4) at 2*10$^6$ cells/ml. Media was supplemented with anti-CD28 at 5 µg/ml. Cells were added to anti-CD3 (10 µg/ml) coated U bottom cell culture plates according to layout below, 200 µl/well in different PBMC:MSC ratios (1:10, 1:5, 1:2.5, 1:0 and 0:1).

Included were also controls (stimulated and unstimulated PBMCs) and two reference drugs, e.g., cyclosporine (CsA) and Prednisolone. When plating controls, cells were spun down and diluted in media 3 or 4 at 4*10$^6$ cells/ml. 100 µl PBMCs were added per well. CsA was added at a final concentration of 10 µg/ml and Prednisolone was added at a final concentration of 125 nM. Medium was added to unstimulated control wells. Control cells (AD-MSC) were also analyzed. Cells were incubated for 24-72 hours at 37° C., 5% CO$_2$.

FACS Analysis (Cell Composition)

Figure 36:
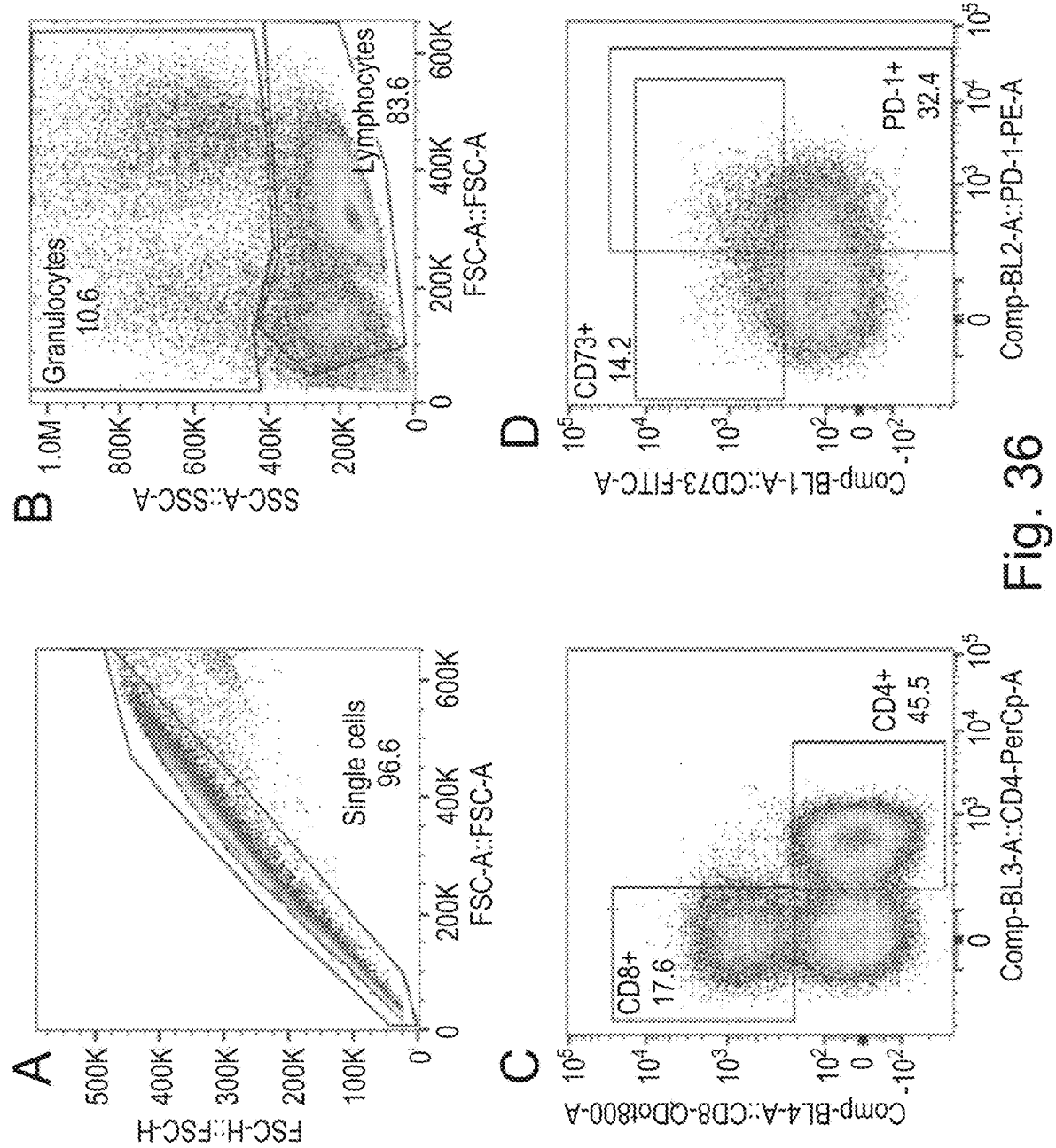
FIG. 36 provides an example gating strategy shown for PBMC sample activated with aCD3/aCD28 in cell composition plates. A) Gating of single cells, B) gating of lymphocytes and granulocytes, C) gating of CD4+ and CD8+ cells among lymphocytes, D) gating of PD-1+ and CD73+ cells among CD4+ lymphocytes, E) gating of PD-1+ and CD73+ cells among CD8+ lymphocytes, F) gating of CD80+ cells among granulocytes, G) gating of CD73+ cells CD80+ granulocytes, H) gating of CD206+ cells among granulocytes, I) gating of CD163+ cells among CD206+ granulocytes and J) gating of CD73+ cells among CD163+ CD206+ granulocytes.
Figure 36:
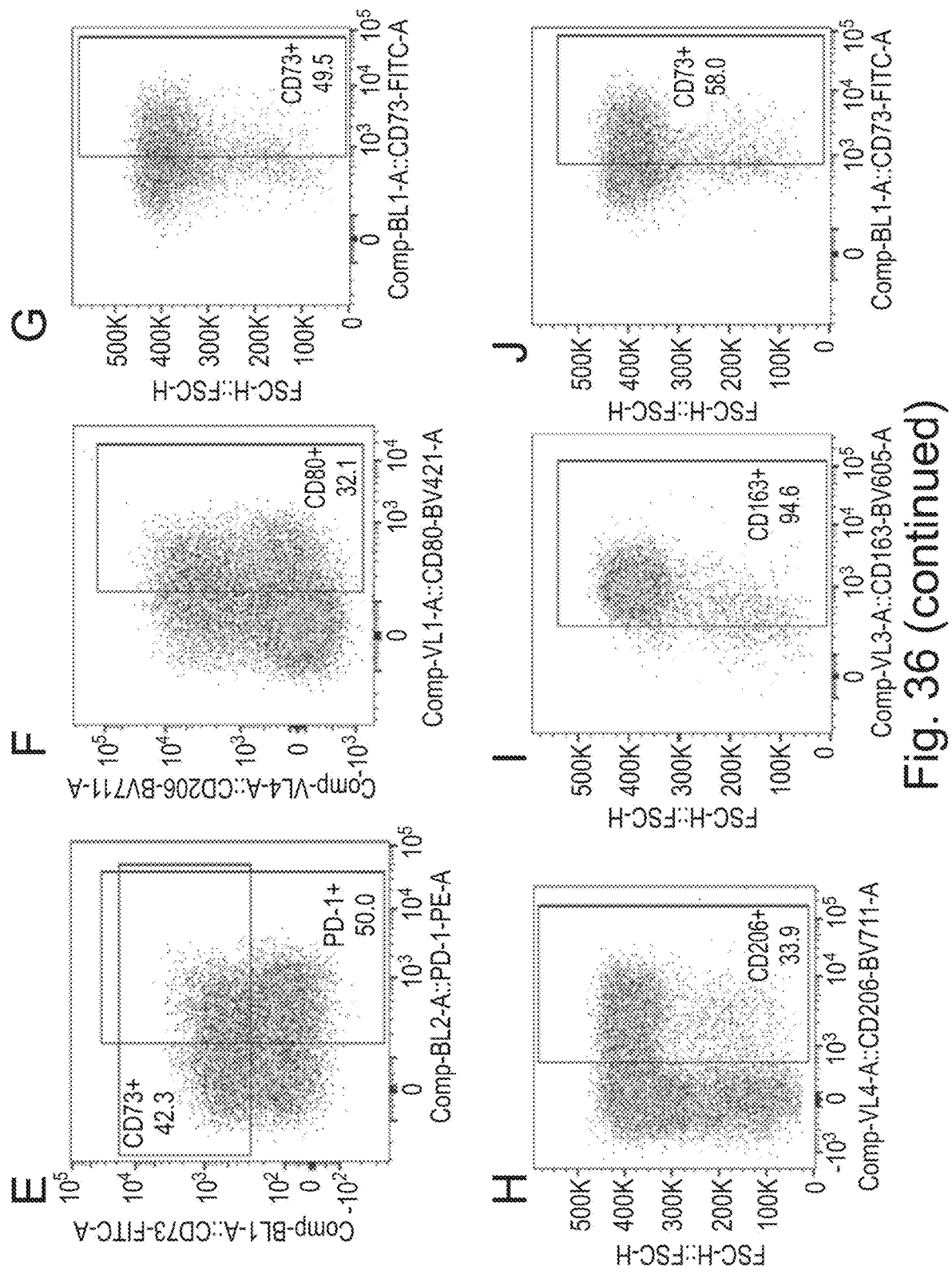

Following 24 hours of incubation, cells in FACS/Luminex plates were stained with CD73, CD4, CD8, CD80, CD206, CD163 and PD-1. Briefly, cells were transferred to V bottom plates and centrifuged at 360×g for 2 min. Supernatant was transferred to a storage plate and put in −20° C. until analysis using Luminex. Cells were washed in PBS, centrifuged at 360×g for 2 min at 4° C. Supernatant was flicked off and surface markers were added. Cells were incubated at +4° C. for 20 minutes (dark). After incubation, cells were washed 1× in PBS, centrifuged at 360×g for 2 min at 4° C. Cells were resuspended in PBS and analyzed using the Attune Nxt flow cytometer. Gating strategies are shown in FIG. 36. Compensation was performed using beads—AbC Total Compensation capture beads and negative beads. Since compensation was done using beads, FSC and SSC were changed before analyzing samples and adjusted to suit cells.

FACS Analysis (CFSE Proliferation)

To continue with this example, after 72 hours of incubation, CFSE stained cells were stained with CD4, CD8, CD80, CD206 and CD163. Briefly, cells were transferred to V bottom plates and centrifuged at 360×g for 2 min. Cells were washed in PBS, centrifuged at 360×g for 2 min at 4° C. Supernatant was flicked off and surface markers were added. Cells were incubated at +4° C. for 20 minutes. After incubation, cells were washed 1× in PBS, centrifuged at 360×g for 2 min at 4° C. Cells were resuspended in PBS and analyzed using flow cytometry. Compensation was performed using beads—AbC Total Compensation capture beads and negative beads. Since compensation was done using beads, FSC and SSC were changed before analyzing samples and adjusted to suit cells.

Luminex Analysis

Supernatant (24 hours incubation) was analyzed for cytokines using the 12-plex LXSAHM-12 Luminex kit. All reagents, standard and samples were prepared at room temperature and according to manufacturer's instruction. Briefly, 50 µl of standard or sample was added to wells. Microparticles were added to samples and standard and samples were incubated for 2 hours at room temperature on a horizontal orbital shaker (800 rpm). Plate was washed 3× in washing buffer using a magnetic plate. Biotin-antibody was added and incubated dark for 1 hour at room temperature on a horizontal orbital shaker (800 rpm). Plate was washed 3× in washing buffer using a magnetic plate. Streptavidin-PE was added to each well and incubated dark at room temperature on a horizontal orbital shaker (800 rpm) for 30 minutes. Plate was washed 3× in washing buffer using a magnetic plate. Microparticles were resuspended in 100 µl washing buffer, incubated for 2 minutes on a horizontal orbital shaker (800 rpm). Samples were analyzed on a Bio-Rad Luminex analyzer.

Acquisition and Analysis

Graphs were performed using Prism 8 for Mac OS X (GraphPad Software, San Diego, CA, USA). Results are presented as mean values±SEM, if not otherwise stated.

The inhibitory effect was calculated according to the two formulas below:

$$\text{Coculture } norm\ prolif\ (\%) = \frac{\text{Coculture } prolif}{\text{Stimulated single } PBMC \text{ culture } prolif}$$

$$\text{Inhibitory effect} = 100 - \text{coculture normalized } prolif$$

Results

The gate on lymphocytes also includes the monocyte population since T cells were found there as well.

CONCLUSIONS

In this study, novel test items effect was evaluated on T cell activation and macrophage activation/polarization in human PBMCs. PBMCs were isolated from leucocyte concentrate from three different donors. Pooled PBMCs were either stained with CFSE at 5 µM for 5 minutes and added to MSCs or directly added to MSCs. PBMCs and MSCs were diluted in two different cell culture media (M3 and M4) at different PBMC:MSC. Cell populations were analyzed using flow cytometry after 24 or 72 hours. CFSE proliferation were analyzed after 72 hours and cytokine levels in supernatant was analyzed after 24 hours.

PBMC:MSC ratios used in this experiment were: 1:0, 1:2,5, 1:5, 1:10 and 0:1. Thus more MSCs than PBMS were added per well. The reciprocal experiment will be performed in study LBA.1B.

Figure 37:
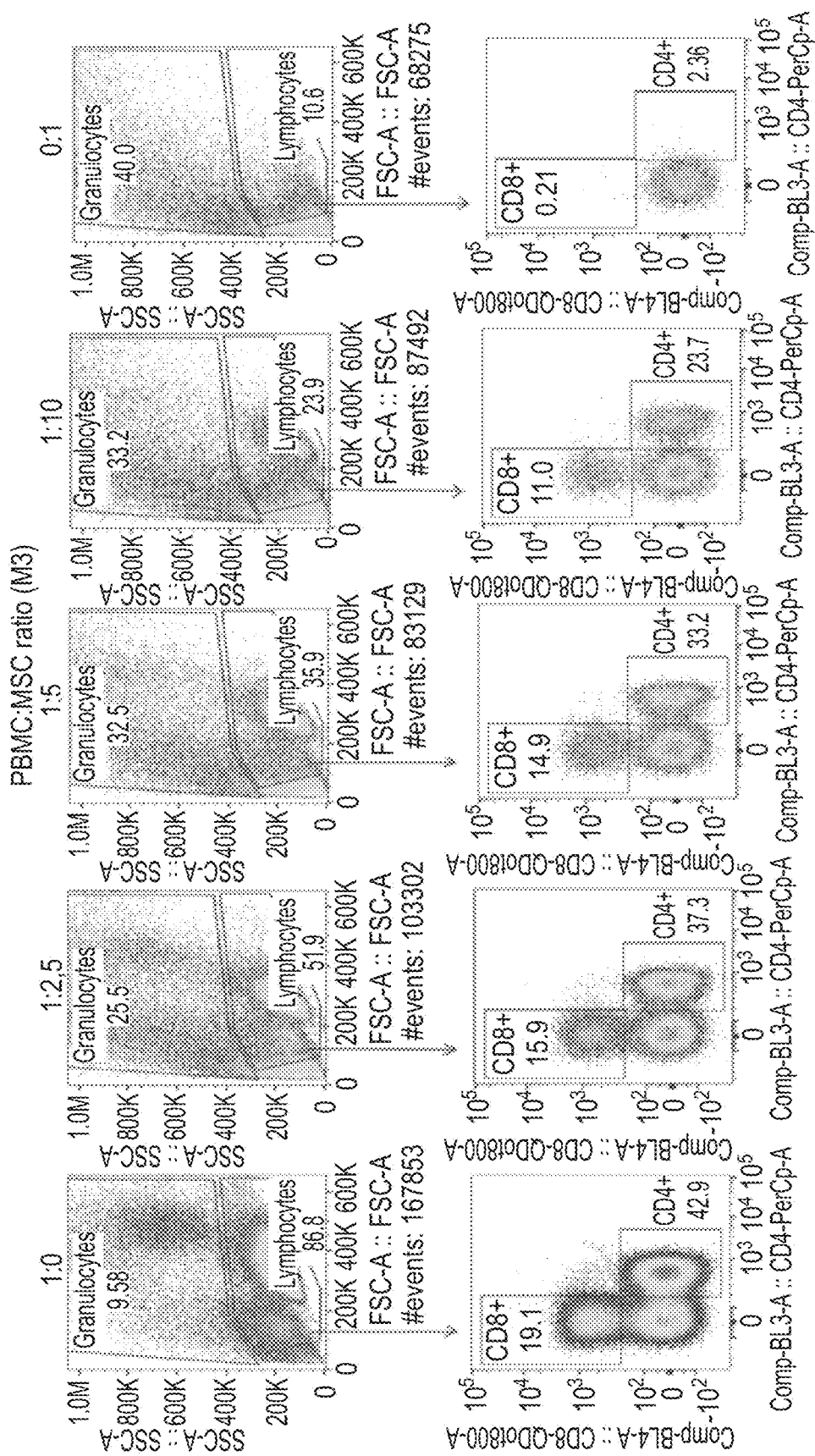
FIG. 37 provides representative data and figures (FSC vs SSC and CD4 vs CD8) for PBMC:MSC ratios 1:0, 1:2,5, 1:5, 1:10 and 0:1 with number of events, activated with aCD3/aCD28 in cell composition plate. Laser settings were chosen for optimal analysis of PBMCs, therefore MSC events are on the chart edges.

PBMC:MSC ratio 0:1 in FIG. 37 show almost no T cells or macrophages and FACS results can therefore not be compared with other ratios.

Figure 38:
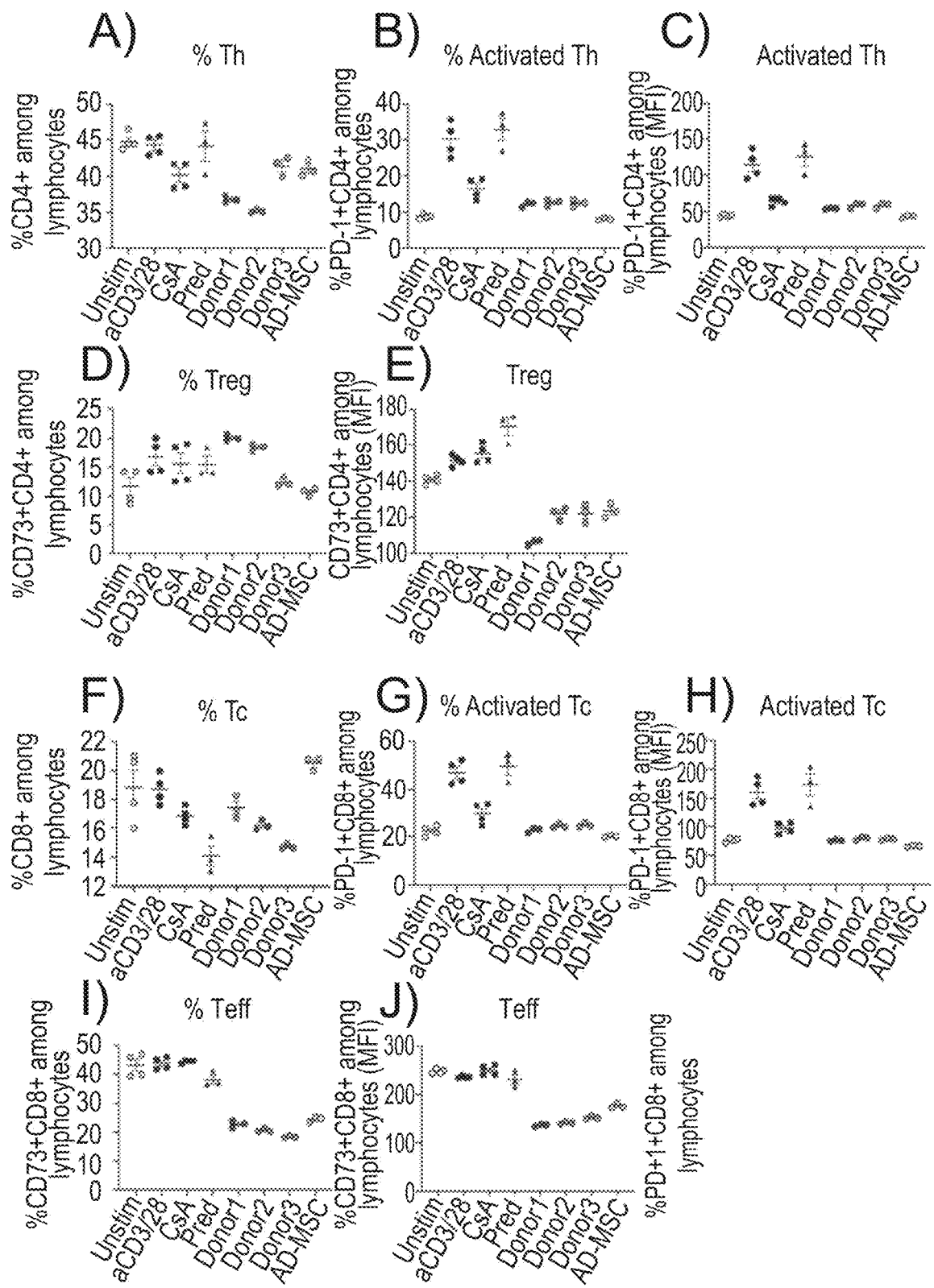
FIG. 38 provides example data for PBMCs and MSCs that were co-cultured in a PBMC:MSC ratio of 1:2,5 and activated with aCD3/aCD28. Cell populations were analyzed using flow cytometry after 24 hours of incubation. Results show A) % CD4+ among lymphocytes, B) % PD-1+ among CD4+ lymphocytes, C) Expression of PD-1 on CD4+ lymphocytes (MFI), D) % CD73+ among CD4+ lymphocytes, E) Expression of CD73 on CD4+ lymphocytes (MFI), F) % CD8 among lymphocytes, G) % PD-1+ among CD8+ lymphocytes, H) Expression of PD-1 on CD8+ lymphocytes (MFI), I) % CD73+ among CD8+ lymphocytes and J) Expression of CD73 on CD8+ lymphocytes (MFI). Results are presented as mean values (of % or median fluorescent intensity)+/−SEM.
Figure 39:
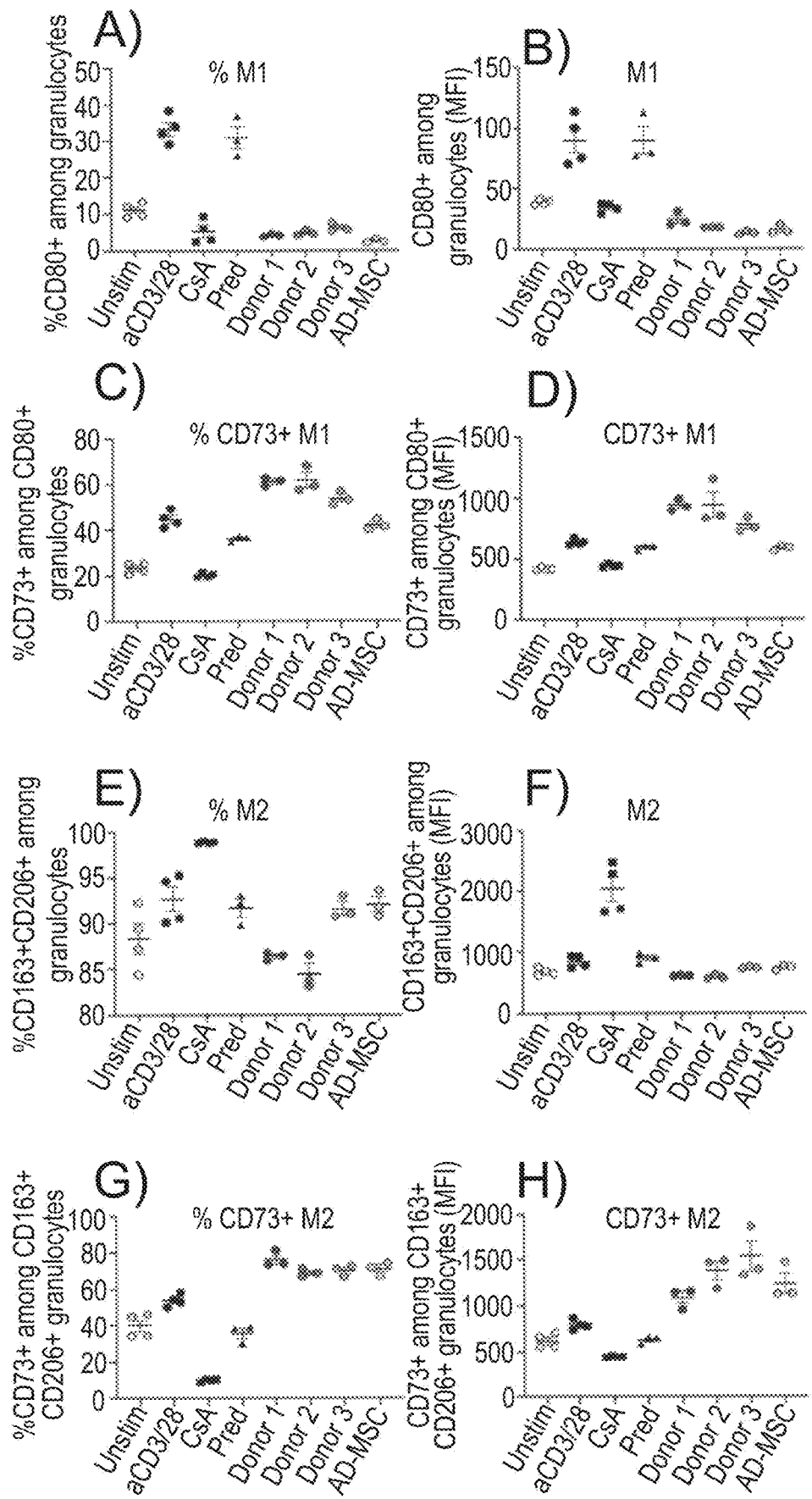
FIG. 39 Provides example data for PBMCs and MSCs that were co-cultured in a PBMC:MSC ratio of 1:2,5 and activated with aCD3/aCD28. Cell populations were analyzed using flow cytometry after 24 hours of incubation. Results show A) % CD80+ among granulocytes, B) Expression of CD80 on granulocytes (MFI), C) % CD73+ among CD80+ granulocytes, D) Expression of CD73 on CD80+ granulocytes (MFI), E) % CD163+ among CD206+ granulocytes, F) Expression of CD163 on CD206+ granulocytes (MFI), G) % CD73+ among CD163+CD206+ granulocytes, H) Expression of CD73 on CD163+CD206+ granulocytes, I) Expression of CD206 on granulocytes (MFI) and J) Expression of CD163 on granulocytes (MFI). Results are presented as mean values (of % or median fluorescent intensity)+/−SEM.
Figure 39:
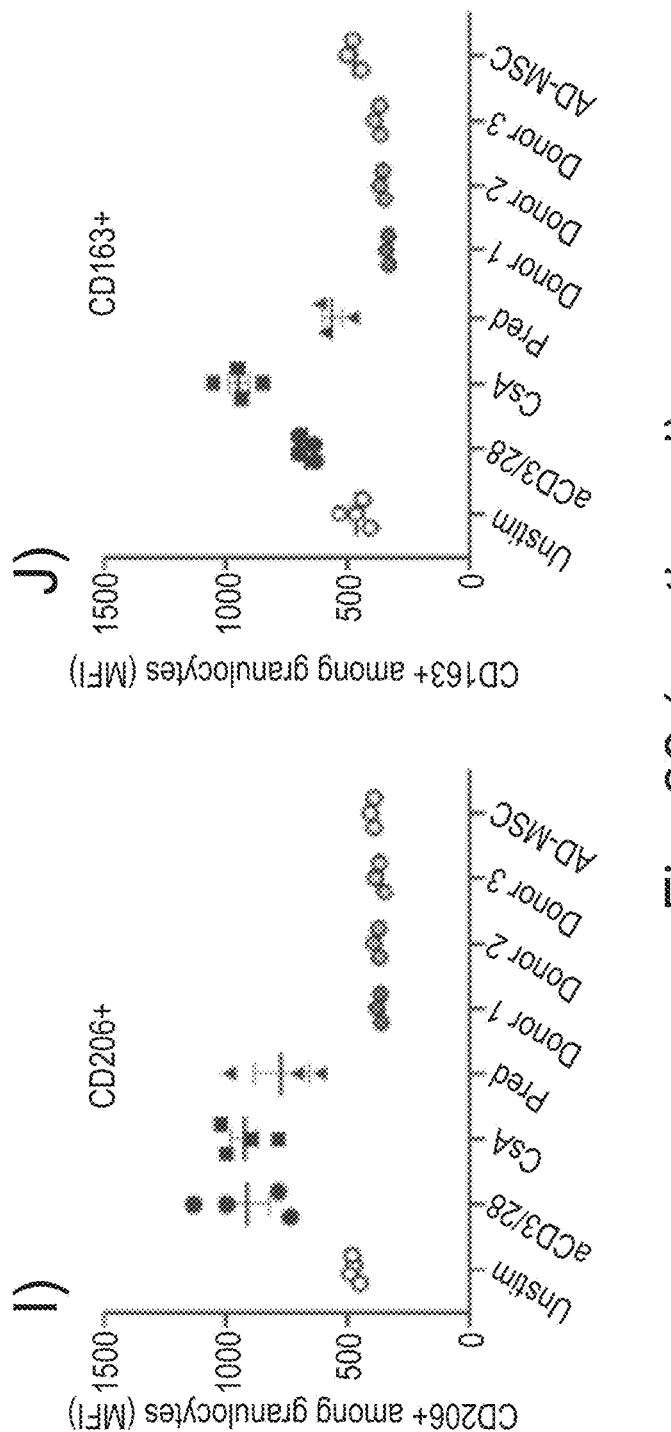
Figure 40:
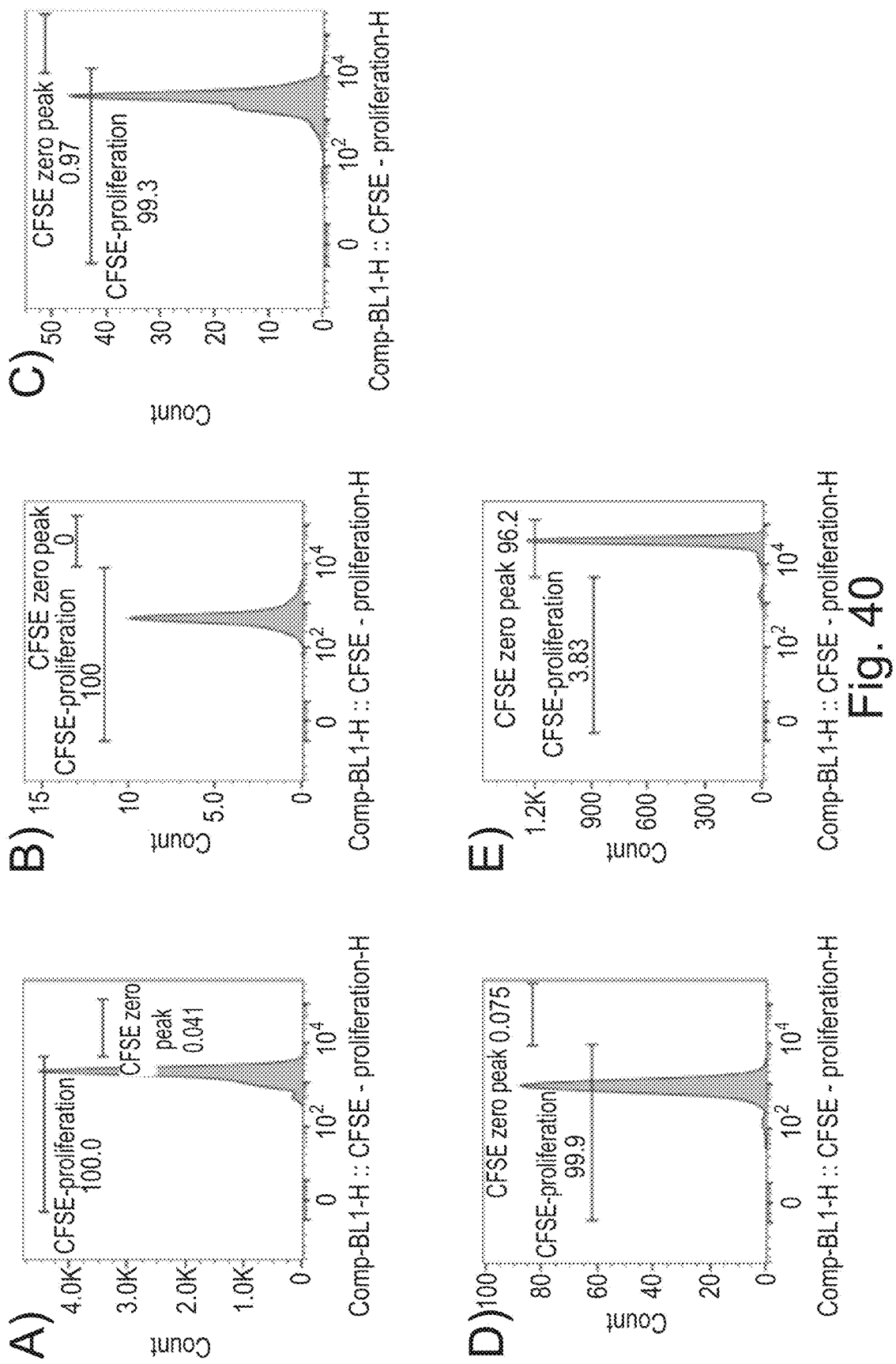
FIG. 40 provides an example Gating strategy for CFSE plates. A) Gating of CFSE proliferation among CD4+ lymphocytes, B) gating of CFSE proliferation among CD8+ lymphocytes, C) gating of CFSE proliferation among CD80+ granulocytes, D) gating of CFSE proliferation among CD163+CD206+ granulocytes and E) gating of CFSE zero peak among CD4+ lymphocytes. CFSE zero peak was measured immediately after staining cells prior to incubation.

According to results in FIG. 37, a co-culture with PBMCs and MSCs have no effect on % T helper cells (CD4+ lymphocytes) after 24 hours of incubation. Although, there is a lower expression level of activated T helper cells (PD-1+CD4+ lymphocytes) compared with control after 24 hours of incubation. Results show no effect when PBMCs were co-cultured with MSCs on % cytotoxic T cells (CD8+ lymphocytes) after 24 hours of incubation but the expression level of activated cytotoxic T cells (PD-1+CD8+ lymphocytes) is lower compared with control. A co-culture with PBMCs and MSCs results in a lower expression level of activated T helper cells and a lower expression level of activated cytotoxic T cells after 24 hours of incubation. The expression level of T effector cells (CD73+CD8+ lymphocytes) is also lower compared with control. According to results in FIG. 38, a co-culture with PBMCs and MSCs results in a lower expression level of M1 (CD80+ granulocytes). An increased expression level of both CD73+M1 and CD73+M2 can be seen after 24 hours of incubation with a co-culture of PBMCs and MSCs.

Assay controls (cell composition): Prednisolone treated PBMCs show lower levels of % cytotoxic T cells and higher levels of % T helper cells. CsA treated PBMCs show a lower expression level of T helper cells, activated T helper cells and cytotoxic T cells. CsA treated PBMCs show a lower expression level of M1. Both CsA and Prednisolone show a shift towards M2 and a lower expression level of CD73+M1 and CD73+M2.

Figure 41:
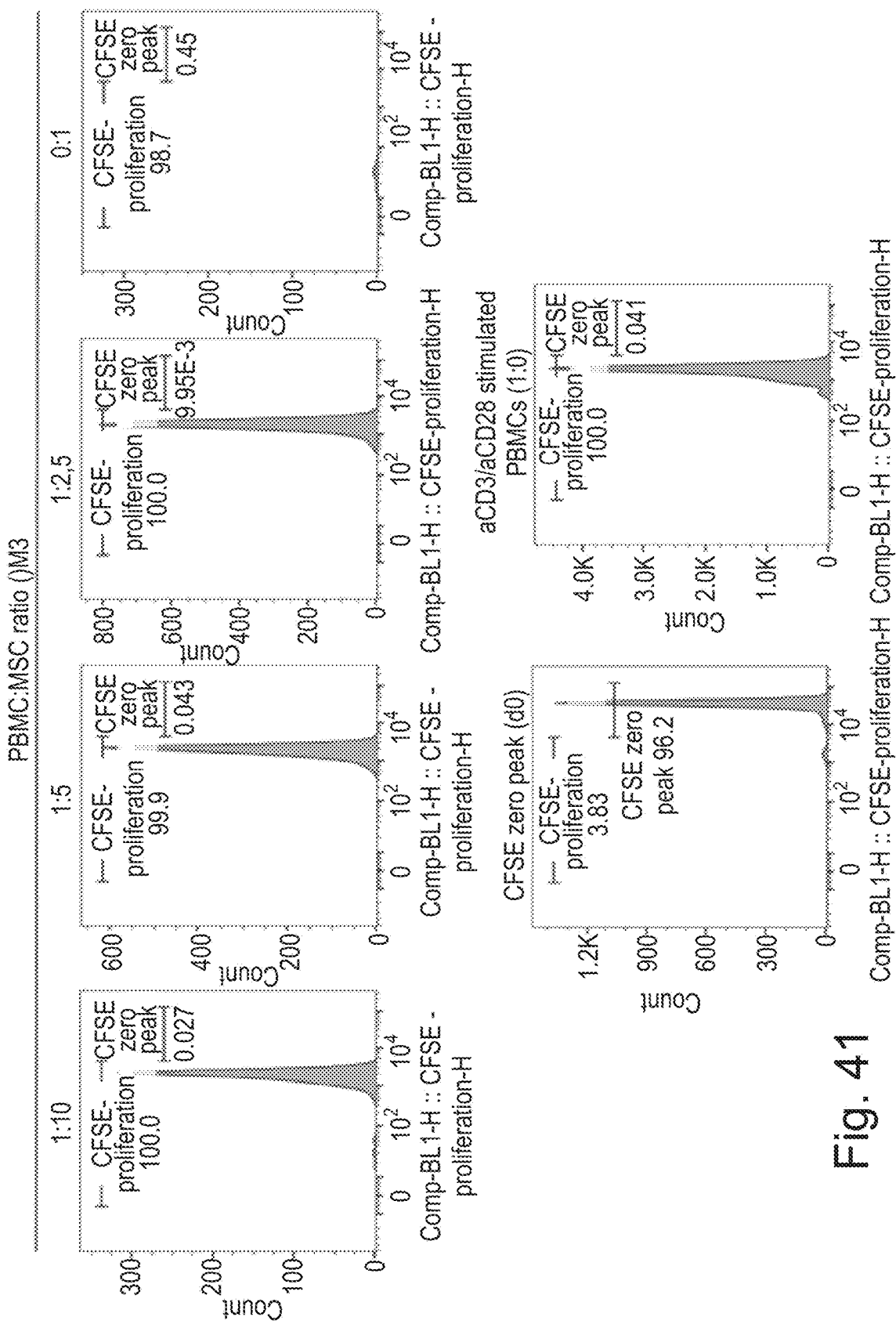
FIG. 41 provides representative data and graphs of CFSE proliferation (CD4+ cells), analyzed using flow cytometry after 72 hours of incubation. PBMCs and MSCs were co-cultured in different ratios (PBMC:MSC—1:10, 1:5, 1:2, 5, 1:0 and 0:1) in two different medias (M3 and M4). CFSE zero peak was measured immediately after staining cells prior to incubation.
Figure 41:
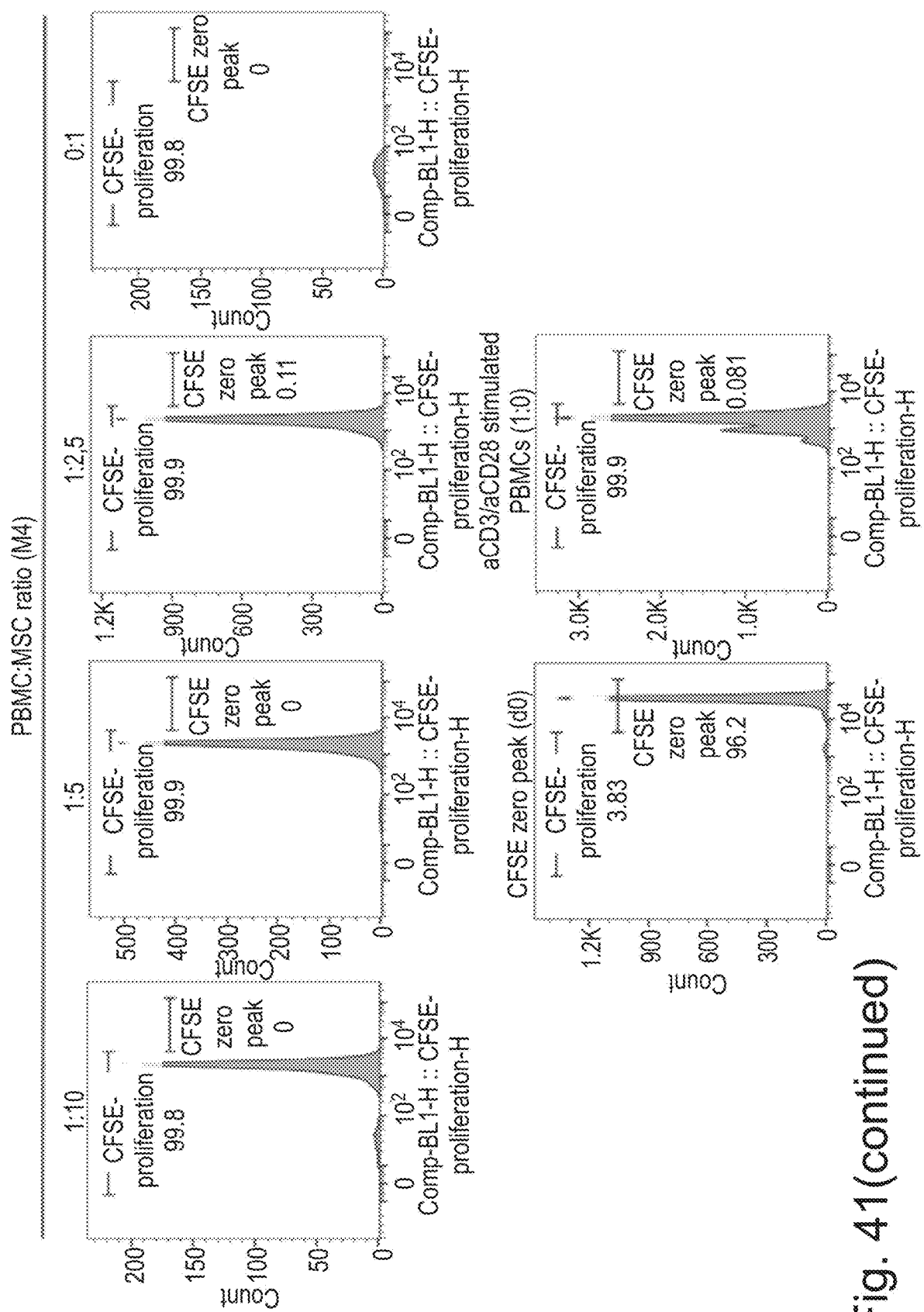
Figure 42:
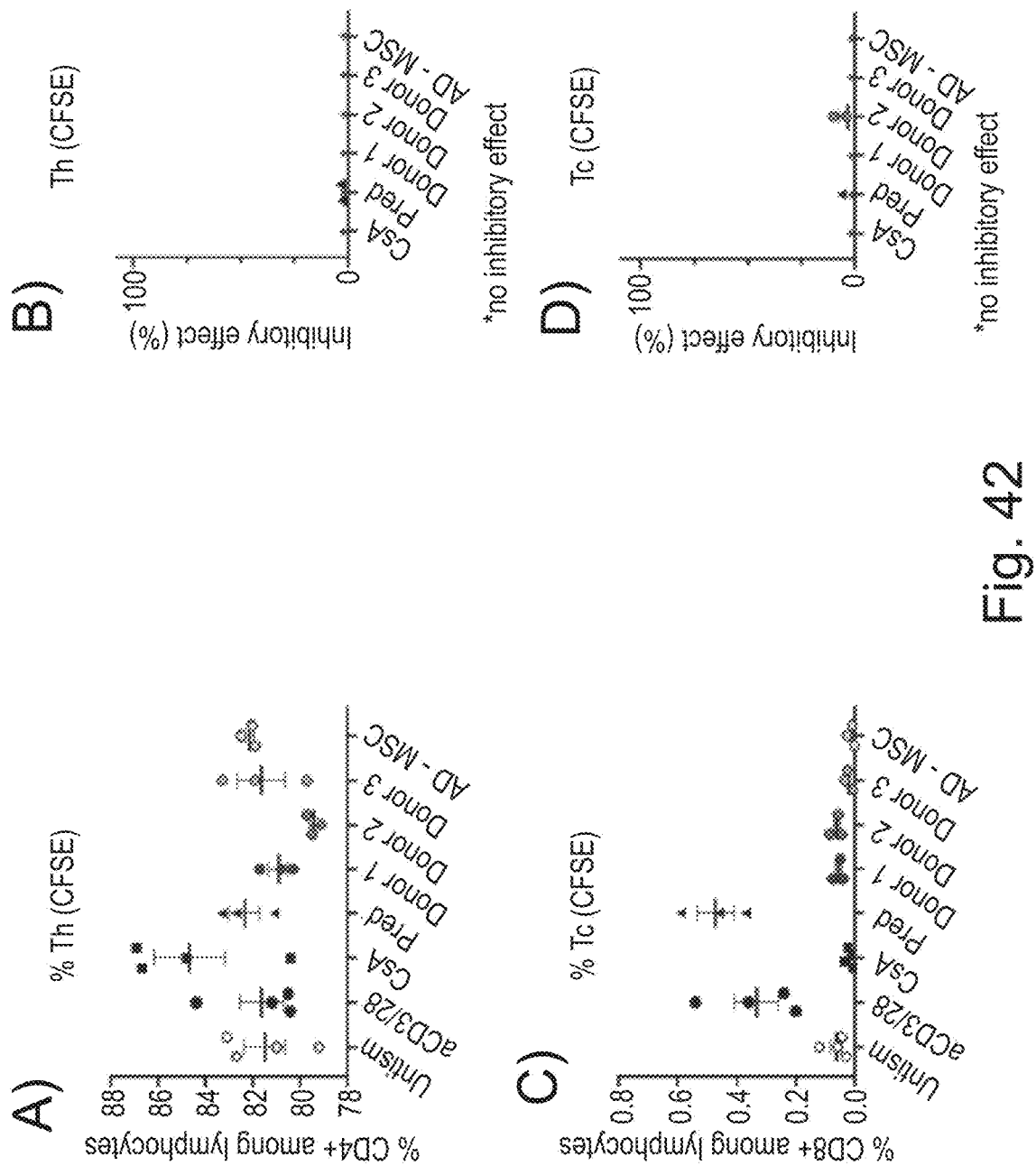
FIG. 42 provides example data for PBMCs and MSCs that were co-cultured in a PBMC:MSC ratio of 1:2,5 and activated with aCD3/aCD28. Cell populations were analyzed using flow cytometry after 72 hours of incubation. Results show A) % CD4+ among lymphocytes, B) inhibitory effect on CD4+ cells among lymphocytes, C) % CD8+ among lymphocytes and D) inhibitory effect on CD8+ cells among lymphocytes. Results are presented as mean values+/−SEM.

According to results in FIG. 41, a co-culture with PBMCs and MSCs show no effect on T helper cells or cytotoxic T cells after 72 hours of incubation. Although, as results show in FIG. 42, a co-culture with PBMCs and MSCs show a strong inhibitory effect on both M1 and M2 expression levels.

Assay controls (CFSE proliferation): CsA and Prednisolone treated cells show no effect on % T helper cells or cytotoxic T cells after 72 hours of incubation. Although, CsA shows a strong inhibitory effect on the M1 expression level but shows no effect on the M2 expression level. Prednisolone shows no effect on M1 or M2 expression levels.

Figure 43:
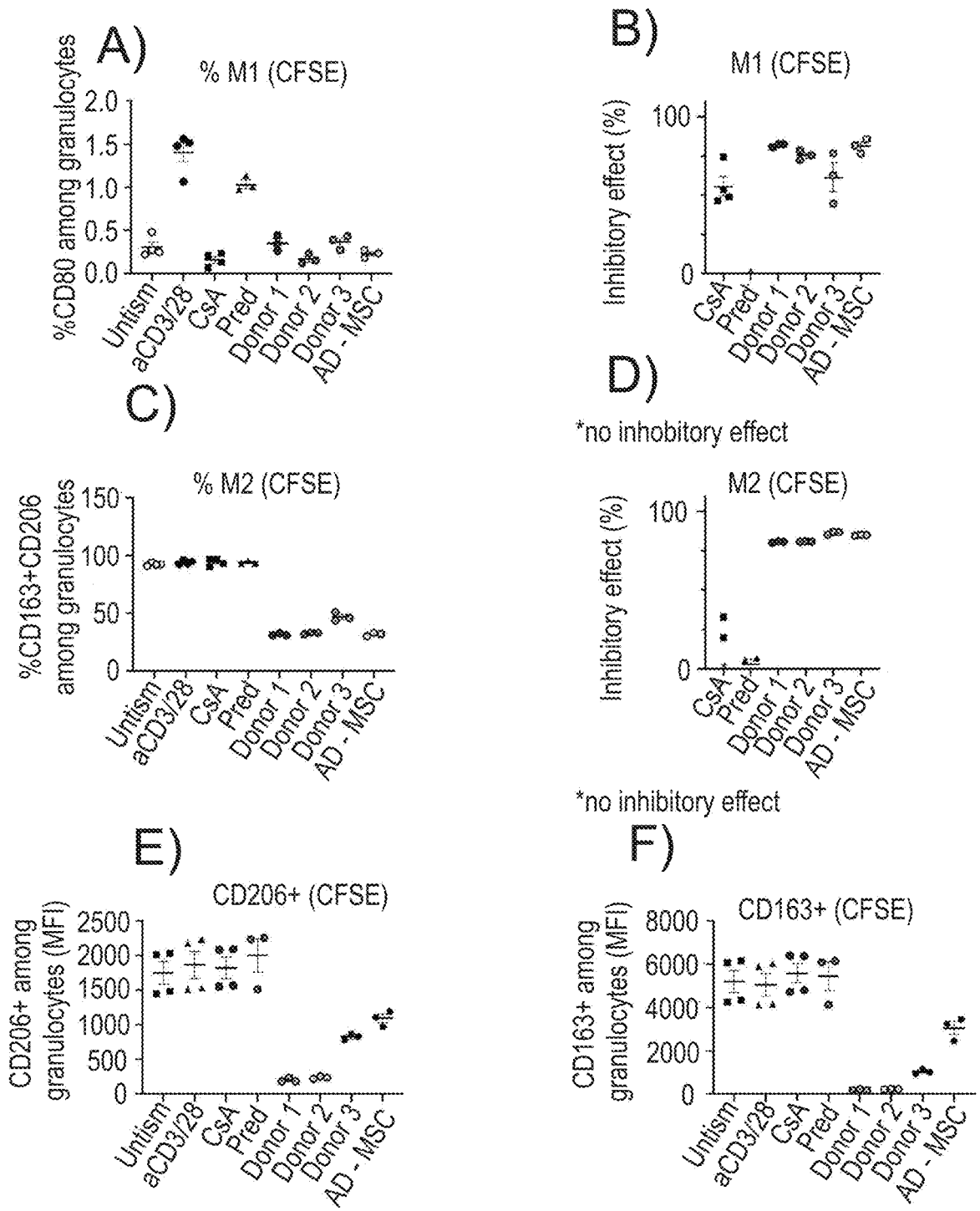
FIG. 43 provides example data for PBMCs and MSCs were co-cultured in a PBMC:MSC ratio of 1:2,5 and activated with aCD3/aCD28. Cell populations were analyzed using flow cytometry after 72 hours of incubation. Results show A) % CD80+ among granulocytes, B) inhibitory effect on CD80+ cells among granulocytes, C) % CD163+ among CD206+ granulocytes, D) inhibitory effect on CD163+ CD206+ cells among granulocytes, E) Expression of CD206 on granulocytes (MFI) and F) Expression of CD163 on granulocytes (MFI). Results are presented as mean values (of % or median fluorescent intensity)+/−SEM.
Figure 44:
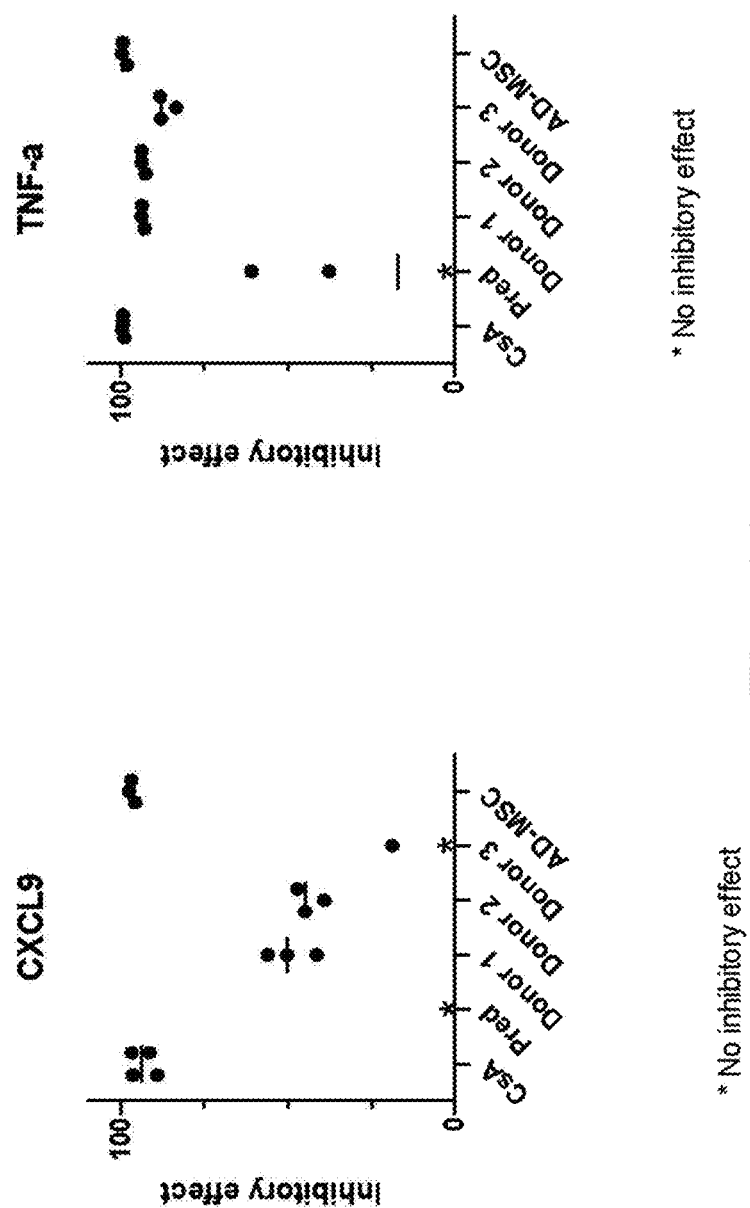
FIG. 44 provides example data for PBMCs and MSCs that were co-cultured in a PBMC:MSC ratio of 1:2,5 and activated with aCD3/aCD28. Cytokine levels in supernatant from cells in FACS/Luminex plates were analyzed using Luminex after 24 hours of incubation. Results show A) CXCL9 levels and B) TNF-α levels in ratio 1:2,5 in media 3. Results are presented as mean values+/−SEM. There were no effects on other analyzed cytokines.
Figure 45:
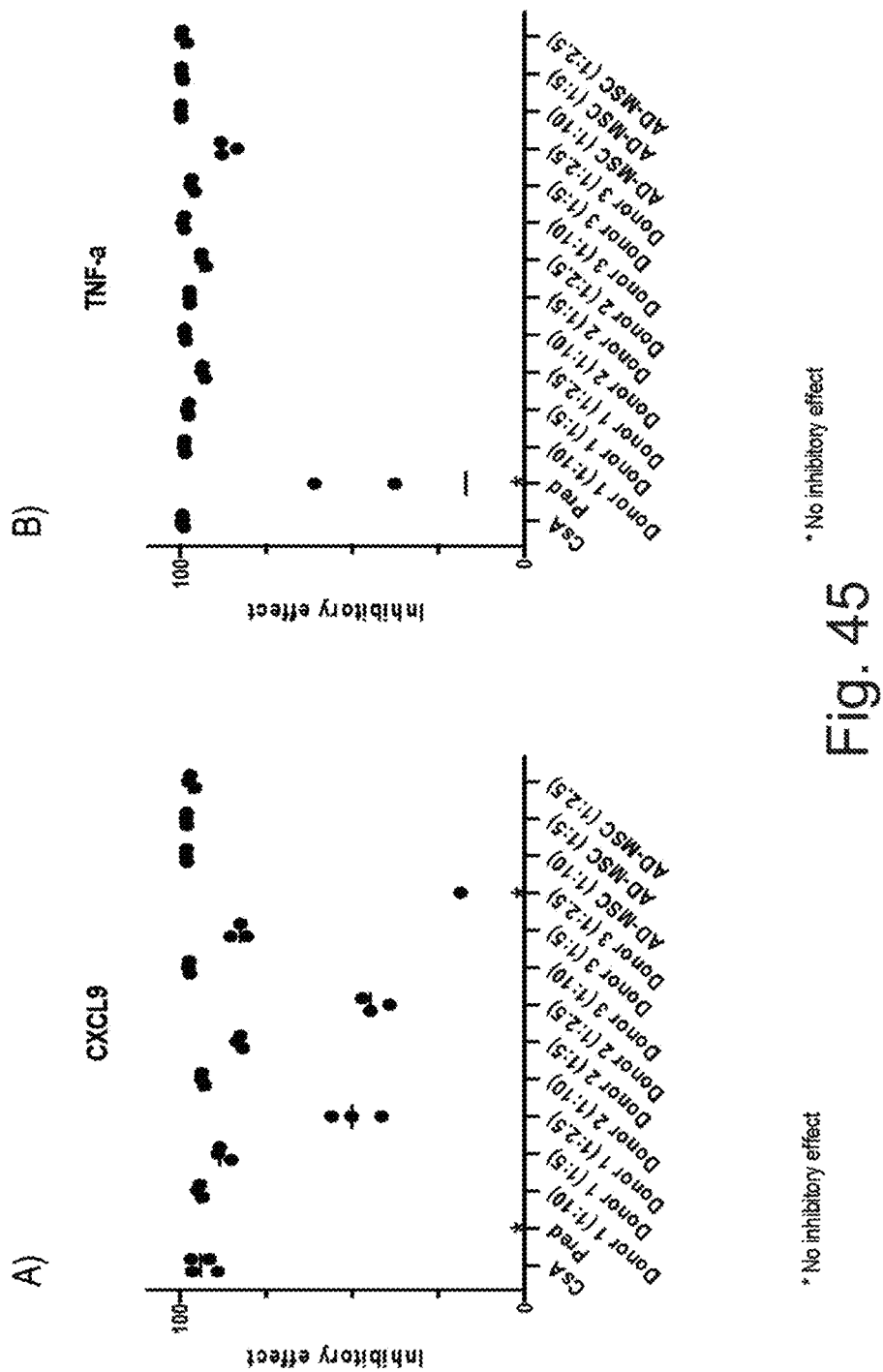
FIG. 45 provides example data for PBMCs and MSCs that were co-cultured in a PBMC:MSC ratio of 1:2,5 and activated with aCD3/aCD28. Cytokine levels in supernatant from cells in FACS/Luminex plates were analyzed using Luminex after 24 hours of incubation. Results show A) CXCL9 levels and B) TNF-α levels (all ratios) in media 3. Results are presented as mean values+/−SEM.
Figure 46:
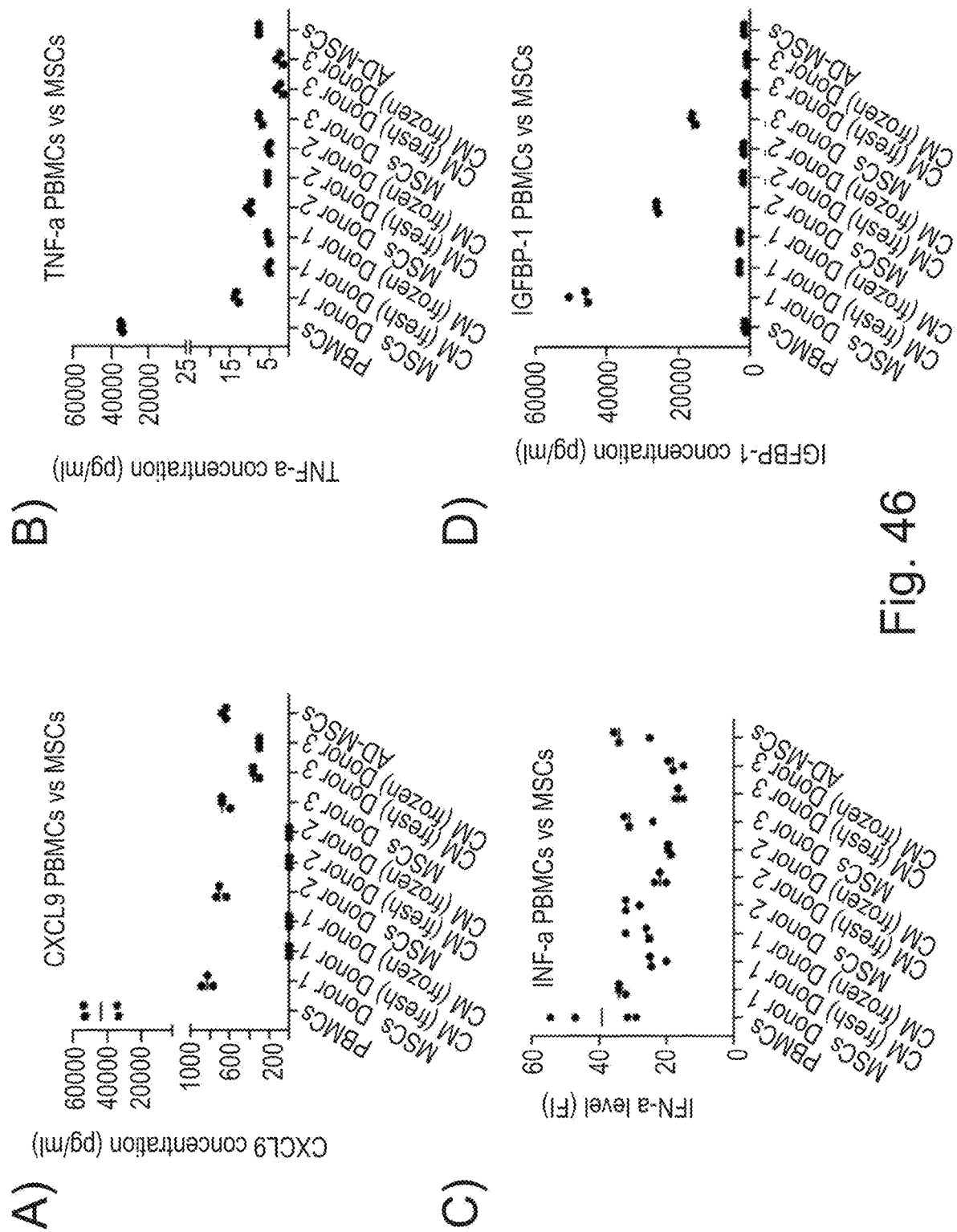
FIG. 46 provides example data showing analysis of cytokine levels in supernatants from PBMCs alone, MSCs alone and in CM from all donors using Luminex after 24 hours of incubation. Results show A) CXCL9 levels, B) TNF-α levels, C) IFN-α levels, D) IGFBP-1 levels, E) IL-10 levels, F) IL-18 levels, G) HGF levels, H) IFN-g levels, I) IL-6 levels, J) IL-12/23 levels, K) b-NGF levels and L) VEGF levels in supernatant from wells with cell ratio 1:2,5 in media 3. Results are presented as mean values+/−SEM.
Figure 46:
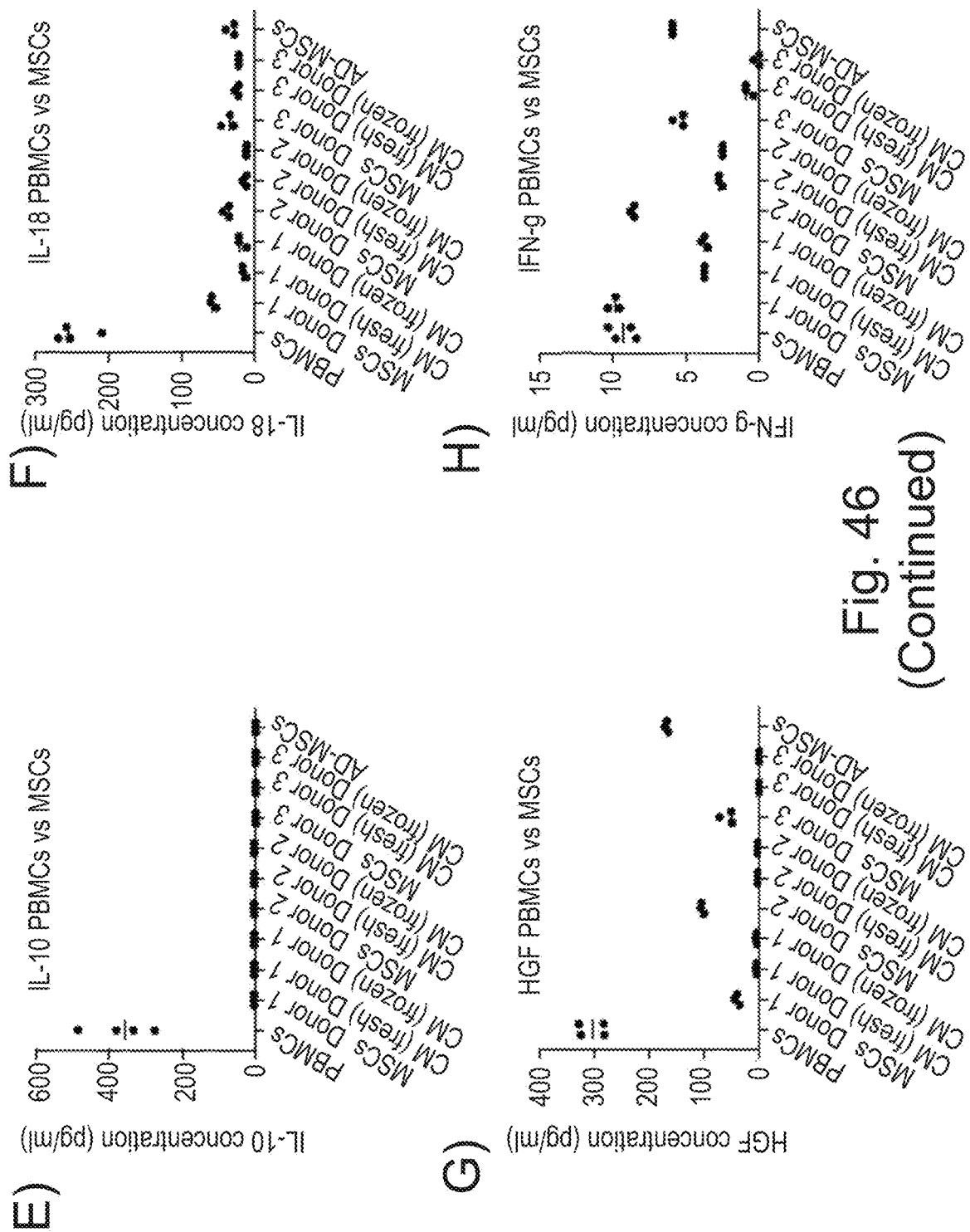
Figure 46:
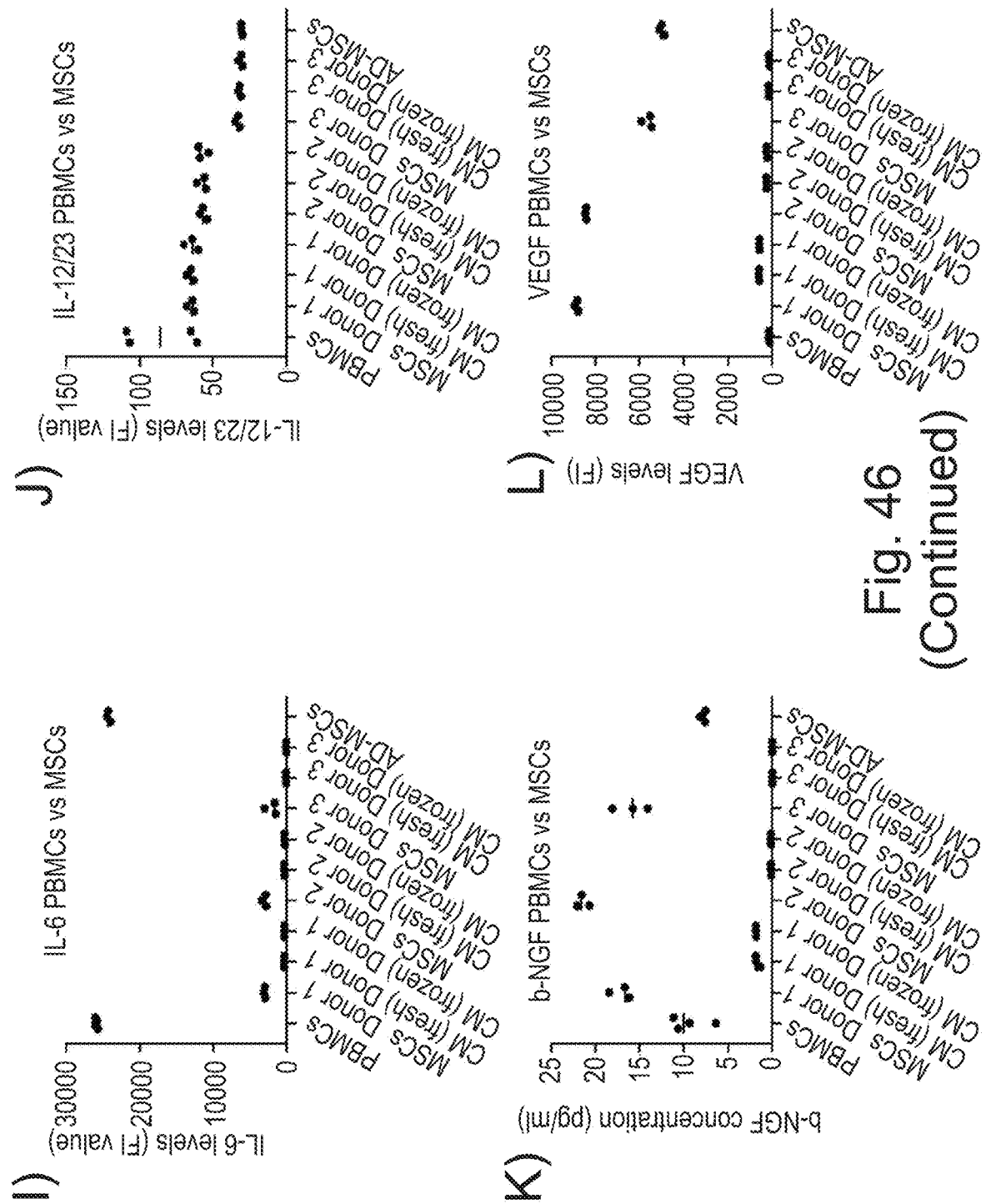
Figure 47:
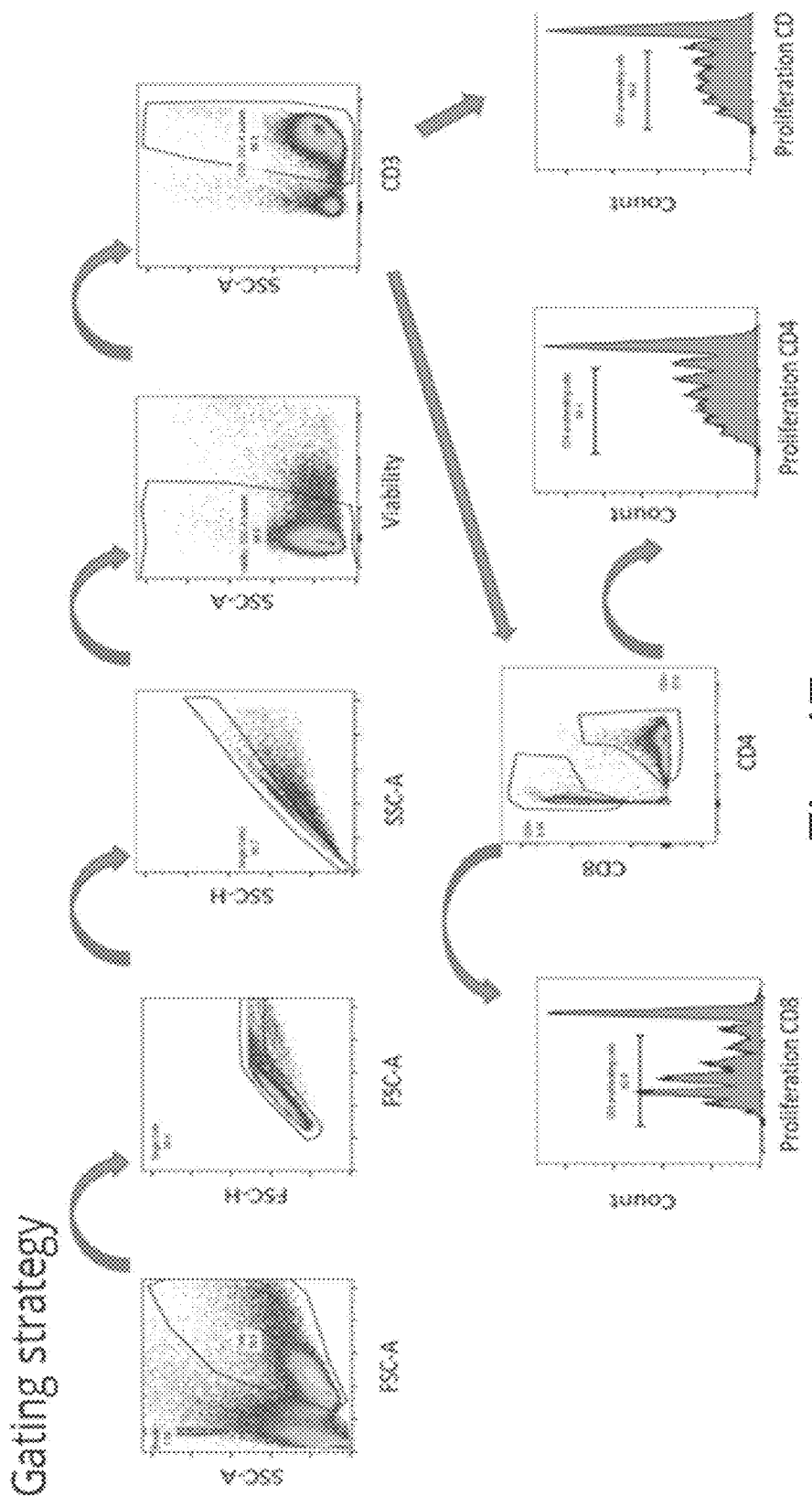
FIG. 47 provides an example of a gating strategy for T cell characterization.
Figure 48:
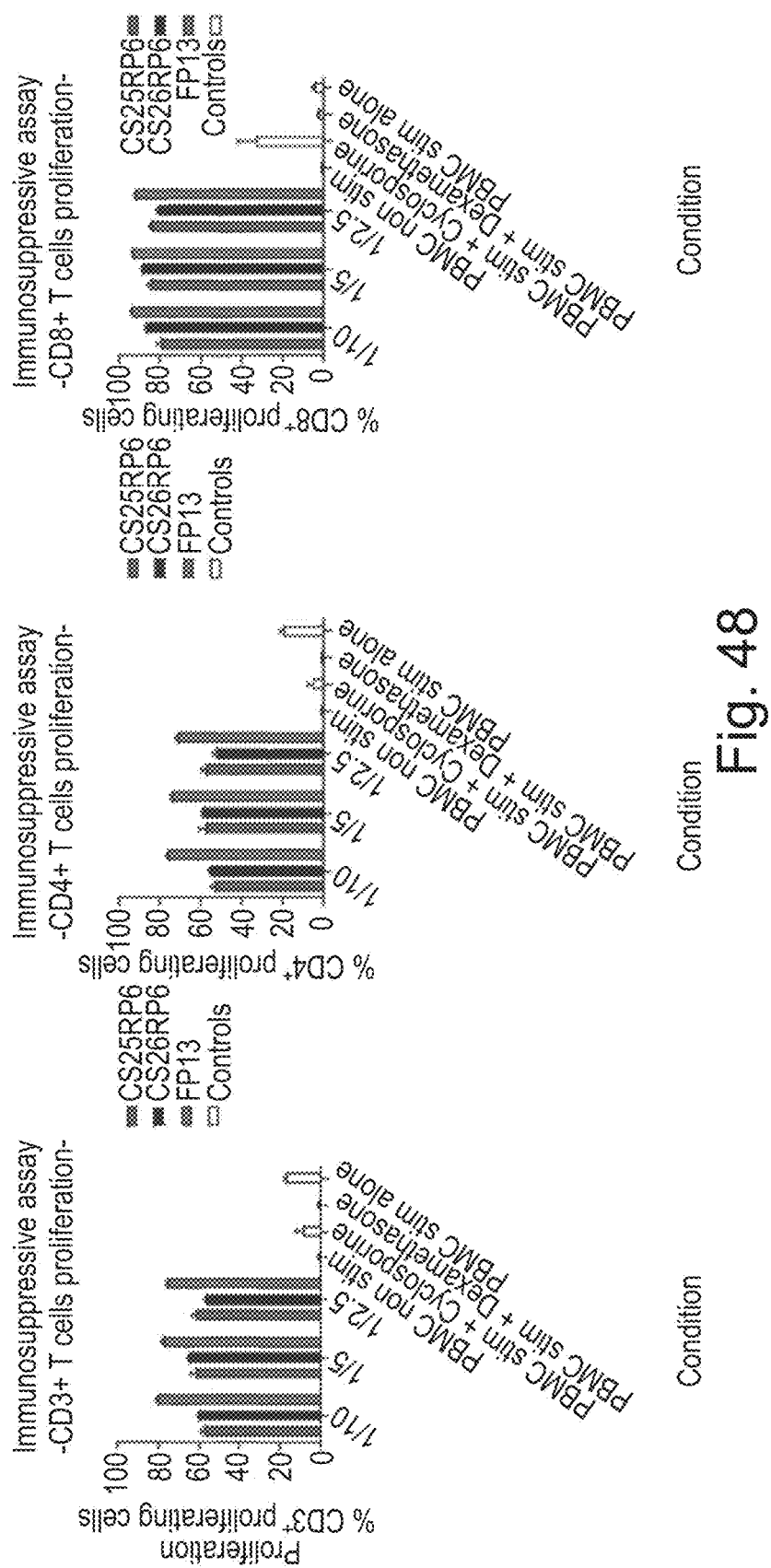
FIG. 48 provides an example of T cell proliferation (upper graphs) and PD-1 expression (lower graphs) in CD3 (left graphs), CD4 (middle graphs) and CD8+ T cell populations (right graphs) in a suppressive assay. 3 stem cell-derived products, CS26Rp6, CS25Rp6 and FP13, were evaluated at three ratios (1/10, 1/5 and 1/2.5). The data is represented as Mean+SEM. N=3.
Figure 48:
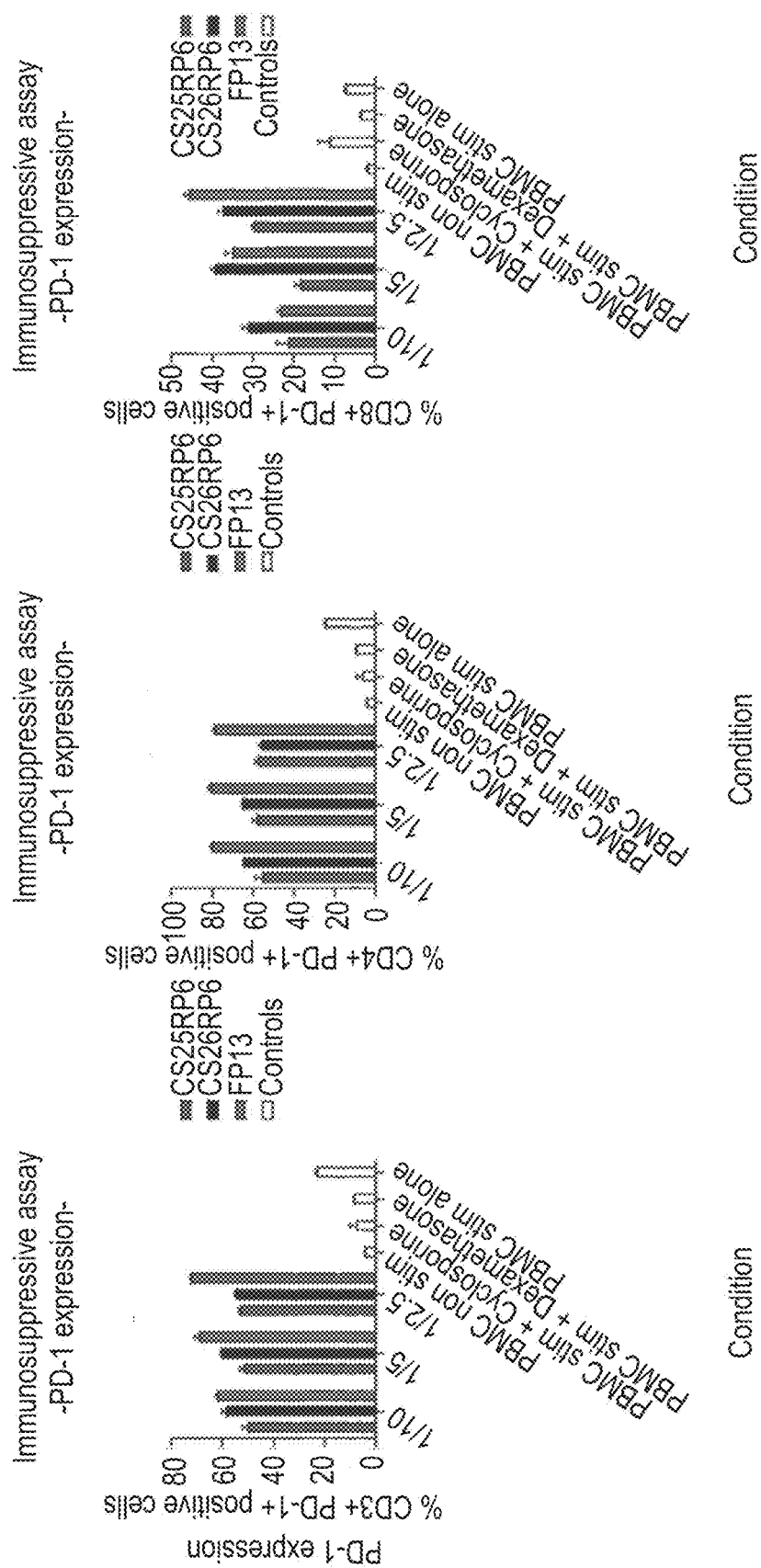
Figure 49:
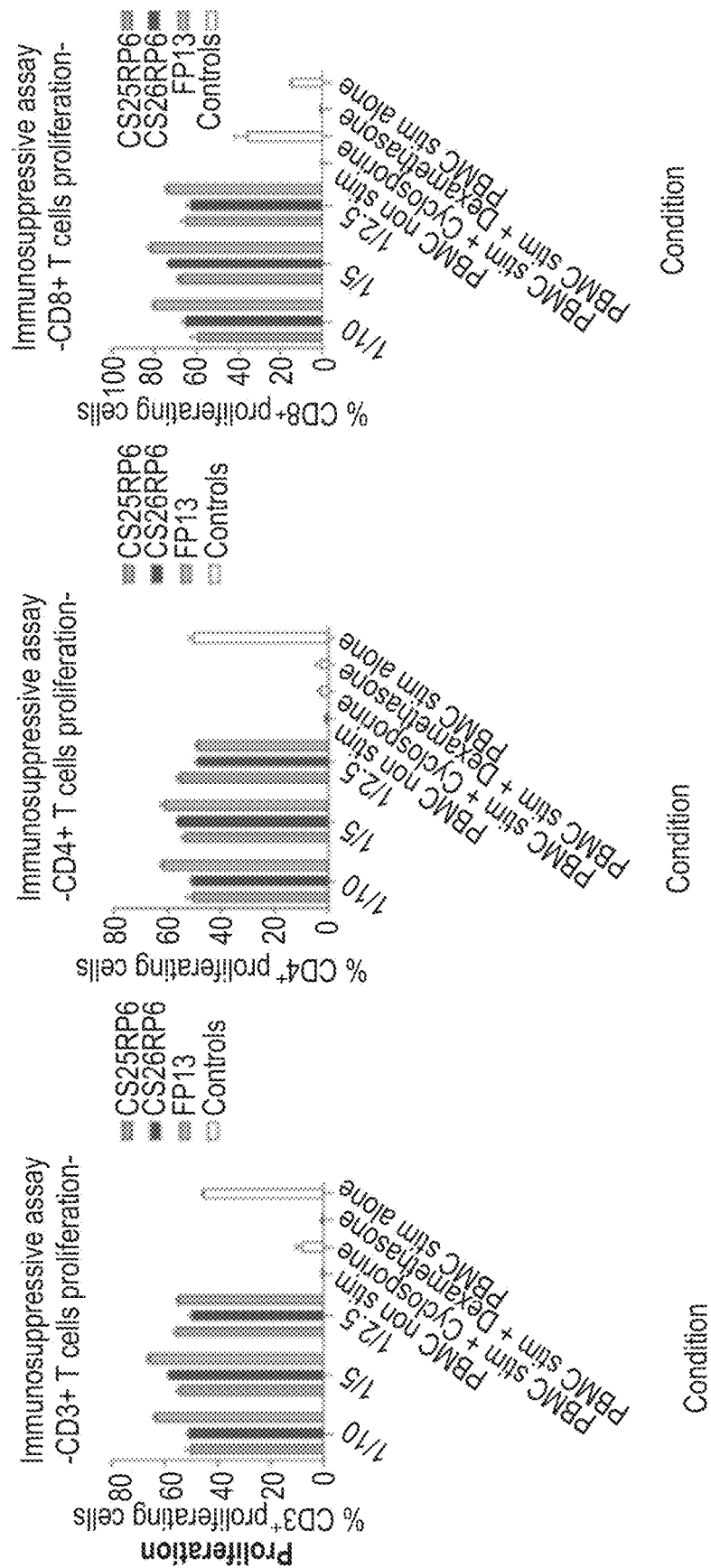
FIG. 49 provides an example of T cell proliferation (upper graphs) and PD-1 expression (lower graphs) in CD3 (left graphs), CD4 (middle graphs) and CD8+ T cell populations (right graphs) in a suppressive assay. 3 stem cell-derived products, CS26Rp6, CS25Rp6 and FP13, were evaluated at three ratios (1/10, 1/5 and 1/2.5). Data represent Mean+SEM. N=3.
Figure 49:
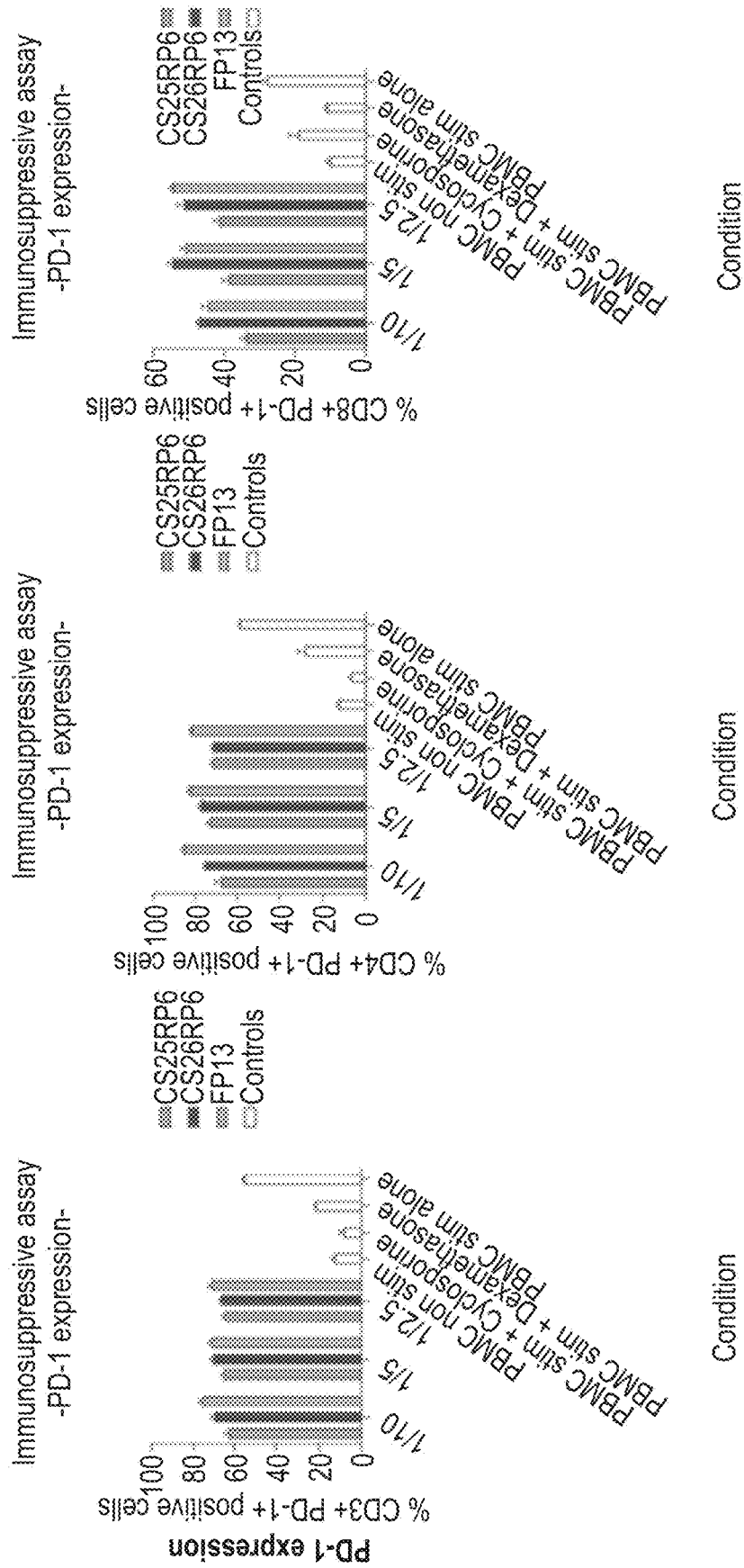
Figure 50:
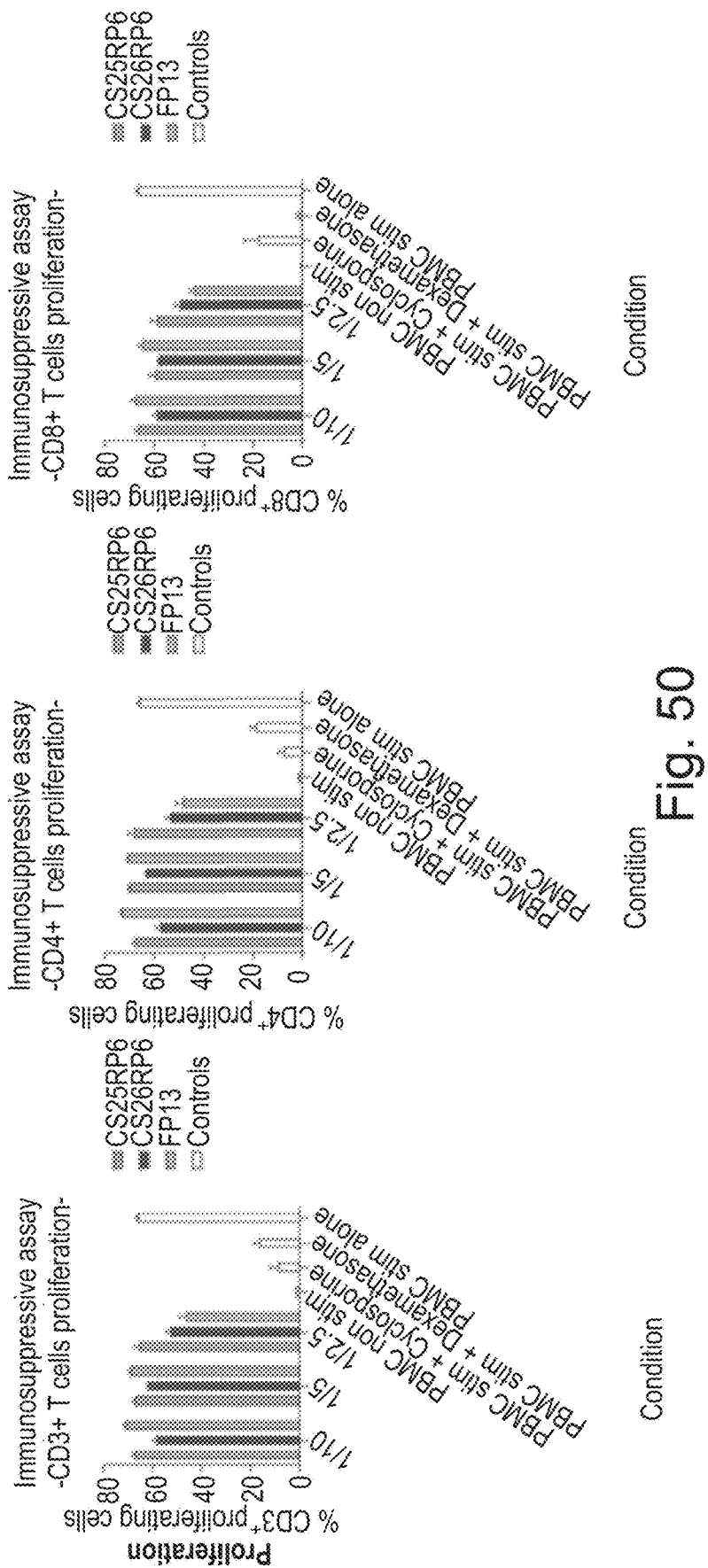
FIG. 50 provides an example of T cell proliferation (upper graphs) and PD-1 expression (lower graphs) in CD3 (left graphs), CD4 (middle graphs) and CD8+ T cell populations (right graphs) in a suppressive assay. 3 stem cell-derived products, CS26Rp6, CS25Rp6 and FP13, were evaluated at three ratios (1/10, 1/5 and 1/2.5). Data represent Mean+SEM. N=3.
Figure 50:
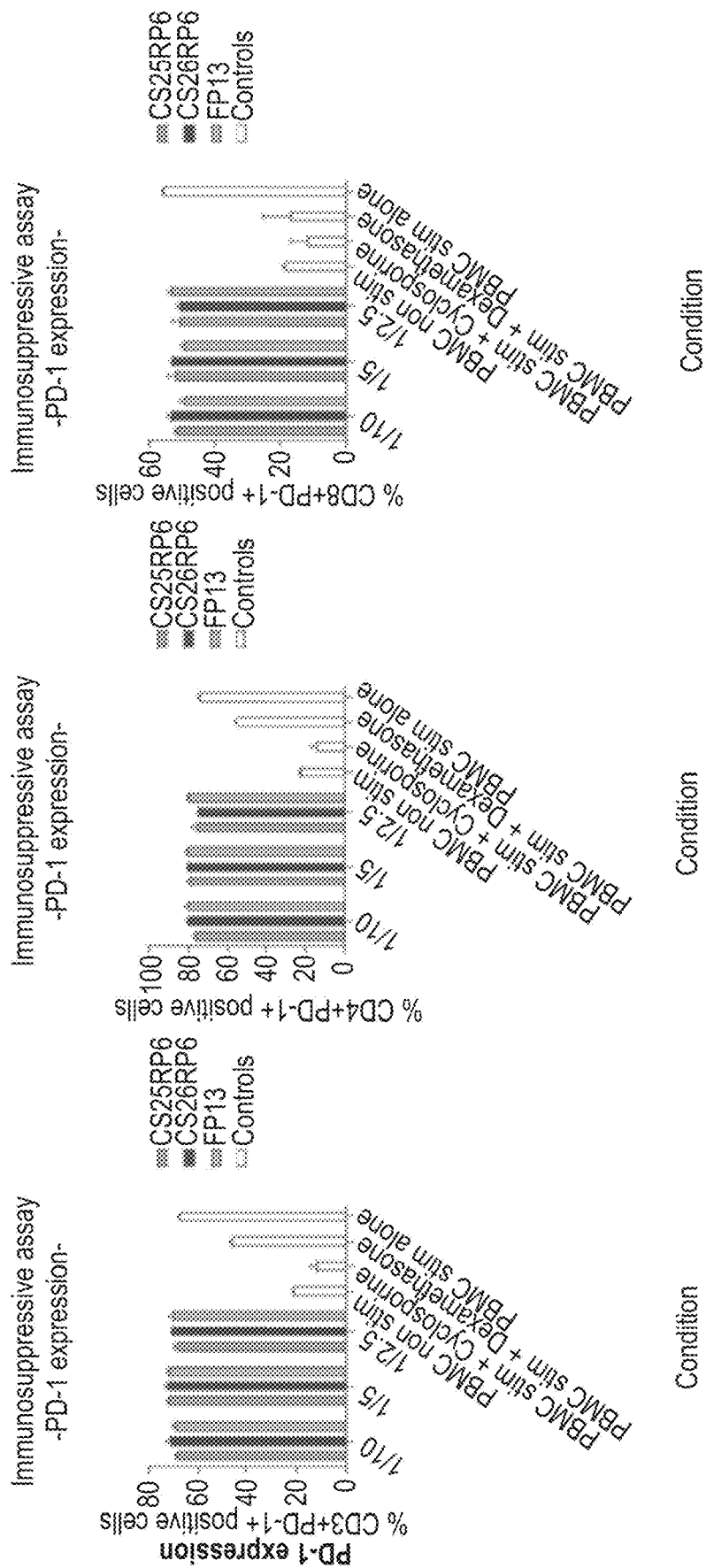
Figure 51:
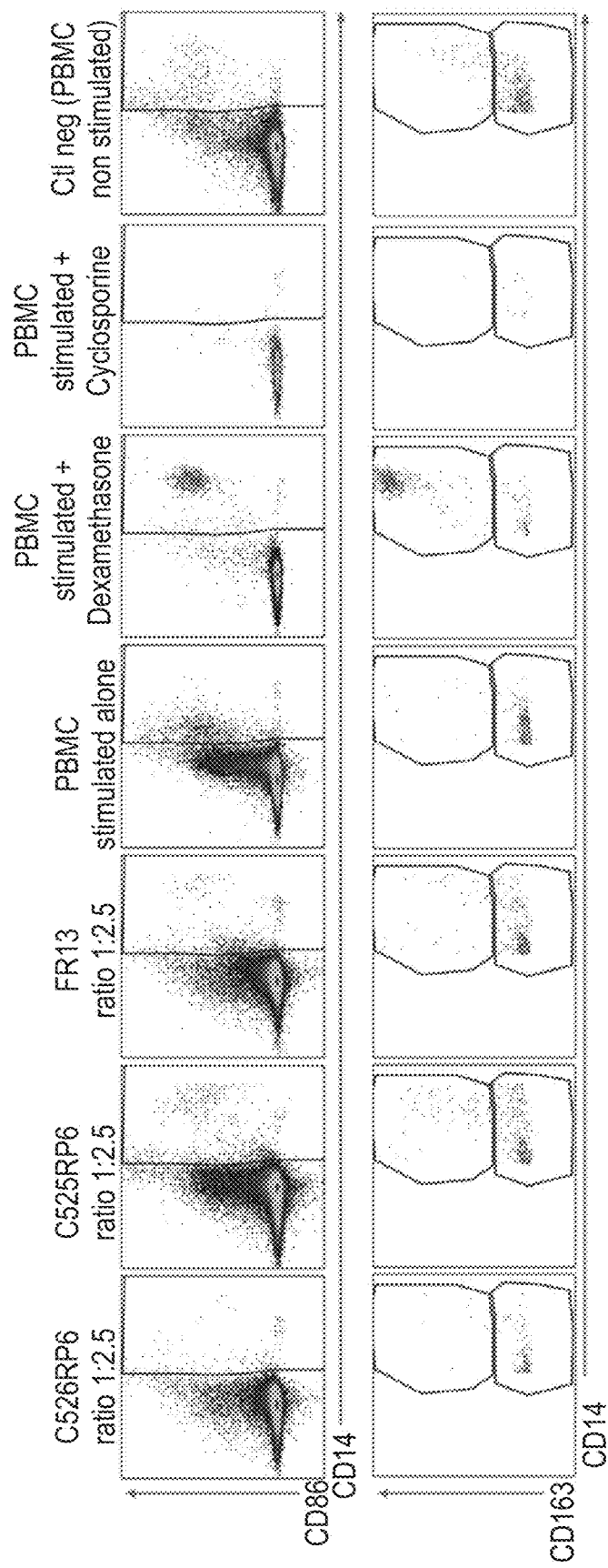
FIG. 51 provides an example overview of the dot plot CD86/CD14 (upper graphs) and CD163/CD14 (lower graphs) for each condition tested.
Figure 52:
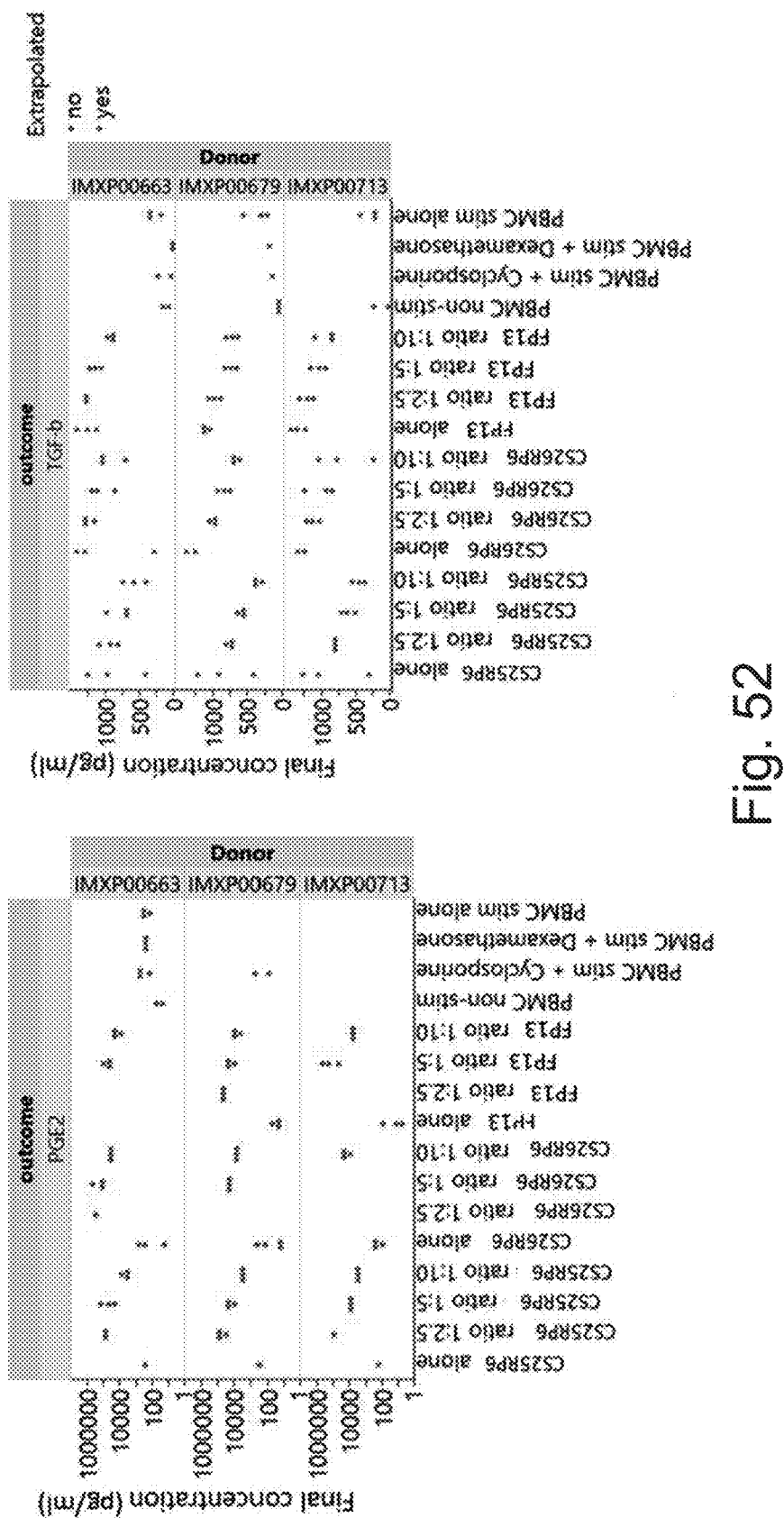
FIG. 52 provides an example of PGE2 (left graph) and TGF-γ (right graph) secretion in the suppressive assay. 3 stem cell-derived products, CS26Rp6, CS25Rp6 and FP13, were evaluated at three ratios (1/10, 1/5 and 1/2.5). Data represent Mean+SEM. N=3.
Figure 53:
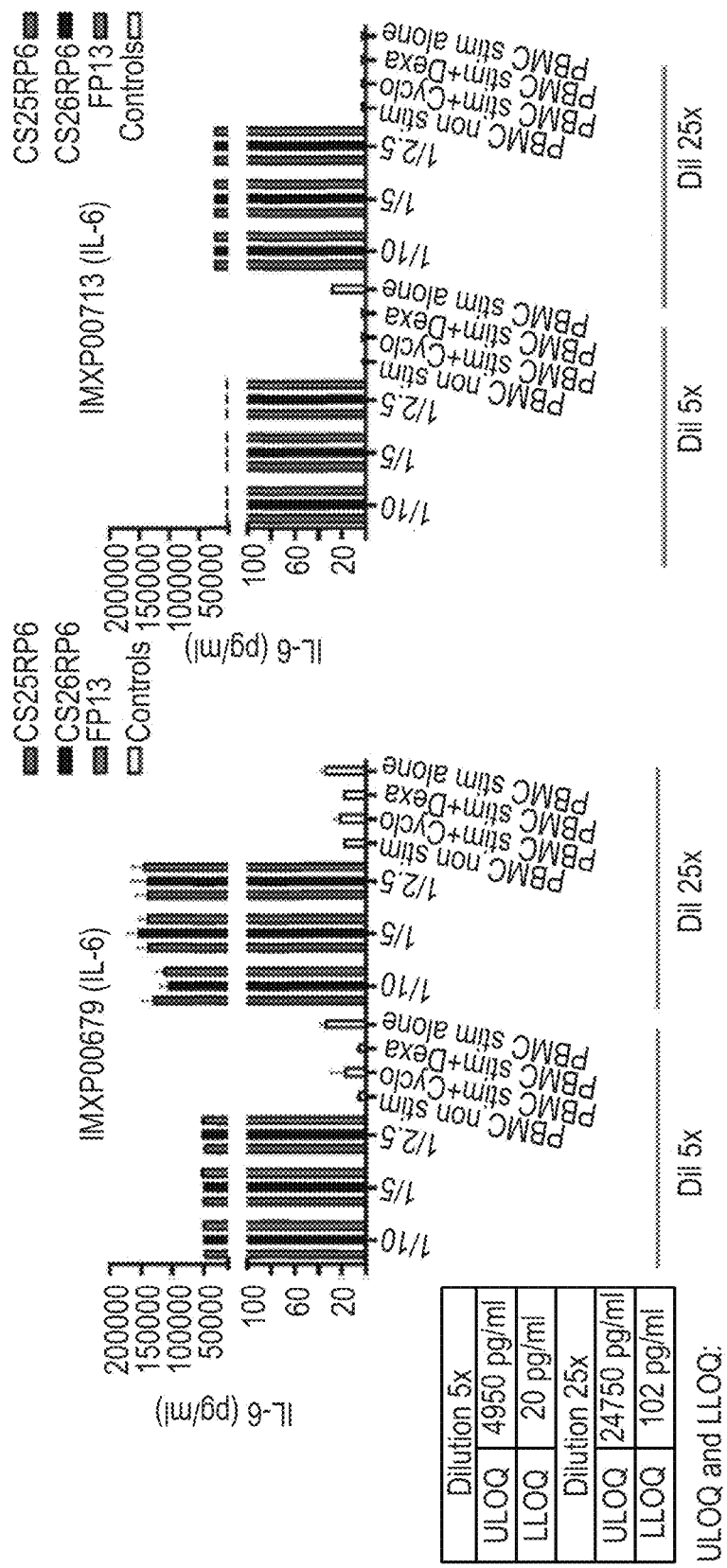
FIG. 53 provides an example of IL-6 secretion in the suppressive assay. 3 stem cell-derived products, CS26Rp6, CS25Rp6 and FP13, were evaluated at three ratios (1/10, 1/5 and 1/2.5). Data represent Mean+SEM. N=3.
Figure 54:
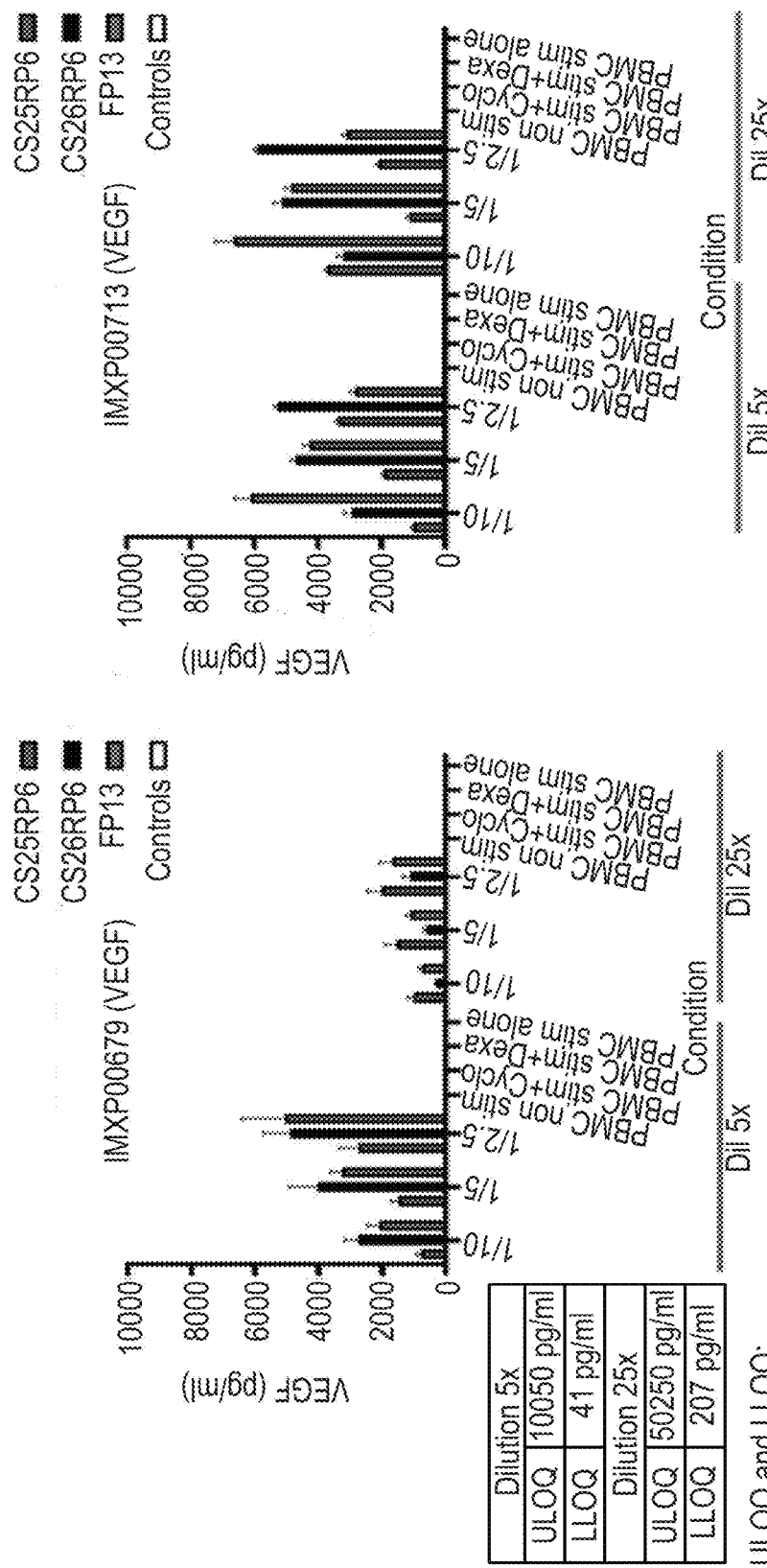
FIG. 54 provides an example of VEGF secretion in the suppressive assay. 3 stem cell-derived products, CS26Rp6, CS25Rp6 and FP13, were evaluated at three ratios (1/10, 1/5 and 1/2.5). Data represent Mean+SEM. N=3.
Figure 55:
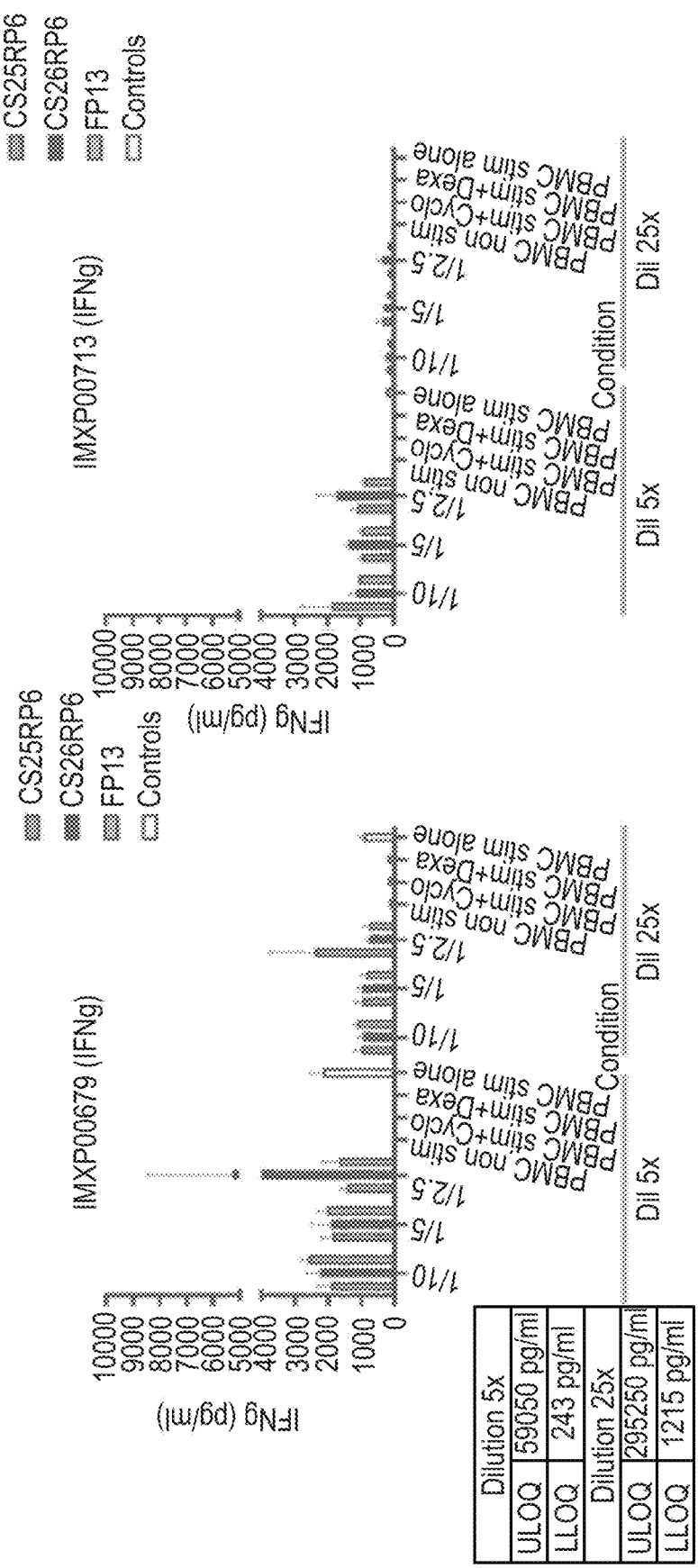
FIG. 55 provides an example of IFN-γ secretion in the suppressive assay. 3 stem cell-derived products, CS26Rp6, CS25Rp6 and FP13, were evaluated at three ratios (1/10, 1/5 and 1/2.5). Data represent Mean+SEM. N=3.
Figure 56:
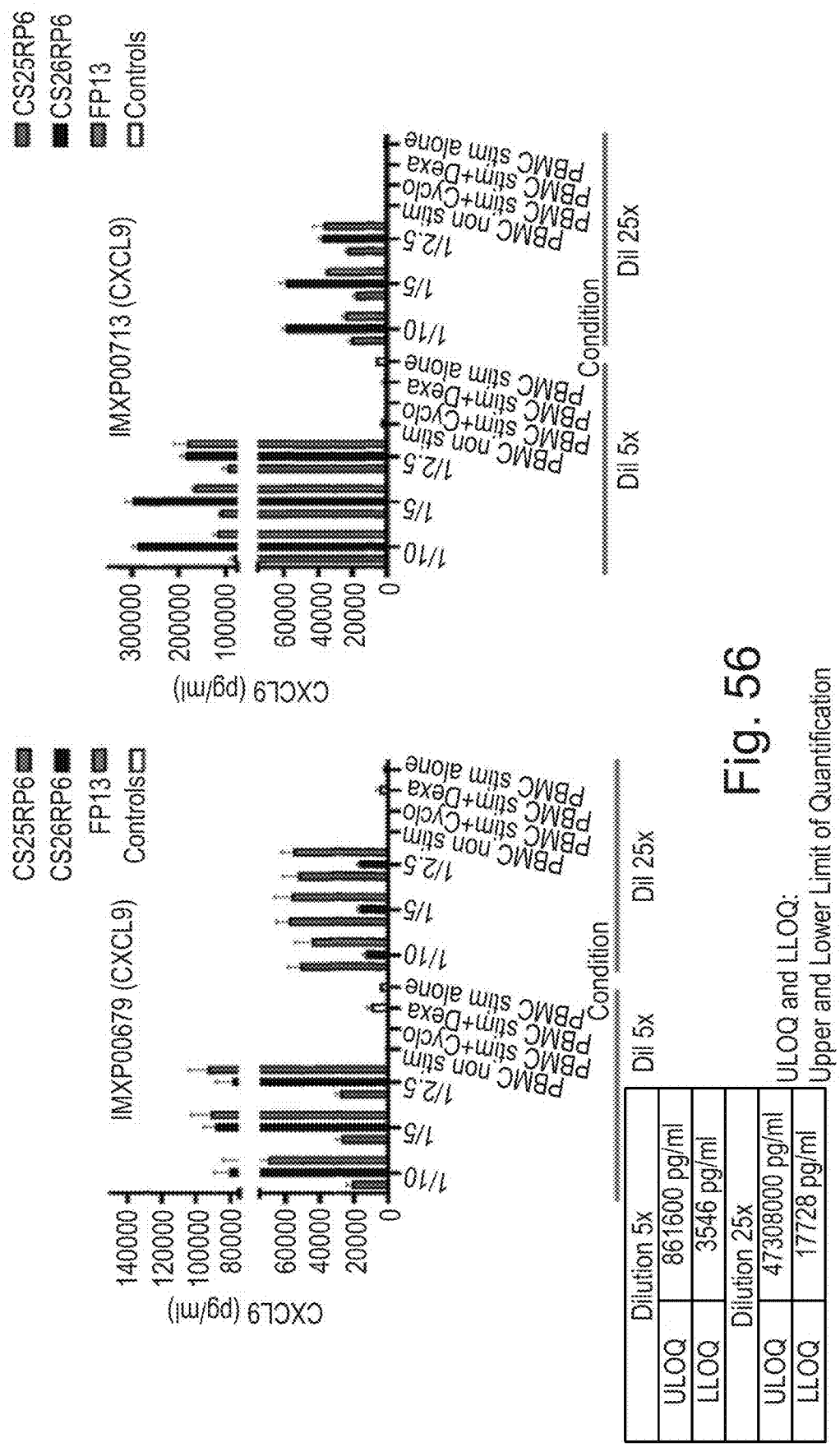
FIG. 56 provides an example of CXCL9 secretion in the suppressive assay. 3 stem cell-derived products, CS26Rp6, CS25Rp6 and FP13, were evaluated at three ratios (1/10, 1/5 and 1/2.5). Data represent Mean+SEM. N=3.

As results show in FIG. 43, when co-culturing PBMCs with MSCs, levels of CXCL9 and TNF-α in supernatant are lower compared with control. CsA also inhibits CXCL9 and TNF-α. No inhibitory effect can be seen on the other analyzed cytokines.

Use of TAF MSCs and Tissue-Specific MSCs to Reduce T Cell Activation and Alter Macrophage Activation/Polarization As will be understood by one of skill in the art, in some examples, TAF MSCs may be isolated via any one of the methods described herein, for example by use of the markers described in Tables 2 or Table 3, and introduced in vivo (via injection, transplantation, or other suitable methods) or ex vivo to T cells and macrophages, thereby reducing T cell activation and/or changing macrophage activation/polarization in human tissue. One of skill in the art will further understand that molecules released by the TAF-MSCs may also be introduced to the T cells and macrophages, thereby reducing T cell activation and/or changing macrophage activation/polarization in human tissue.

As will be understood by one of skill in the art, in some examples, lung TAF MSCs may be isolated via any one of the methods described herein, for example by use of the markers described in Table 4, and introduced in vivo (via injection, transplantation, or other suitable methods) or ex vivo to T cells and macrophages, thereby reducing T cell activation and/or changing macrophage activation/polarization in human tissue. One of skill in the art will further understand that molecules released by the lung TAF-MSCs may also be introduced to the T cells and macrophages, thereby reducing T cell activation and/or changing macrophage activation/polarization in human tissue.

As will be understood by one of skill in the art, in some examples, kidney TAF MSCs may be isolated via any one of the methods described herein, for example by use of the markers described in Table 5, and introduced in vivo (via injection, transplantation, or other suitable methods) or ex vivo to T cells and macrophages, thereby reducing T cell activation and/or changing macrophage activation/polarization in human tissue. One of skill in the art will further understand that molecules released by the kidney TAF-MSCs may also be introduced to the T cells and macrophages, thereby reducing T cell activation and/or changing macrophage activation/polarization in human tissue.

As will be understood by one of skill in the art, in some examples, skin TAF MSCs may be isolated via any one of the methods described herein, for example by use of the markers described in Table 6, and introduced in vivo (via injection, transplantation, or other suitable methods) or ex vivo to T cells and macrophages, thereby reducing T cell activation and/or changing macrophage activation/polarization in human tissue. One of skill in the art will further understand that molecules released by the skin TAF-MSCs may also be introduced to the T cells and macrophages, thereby reducing T cell activation and/or changing macrophage activation/polarization in human tissue.

As will be understood by one of skill in the art, in some examples, neural TAF MSCs may be isolated via any one of the methods described herein, for example by use of the markers described in Table 7, and introduced in vivo (via injection, transplantation, or other suitable methods) or ex vivo to T cells and macrophages, thereby reducing T cell activation and/or changing macrophage activation/polarization in human tissue. One of skill in the art will further understand that molecules released by the neural TAF-MSCs may also be introduced to the T cells and macrophages, thereby reducing T cell activation and/or changing macrophage activation/polarization in human tissue.

Example 2

In Vitro Evaluation (Assay) of the Effect of γ-Irradiated Human MSCs (AmnioPul-02) on T-Cell Activation, Macrophage Polarization and Cytokine Secretion Using PBMCs Briefly, in the "Suppressive Assay", eFluor labeled PBMCs from three donors, stimulated with anti-CD3/CD28, were co-cultured in the presence/absence of the 3 stem cell-derived products at 3 concentrations (1:10, 1:5, 1:2,5), and its relevant controls. After an optimized period, the proliferation of the responding T cells was assessed by flow cytometry by analyzing the eFluor profile. Next to this, activated PD-1$^+$ T cells were measured by flow cytometry.

In addition, the effect of the test products on M1- and M2-like macrophages among stimulated PBMCs was evaluated by analysis of the expression of CD14, CD86, CD163, CD206 and PD-1 by flow cytometry.

The cell culture supernatant was harvested for PGE2, IDO, HGF, NGF, VEGF, CXCL9, IL-6, IL-18, IL-12 (p-40 or p-'70), IL-10, CCL18, IFN-γ and TGF-β1 secretion analysis by ELISA/Luminex.

Overall, no or limited suppressive effect was observed on the T cell proliferation or PD-1 expression in the presence of the 3 stem cell-derived products. Regarding the cytokine secretion, PGE2, TGF-β, IL-6, VEGF and CXCL9 secretion was increased in the presence of the 3 stem cell-derived products. The secretion of IFN-γ tended to be decreased at the 1/2.5 ratio in donor IMXP00679. However, the number of macrophages present at the end of the assay was too low to analyze the macrophages markers.

An evaluation of the immunosuppressive potential of 3 stem cell-derived products: CS26Rp6, CS25Rp6 and FP13 was performed. The cells were tested at three ratios 1:10, 1:5 and 1:2.5 (1 PBMC for 10 stem cells). For that, 3 cryopreserved PBMC donors were thawed and stained with eFLuor 450. The PBMCs were mixed with the γ-irradiated stem cells and incubated for 5 days. The proliferation and expression of PD-1 were evaluated on CD3, CD4, and CD8$^+$ T cell populations, while CD86, CD163, CD206 was assessed on the CD14+ population. In addition, the cell culture supernatant was harvested to measure PGE2, IDO, HGF, NGF, VEGF, CXCL9, IL-6, IL-18, IL-12 (p-40 or p-70), IL-10, CCL18, IFN-γ and TGF-β1 secretion by ELISA or Luminex.

Cellular Material

All experiments included cryopreserved primary cells, i.e., PBMCs, isolated from whole blood donated by healthy volunteers. Whole blood was collected from healthy donors as described in the ethical protocol/amendment IXP-004 (Belgian registration number B707201629385), protocol IXP-003 (Belgian registration number B707201627607). All blood samples were tested and found negative for HBV, HCV and HIV. PBMCs were separated from the blood by density gradient centrifugation and subsequently cryopreserved in fetal bovine serum (FBS), supplemented with 10% dimethyl sulfoxide, by controlled rate freezing.

The PBMCs were kept in a cryogenic storage (−180° C.) until use. All PBMC preparations underwent a quality control before use in all experiments from this project, including post-thaw viability, recovery assessment and polyclonal T cell activation. Acceptance criteria for a PBMC preparation were set as Viability >85% and a Stimulation Index for polyclonal activation ≥2. For each donor, cell pellets were kept for high resolution sequence-based typing using next generation sequencing technologies. An overview of the selected donors for this project can be found in Table 8.

TABLE 8

Overview of donors used.

| Donor | Preparation | Year of Birth | Gender | Ethnicity | HLA-DRB1 | |
|---|---|---|---|---|---|---|
| IMXP00663 | PP01005 | 1988 | Female | Caucasoid | 13:01:01G | 13:01:01G |
| IMXP00679 | PP01441 | 1958 | Female | Caucasoid | 03:01:01G | 04:01:01G |
| IMXP00713 | PP01158 | 1970 | Female | Caucasoid | 07:01:01G | 07:01:01G |

Test Cells

An overview of the test cells used in this project can be found in Table 9. The cells were thawed and cultured as recommended by the Customer.

TABLE 9

Overview of the cell line used

| Cell line | Provider | Description |
|---|---|---|
| CS26Rp6, | Customer | Stem cell-derived product |
| S25Rp6 | Customer | Stem cell-derived product |
| FP13 | Customer | Stem cell-derived product |

Methods
Suppressive Assay

The experimental part of the in vitro assay was performed for 5 days as described below. PBMCs, isolated from 3 healthy donors, were retrieved from cryogenic storage and thawed in culture media. The cells were washed, counted, and resuspended at $1.0 \times 10^7$ cells/ml in PBS before labeling with e-Fluor 450 proliferation dye (ThermoFisher Scientific reference number 65-0840-85). After the labeling incubation step at 37° C., cells were washed twice in RPMI total, counted, and resuspended at $2.0 \times 10^6$ cells/ml in RPMI total and, 100 μl of the cell suspension was added per coated well. In the meantime, the 3 stem cell-derived products were thawed, washed, counted, and resuspended at $1.0 \times 106$ cells/ml for irradiation at 25 GY.

The stem cells were washed twice, counted, and added to the PBMCs at 3 ratios: 1/10, 1/5 and 1/2.5. Finally, ImmunoCult™ Human CD3/CD28 T Cell Activator (STEMCELL Technologies, Ref 10971) was added to the culture. The plates with a total volume of 200 µl were incubated in a humidified incubator at 37° C. and 5% $CO_2$ until the proliferation and cell surface marker analysis.

Cell Phenotype Characterization

180 µl of the cell culture supernatant was harvested, transferred to 96-well V-bottom plates, centrifuged for 3 minutes at 800 g and transferred to fresh 96-well V-bottom plates. Next, a second centrifugation was performed to remove any cellular debris. The cell culture supernatant was then stored at −80° C. 100 µl of cell dissociation buffer was added to each well containing the cells. Plates were mixed 30 seconds and incubated for 10 min at 37° C. The cells were harvested and transferred to 96-well round-bottom plates before being centrifuged at 800 g for 3 min. The supernatant was discarded, and a viability dye was added. The cells were then labeled for CD3/CD4/CD8/PD-1 or CD14/CD86/CD206/CD163 with a mixture of antibodies coupled to different fluorochromes. The cells were incubated for 30 minutes at 4° C. After the incubation time, the labeled cells were washed with DPBS/BSA 0.1% and centrifuged at 800 g for 3 minutes. The cells were washed and then resuspended in 150 µl of DPBS/BSA 0.1% for flow cytometry acquisition.

TABLE 10

Overview of antibodies used for the T cell characterization.

| Antibody | Fluorochrome | Supplier | Reference |
|---|---|---|---|
| Zombie NIR | NA | BioLegend | 423106 |
| CD3 | BUV395 | BD Biosciences | 563795 |
| CD4 | FITC | BioLegend | 300506 |
| CD8 | PE | BioLegend | 329906 |
| PD-1 | APC | BioLegend | 344812 |

First, the lymphocytes were selected on an SSC-A/FSC-A dot plot to exclude the debris. Then, doublets were excluded by consecutive FSC-H/FSC-A and SSC-H/SSC-A dot plots. Next, A SSCA/viable cells dot plot was used to gate the viable cells. T cells were then selected based on a CD3/Viability dot plot for the T cell characterization analysis. Among $CD3^+$ T cells, the $CD4^+$ and $CD8^+$ T cell populations were gated in a CD4/CD8 dot plot. The expression of PD-1 and the proliferation were then measured in the three populations (CD3/CD4/CD8).

TABLE 11

Overview of antibodies used for the macrophage characterization.

| Antibody | Fluorochrome | Supplier | Reference |
|---|---|---|---|
| Zombie NIR | NA | Biolegend | 423106 |
| PD-1 | BV711 | BD Biosciences | 564017 |
| CD14 | FITC | Miltenyi | 130-110-518 |
| CD163 | PE | Miltenyi | 130-112-128 |
| CD86 | PE Vio770 | Miltenyi | 130-116-162 |
| CD206 | APC | Miltenyi | 130-123-803 |

Cytokine Analysis

The concentration of PGE2, IDO, and TGF-β1 secreted in the cell culture supernatant was measured by ELISA. The secretion of HGF, NGF, VEGF, CXCL9, IL-6, IL-18, IL-12 (p-40 or p-'70), IL-10, CCL18, IFN-γ was evaluated by Luminex. The assay development was performed according to the Manufacturer's instructions.

Data Analysis and Data Management

All flow cytometry data were acquired with a LSR Fortessa (BD) and analyzed using the FlowJo software. The full flow cytometry data files were stored in the LSR Fortessa database. An excel file, containing the relevant parameters and labels for each well, was exported for further analysis.

ELISA

All ELISA data were acquired with a SpectraMax™ 190 ELISA Microplate Reader (Molecular Devices) and analyzed using the SoftMax Pro 7.0 software. Optical density (OD) of each well was analyzed at 450 nm. To correct for optical imperfections in the 96-well plate, a wavelength correction was applied by subtracting the initial O.D. values with those at 540 nm. For each plate, a standard curve was generated by applying a four-parameter logistic (4-PL) curve fit to the average of the standards. Finally, using the standard curve equation, the O.D. values for all samples were converted to the corresponding concentration (pg/ml) and multiplied by their dilution factor.

Luminex

The cytokines produced in the suppressive assay were measured by a Luminex 200 using the "Multiplex HCY-TOMAG-60K" kit according to the Manufacturer's protocol (Merck/Millipore). The cell culture samples were diluted 5× or 25×.

Results: T Cell Characterization

This project aimed to evaluate the immunosuppressive capacity of three stem cell-derived products: CS26Rp6, CS25Rp6 and FP13 on PBMCs stimulated with CD3/CD28 tetramers. The cells were tested at three ratios 1:10, 1:5 and 1:2.5. The effect of those stem cells was evaluated on CD3, CD4, $CD8^+$ T cell populations and on PD-1 expression.

The positive control (aCD3/CD28) showed a positive response in all donors tested (T cell proliferation and PD-1 expression). The addition of the three samples (CS26Rp6, CS25Rp6 and FP13) increased the proliferation for donor IMXP00663 and IMXP00713. For donor IMXP00679, at a 1/2.5 ratio, CS26Rp6 and FP13 decreased the proliferation slightly. The expression of PD-1 was increased or similar in the presence of the three samples in all three subpopulations evaluated ($CD4^+$, $CD8^+$ and $CD3^+$ T cells).

Cytokine Secretion

To analyze the effect of the stem cell on T cell activation and macrophages polarization, the cytokines secretion was also evaluated. For that, PGE2, IDO, HGF, NGF, VEGF, CXCL9, IL-6, IL-18, IL-12 (p-40 or p-'70), IL-10, CCL18, IFN-γ and TGF-β1 secretion were measured by ELISA or Luminex.

PBMCs stimulated with aCD3/CD28, did not secrete PGE2 (under the limit of detection for IMXP00679 and IMXP00713, and around 200 pg/ml for donor IMXP00663). The addition of CS26Rp6, CS25Rp6 and FP13 strongly increased the PGE2 level to between 150-fold to 1000-fold (CS26Rp6: 350-fold, CS25Rp6: 150-fold and FP13: 1000-fold). This was observed in the three donors tested. The cell culture supernatant of the test cells alone (without any PBMC contact) already contained PGE2, such as around 230 pg/ml for CS25RP6, 180 pg/ml for CS26RP6 and 30 pg/ml for FP13.

Around 250-300 pg/ml of TGF-β1 was measured in the supernatant of PBMCs stimulated with aCD3/CD28 condition. The addition of CS26Rp6, CS25Rp6 and FP13 increased the level 3-fold (CS26Rp6: 3.8-fold, CS25Rp6: 2.5-fold and FP13: 3.8-fold). This was observed in the three donors tested. However, the cell culture supernatant of the test cells alone (without any PBMC contact) already contained approximatively 1000 pg/ml of TGF-β.

Figure 57:
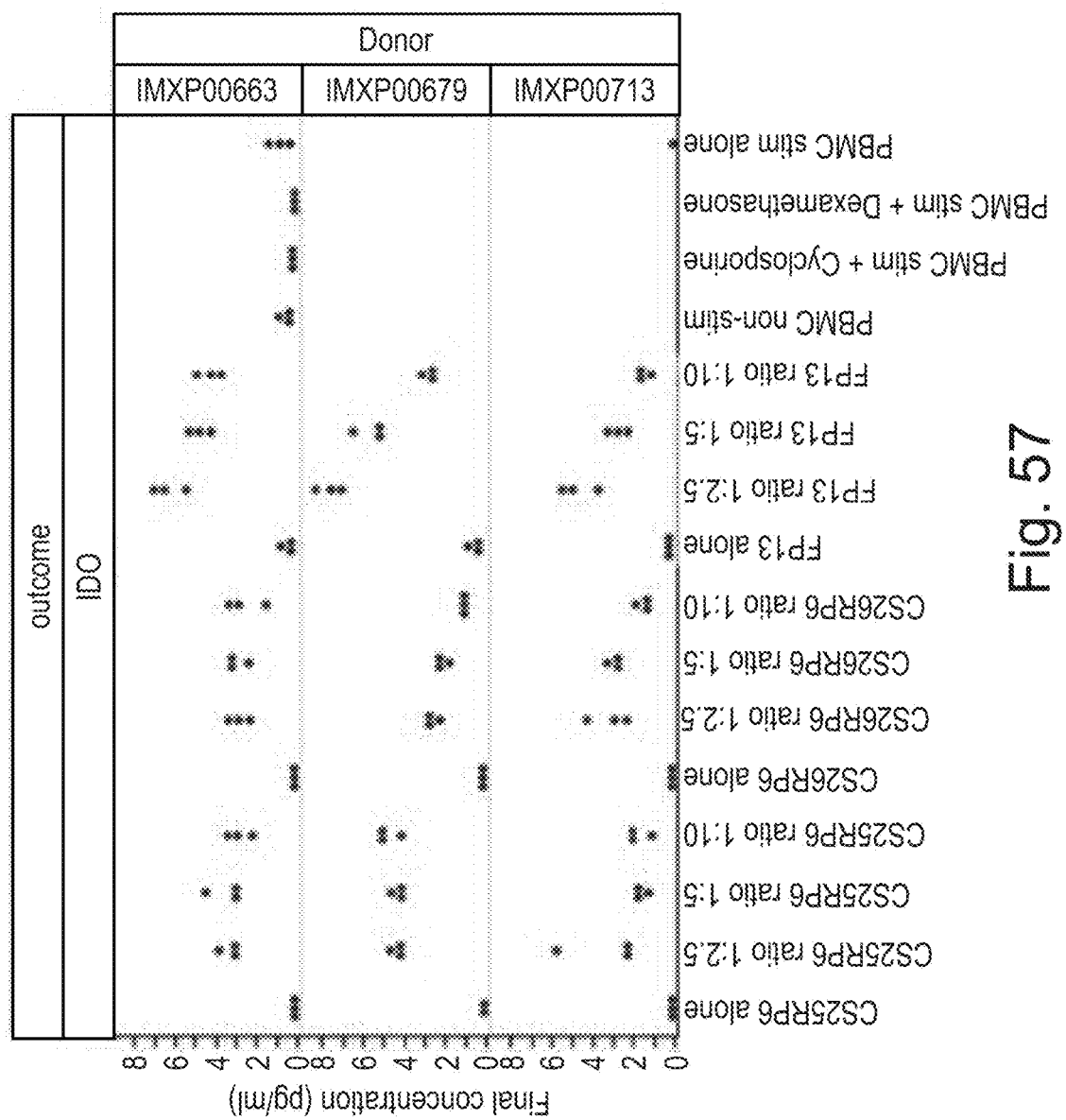
FIG. 57 provides an example of IDO secretion in the suppressive assay. 3 stem cell-derived products, CS26Rp6, CS25Rp6 and FP13, were evaluated at three ratios (1/10, 1/5 and 1/2.5). Data represent Mean+SEM. N=3.
Figure 58:
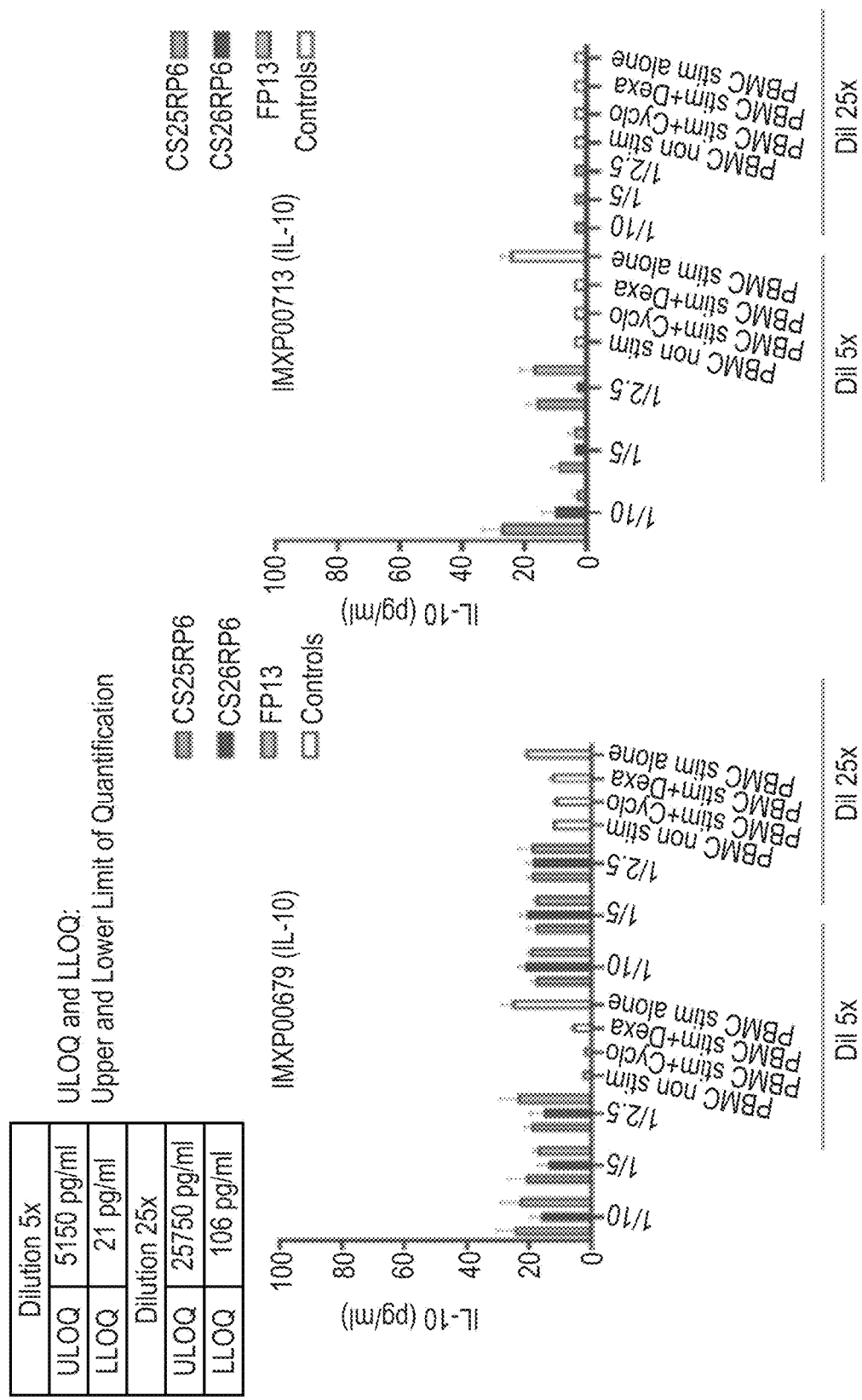
FIG. 58 provides an example of IL-10 secretion in the suppressive assay. 3 stem cell-derived products, CS26Rp6, CS25Rp6 and FP13, were evaluated at three ratios (1/10, 1/5 and 1/2.5). Data represent Mean+SEM. N=3.
Figure 60:
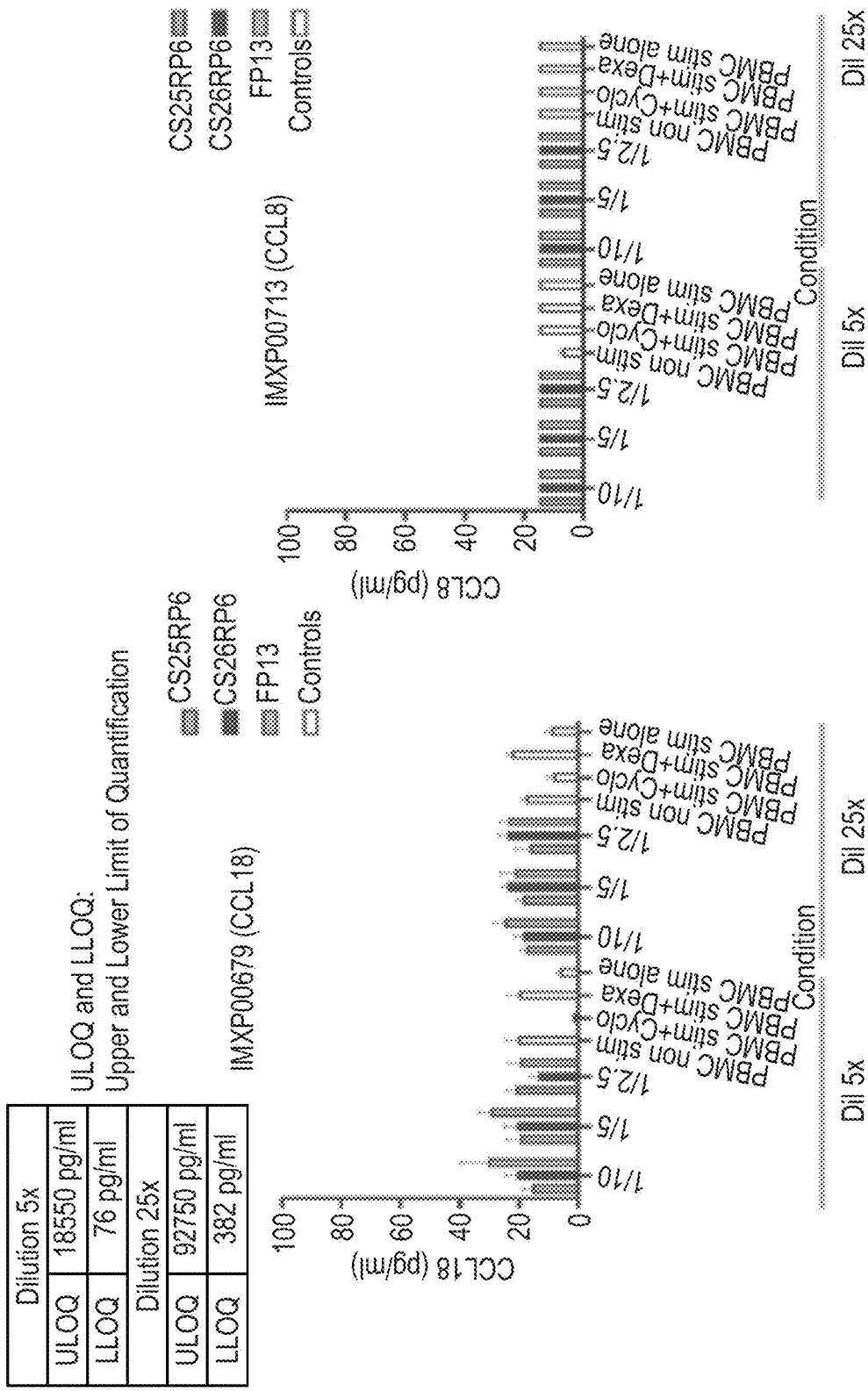
FIG. 60 provides an example of CCL18 secretion in the suppressive assay. 3 stem cell-derived products, CS26Rp6, CS25Rp6 and FP13, were evaluated at three ratios (1/10, 1/5 and 1/2.5). Data represent Mean+SEM. N=3.
Figure 61:
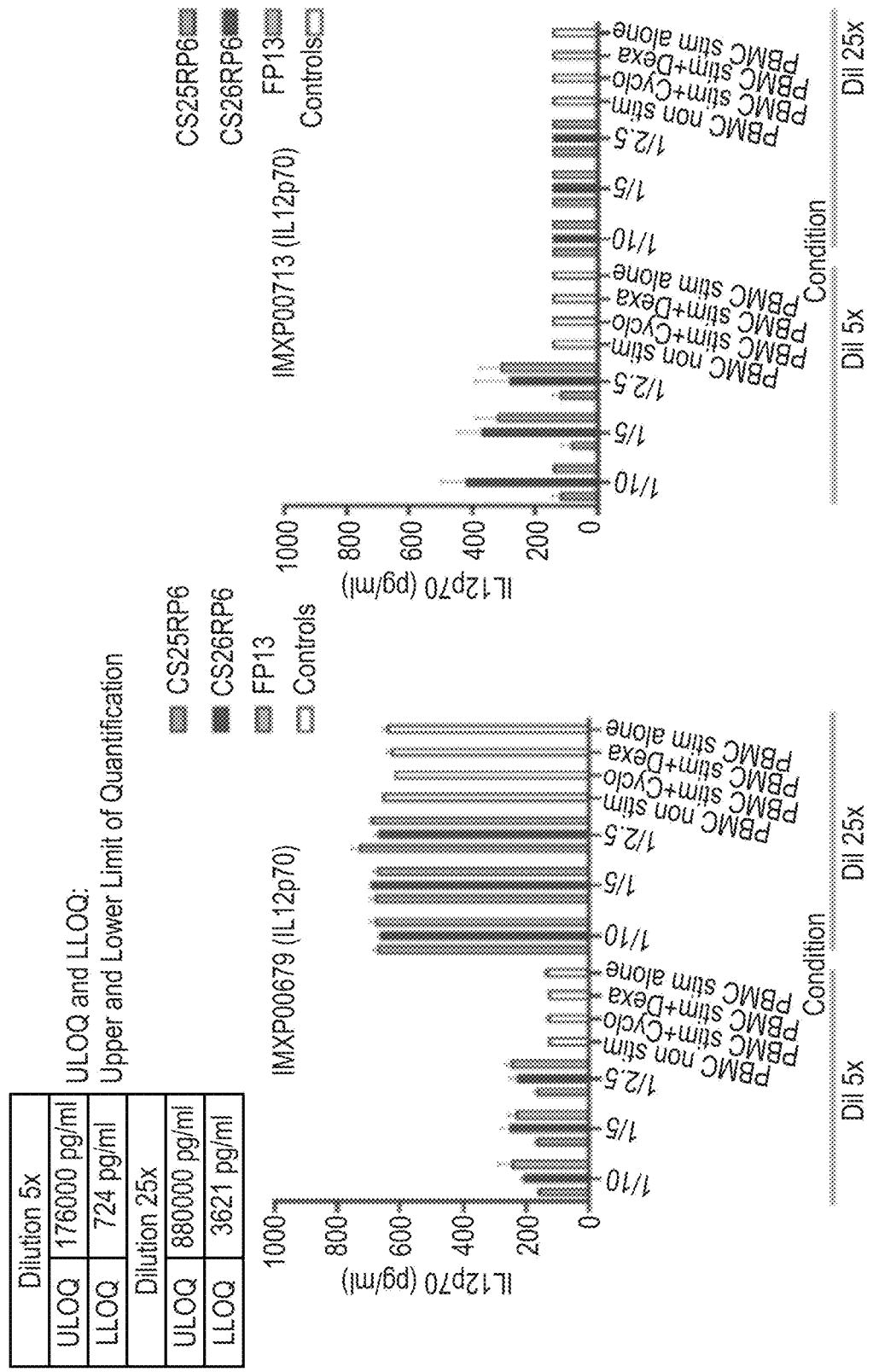
FIG. 61 provides an example of. IL-12p70 secretion in the suppressive assay. 3 stem cell-derived products, CS26Rp6, CS25Rp6 and FP13, were evaluated at three ratios (1/10, 1/5 and 1/2.5). Data represent Mean+SEM. N=3.
Figure 62:
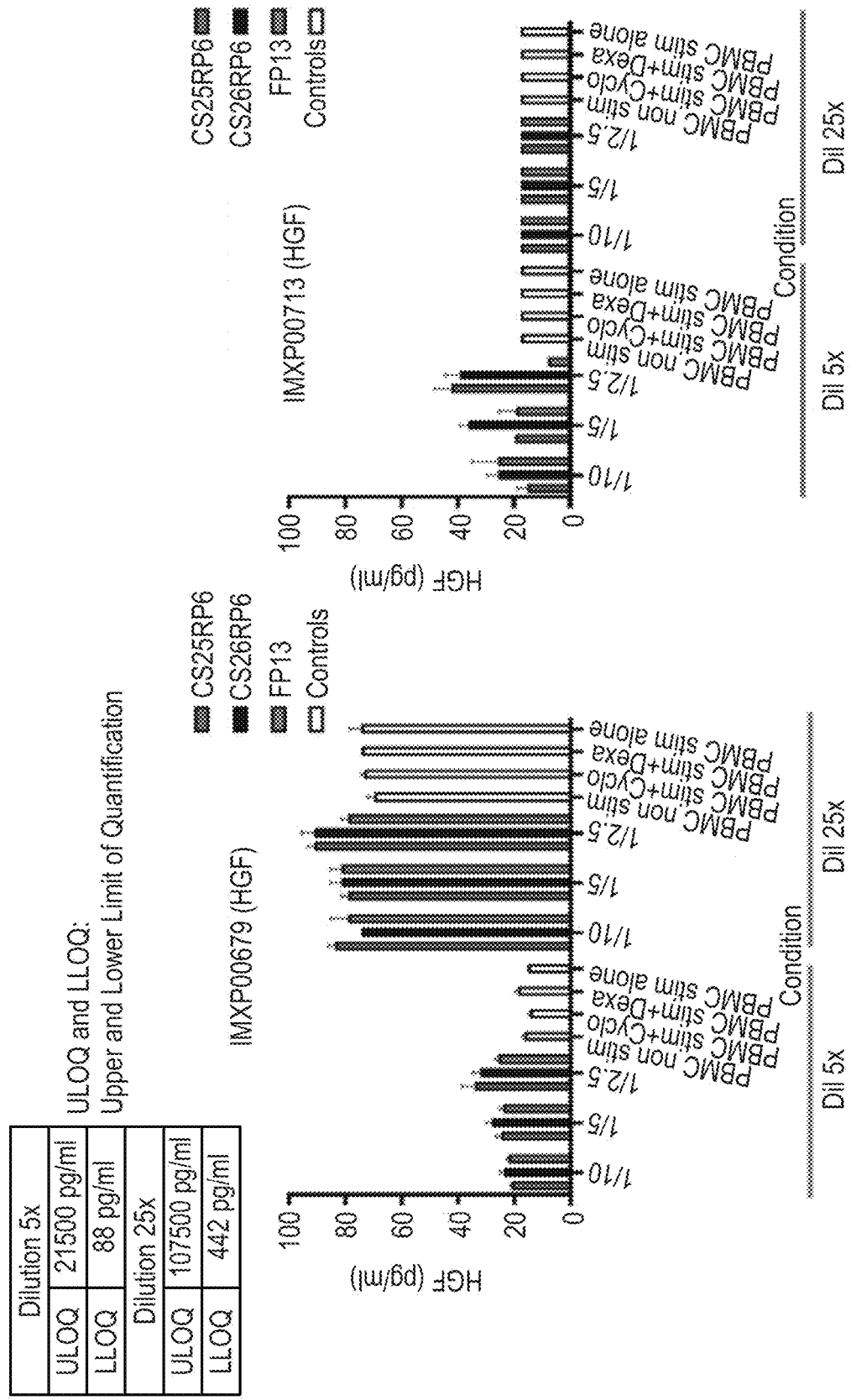
FIG. 62 provides an example of HGF secretion in the suppressive assay. 3 stem cell-derived products, CS26Rp6, CS25Rp6 and FP13, were evaluated at three ratios (1/10, 1/5 and 1/2.5). Data represent Mean+SEM. N=3.
Figure 63:
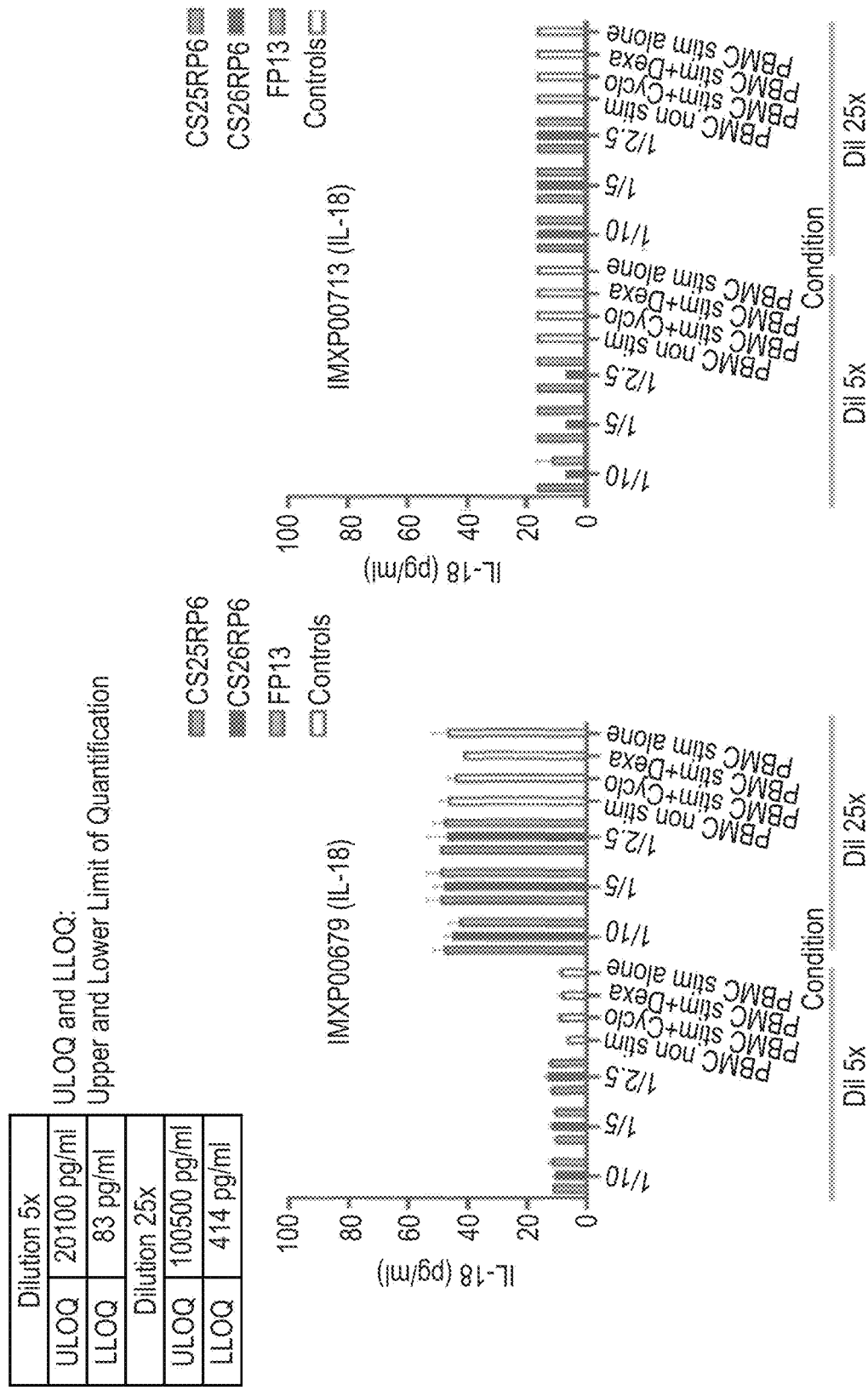
FIG. 63 provides an example of IL-18 secretion in the suppressive assay. 3 stem cell-derived products, CS26Rp6, CS25Rp6 and FP13, were evaluated at three ratios (1/10, 1/5 and 1/2.5). Data represent Mean+SEM. N=3.

A very low amount of IDO production (under 10 pg/ml) was observed in all conditions tested (FIG. 57).

Luminex Data

The Luminex analysis was performed on donor IMXP00679 and IMXP00713 as the donor IMXP00663 responded too low to CD3/CD28 stimulation (below 20% of proliferating cells). The secretion of IL-10, NGF, CCL18, IL-12p70, HGF and IL-18 was below the limit of detection (FIGS. 58-63).

PBMCs stimulated with aCD3/CD28 secreted high/medium amounts of IFN-γ (1500 pg/ml for donor IMXP00679 and 120 pg/ml for donor IMXP00713). The addition of the three samples (CS26Rp6, CS25Rp6 and FP13) induced increased secretion of IL-6 (minimum of 1000-fold), VEGF (minimum of 1000-fold), and CXCL9 (from 5-fold to 25-fold) compared to stimulated PBMCs alone. In all tested conditions, low or below LOQ of IL-10 (around 30 pg/ml or less), bNGF (around 15 pg/ml or less), CCL18 (around 30 pg/ml or less), HGF (around 75 pg/ml or less), IL12p70 (around 600 pg/ml or less) and IL-18 (around 50 pg/ml or less) were detected.

Conclusions from Example 2

The immunosuppressive capacity of γ-irradiated AmnioPul-02 on PBMCs activated with CD3/CD28 tetramers was evaluated in a Study by ImmunXperts (P000899).

The stem cells were mixed with the PBMCs at three ratios 1:10, 1:5 and 1:2.5. Briefly, in the "Suppressive Assay", eFluor labeled PBMCs from three donors, stimulated with anti-CD3/CD28, were co-cultured in the presence/absence of the 3 stem cell-derived products at 3 concentrations (1:10, 1:5, 1:2,5), and its relevant controls. After 5 days of co-culture, the proliferation of the responding T cells was assessed by flow cytometry by analyzing the eFluor profile. Next to this, activated PD-1$^+$ T cells were measured by flow cytometry. In addition, the effect of the test products on M1- and M2-like macrophages among stimulated PBMCs was evaluated by analysis of the expression of CD14, CD86, CD163, CD206 and PD-1 by flow cytometry.

The positive control (aCD3/CD28) showed a positive response in all donors tested (T cell proliferation and PD-1 expression). The addition of the three different γ-irradiated batches of AmnioPul-increased the proliferation for two donors. For one donor, at a 1/2.5 ratio, two of the three tested batches decreased the proliferation slightly. The expression of PD-1 was increased or similar in the presence of the three batches in all three subpopulations evaluated (CD4$^+$, CD8$^+$ and CD3$^+$ T cells).

The low amounts of CD14$^+$ cells harvested at the end of the assay were too low to analyze a potential effect of AmnioPul-02 on the macrophage M1/M2-like cell population.

To analyze the effect of the stem cell on T cell activation and macrophages polarization, the cytokines secretion was also evaluated. In an ELISA assay it was shown that PBMCs stimulated with aCD3/CD28, did not secrete PGE2 (under the limit of detection for IMXP00679 and IMXP00713, and around 200 pg/ml for donor IMXP00663).). Around 250-300 pg/ml of TGF-β1 secreted was detected in PBMCs stimulated with aCD3/CD28. The addition of three different batches of AmnioPul-02 strongly increased PGE2 and TGF-β production in all three donors tested (between 150-fold to 1000-fold for PGE2 and 3-fold for TGF-β). The Luminex analysis was only performed on two donors as one donor responded too low to CD3/CD28 stimulation (below 20% of proliferating cells). PBMCs stimulated with aCD3/CD28 secreted high/medium amounts of IFN-γ (1500 pg/ml for donor IMXP00679 and 120 pg/ml for donor IMXP00713). The addition of AmnioPul-02 induced increased secretion of IL-6 and VEGF at least 1000-fold, and CXCL9 from 5-fold to 25-fold compared to stimulated PBMCs alone. In all tested conditions, low or below LOQ of IL-10, bNGF, CCL18, HGF, IL12p70 and IL-18 were detected.

Overall, the effect of the γ-irradiated stem cells was limited on the T cell activation (proliferation, PD-1 expression and IFN-γ secretion). The evaluation of the cytokine's secretion revealed an increased secretion of IL-6, PGE2, TGF-β, VEGF, CXCL9 in the presence of the stem cell-derived products. Due to a low amount of CD14+ cells at the end of the cell culture period, the macrophage analysis was inconclusive.

While the present description sets forth specific details of various embodiments, it will be appreciated that the description is illustrative only and should not be construed in any way as limiting. Furthermore, various applications of such embodiments and modifications thereto, which may occur to those who are skilled in the art, are also encompassed by the general concepts described herein. Each and every feature described herein, and each and every combination of two or more of such features, is included within the scope of the present invention provided that the features included in such a combination are not mutually inconsistent. All figures, tables, and appendices, as well as patents, applications, and publications, referred to above, are hereby incorporated by reference.

Some embodiments have been described in connection with the accompanying drawing. However, it should be understood that the figures are not drawn to scale. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

For purposes of this disclosure, certain aspects, advantages, and novel features are described herein. It is to be understood that not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Although these inventions have been disclosed in the context of certain preferred embodiments and examples, it will be understood by those skilled in the art that the present inventions extend beyond the specifically disclosed embodiments to other alternative embodiments and/or uses of the inventions and obvious modifications and equivalents thereof. In addition, while several variations of the inventions have been shown and described in detail, other modifications, which are within the scope of these inventions, will be readily apparent to those of skill in the art based upon this disclosure. It is also contemplated that various combination or sub-combinations of the specific features and aspects of the embodiments may be made and still fall within the scope of the inventions. It should be understood that various features and aspects of the disclosed embodiments can be combined with or substituted for one another in order to form varying modes of the disclosed inventions. Further, the actions of the disclosed processes and methods may be modified in any manner, including by reordering actions and/or inserting additional actions and/or deleting actions. Thus, it is intended that the scope of at least some of the present inventions herein disclosed should not be limited by the particular disclosed embodiments described above. The limitations in the claims are to be interpreted broadly based on the language employed in the claims and not limited to the examples described in the present specification or during the prosecution of the application, which examples are to be construed as non-exclusive.

What is claimed is:

1. A method of reducing T cell activation in a population of activated T cells comprising:
   isolating lung term amniotic fluid mesenchymal stem cells (TAF-MSCs), which express CD248, DDR-1 and LRRC38, from human amniotic fluid by cell sorting for CD248, DDR-1 and LRRC38 to generate a population of isolated lung TAF-MSCs; and
   culturing the population of isolated lung TAF-MSCs with the population of activated T cells for a time sufficient to reduce T cell activation below a level of T cell activation of a population of activated T cells that are not co-cultured with the isolated lung TAF-MSCs.

2. The method of claim 1, wherein the population of activated T cells and isolated lung TAF-MSCs are co-cultured in a human tissue.

3. The method of claim 1, wherein, in the population of activated T cells, an expression level of activated T helper cells activation is reduced.

4. The method of claim 1, wherein, in the population of activated T cells, an expression level of activated cytotoxic T cells activation is reduced.

5. The method of claim 1, wherein the lung TAF-MSCs are isolated from amniotic fluid collected during the third trimester of pregnancy or after birth.

6. The method of claim 1, wherein the lung TAF-MSCs have a diameter of from 10-30 µm.

7. The method of claim 1, wherein the lung TAF-MSCs inhibit lung fibrosis.

8. The method according to claim 1, wherein the cell sorting comprises fluorescence activated cell sorting.

9. The method according to claim 1, wherein the cell sorting comprises magnetic-activated cell sorting.

10. The method according to claim 1, wherein the cell sorting comprises microfluidic based sorting.

11. The method according to claim 1, wherein the cell sorting comprises buoyancy activated cell sorting.

12. The method according to claim 1, wherein the cell sorting comprises mass cytometry.

* * * * *